United States Patent
Ansari et al.

(10) Patent No.: US 8,027,335 B2
(45) Date of Patent: Sep. 27, 2011

(54) MULTIMEDIA ACCESS DEVICE AND SYSTEM EMPLOYING THE SAME

(75) Inventors: Amir Ansari, Plano, TX (US); George A. Cowgill, Farmersville, TX (US)

(73) Assignee: Prodea Systems, Inc., Plano, TX (US)

( * ) Notice: Subject to any disclaimer, the term of this patent is extended or adjusted under 35 U.S.C. 154(b) by 845 days.

(21) Appl. No.: 11/115,707

(22) Filed: Apr. 27, 2005

(65) Prior Publication Data

US 2005/0249196 A1 Nov. 10, 2005

Related U.S. Application Data

(60) Provisional application No. 60/568,428, filed on May 5, 2004.

(51) Int. Cl.
*H04L 12/66* (2006.01)
*H04L 12/28* (2006.01)
*H04L 12/56* (2006.01)
*H04J 3/16* (2006.01)
*H04J 3/22* (2006.01)
*G06F 15/16* (2006.01)

(52) U.S. Cl. ......... 370/353; 370/401; 370/467; 709/228

(58) Field of Classification Search .................. 370/352
See application file for complete search history.

(56) References Cited

U.S. PATENT DOCUMENTS

| | | | |
|---|---|---|---|
| 5,943,478 | A | 8/1999 | Aggarwal et al. |
| 6,301,609 | B1 | 10/2001 | Aravamudan et al. |
| 6,449,344 | B1 | 9/2002 | Goldfinger et al. |
| 6,549,937 | B1 | 4/2003 | Auerbach et al. |
| 6,631,412 | B1 | 10/2003 | Glasser et al. |
| 6,677,976 | B2 | 1/2004 | Parker et al. |
| 6,694,007 | B2 | 2/2004 | Lang et al. |
| 6,697,474 | B1 | 2/2004 | Hanson et al. |
| 7,058,036 | B1 * | 6/2006 | Yu et al. ........................ 370/335 |
| 7,123,700 | B1 * | 10/2006 | Weaver et al. ............. 379/88.19 |
| 7,269,162 | B1 * | 9/2007 | Turner ......................... 370/352 |
| 7,673,001 | B1 * | 3/2010 | Battle et al. ................... 709/206 |
| 2002/0023131 | A1 | 2/2002 | Wu et al. |
| 2002/0078150 | A1 * | 6/2002 | Thompson et al. ........... 709/204 |
| 2003/0018726 | A1 | 1/2003 | Low et al. |
| 2003/0023730 | A1 * | 1/2003 | Wengrovitz et al. .......... 709/227 |
| 2003/0095569 | A1 * | 5/2003 | Wengrovitz et al. .......... 370/467 |
| 2003/0126207 | A1 | 7/2003 | Creamer et al. |
| 2003/0140103 | A1 * | 7/2003 | Szeto et al. ................... 709/206 |
| 2003/0185360 | A1 * | 10/2003 | Moore et al. ............. 379/114.01 |
| 2003/0210770 | A1 | 11/2003 | Krejcarek |
| 2004/0001480 | A1 | 1/2004 | Tanigawa et al. |

(Continued)

FOREIGN PATENT DOCUMENTS

EP  1 377 005 A1  1/2004

*Primary Examiner* — Andrew Chriss
(74) *Attorney, Agent, or Firm* — Slater & Matsil, L.L.P.

(57) ABSTRACT

A method of establishing a voice communication session with a multimedia access device employable in a multimedia communication system. In one embodiment, the method includes initiating a session request from a first endpoint communication device employing an instant messaging client and coupled to a packet based communication network. The method also includes processing the session request including emulating the instant messaging client for a second endpoint communication device coupled to said packet based communication network. The second endpoint communication device is a non-instant messaging based communication device. The method still further includes establishing a voice communication session between the first and second endpoint communication devices in response to the session request.

60 Claims, 16 Drawing Sheets

U.S. PATENT DOCUMENTS

| | | | |
|---|---|---|---|
| 2004/0062230 A1* | 4/2004 | Taylor et al. | 370/352 |
| 2004/0128310 A1* | 7/2004 | Zmudzinski et al. | 707/102 |
| 2004/0174858 A1* | 9/2004 | Caspi et al. | 370/351 |
| 2004/0203942 A1* | 10/2004 | Dehlin | 455/466 |
| 2004/0228324 A1* | 11/2004 | Alexiou et al. | 370/352 |
| 2005/0094621 A1* | 5/2005 | Acharya et al. | 370/352 |
| 2005/0190744 A1* | 9/2005 | Sun et al. | 370/352 |
| 2005/0190898 A1* | 9/2005 | Priest et al. | 379/88.18 |
| 2005/0195802 A1* | 9/2005 | Klein et al. | 370/352 |
| 2005/0249196 A1* | 11/2005 | Ansari et al. | 370/352 |

* cited by examiner

MULTIMEDIA ACCESS DEVICE AND SYSTEM EMPLOYING THE SAME

This application claims the benefit of U.S. Provisional Application No. 60/568,428, filed on May 5, 2004, entitled "Multimedia Access Device and System Employing the Same," which application is incorporated herein by reference.

TECHNICAL FIELD

The present invention is directed, in general, to communication systems and, more specifically, to a multimedia access device, a multimedia communication system and a method of operating the same.

BACKGROUND

Computer networks, such as the Internet, are extensively used for storage and retrieval of a vast reservoir of information. Person to person communication, in the form of electronic mail ("e-mail"), has also become widely accepted as a replacement for conventional mail and facsimile. Any individual who has access to the Internet can establish an e-mail account and communicate with other individuals on the Internet.

With conventional forms of telecommunication services, such as communication via a plain old telephone service ("POTS"), person to person communication may be facilitated merely by a calling party dialing a telephone number of a called party via a telephone coupled to the public switched telephone network ("PSTN"). The PSTN provides the communications intelligence and delivery of analog and digital information to end users. In such instances, the calling party and called party may have different local service providers and long distance carriers providing services over the PSTN. In either case, the specific service providers of the calling party and called party are irrelevant as the network providers and communication systems employ standard communication protocols for communication of disparate communication devices over the PSTN.

Similarly, e-mail communications use a standard communication protocol that allows the transmission of messages between users that may have different service providers. A message sender can subscribe to or obtain an account with a first service provider and still send an e-mail message to a recipient even when the recipient subscribes to a second service provider. This is true even when each service provider may have a unique communication protocol to communicate with its own subscribers because the communication between service providers employs a standard communication protocol. For instance, when subscriber A sends a message to subscriber B associated with a different service provider, the service providers negotiate the transmission of the message therebetween employing a protocol common to both service providers.

A new form of e-mail communication, known as instant messaging, is gaining popularity among users of the Internet. As shown in a popular movie, "You've Got Mail," two individuals can engage in an ongoing electronic communication without the need for entering the recipient's e-mail address for each individual transmission. The advantage of instant messaging is that two or more individuals may engage in an ongoing electronic "chat" by simply typing a message on the keyboard and pressing the "Enter" button on the computer keyboard or by clicking on a "Send" icon to the computer display screen. Another popular feature that some Internet service providers offer is activity data that allows a user to monitor another subscriber's activity or presence (i.e., being logged on to a service) on the Internet. Yet another emerging service provided by some instant messaging service providers is voice services between subscribers via an instant messaging client, albeit a limited service capability and feature functionality.

Unfortunately, service providers do not employ a standard communication protocol for instant messaging or activity data. As a result, a particular service provider only supports instant messaging and activity data between its own subscribers. If a user wishes to send an instant message to an individual that subscribes to a second service provider, the user must also subscribe to the second service provider and logon to the second service provider system to engage in an instant messaging session with that particular individual. At the very least, this is a cumbersome procedure. Also, even if an individual subscribes to different service providers, the individual cannot engage in an instant messaging session with participants who are subscribers to the other service providers.

Similar issues are observed in the emerging voice via instant messaging area. Again, the respective instant messaging service providers employ a proprietary protocol to provide basic voice services for their subscriber base. Additionally, the voice services can only be accessed by the subscriber via the use of a complex equipment configuration including a personal computer, microphone, sound cards, speakers and several low level software applications with many inter-dependencies and other compatibility issues.

Regarding the types of communication networks, in the past voice and data communication networks were bifurcated wherein the voice communication networks handled voice traffic and data communication networks handled data traffic including e-mail and instant messaging type messages. The voice communication networks embodied networks such as the PSTN, which is a type of circuit switched communication network, whereas the data communication networks embodied networks such as the Internet, which is a packet based communication network. With the advent of protocols such as the voice over Internet protocol ("VoIP"), transmission of voice-to-voice communications over data communication networks is not only possible, but in vogue. To the contrary, however, communications between conventional voice communication networks and data communication networks is still not seamless. For example, while current instant messaging services allow for voice communications connected directly to data communication networks, telephone calls between a calling party using the PSTN and a called party connected to a data communication network with an instant messaging client, for example, has not been adequately addressed. The following examples further clarify the challenges posed to consumers of disparate services.

Suppose, for instance, that a user in a home environment has a single telephone line into the house. When that telephone line is being used, no other incoming telephone calls can be accepted by any member of the household. It would be useful if the consumer's Internet connection could also be used to facilitate telephone calls to the PSTN and act as a virtual second telephone line, without paying for the expense of having a second hardwired telephone line.

Similarly, suppose that a business would like its employees to have the ability to receive incoming telephone calls while away from the office or, in lieu of a second telephone line to the desktop, when connected to the employer's data communication network. While one solution may be to provide every employee with a cellular phone, the costs would be prohibitive. Since many employees have laptop computers for use away from the office, it would be cost effective and efficient if the employee could use a connection to the Internet or the corporate communication network to participate in telephone calls via the PSTN by using an instant messaging client.

Accordingly, what is needed in the art is a system and method that facilitates communication between users employing disparate communication devices and different service providers, preferably located within the customer premises that allows for onsite or remote configuration. In accordance therewith, it would be advantageous to facilitate communications, albeit voice or data communications, within a home or enterprise environment regardless of the communication transport network to a user thereof. As an example, a system that facilitates voice communications over the PSTN via an instant messaging client would be well received and solve a limitation in the field of computer telephony.

SUMMARY OF THE INVENTION

These and other problems are generally solved or circumvented, and technical advantages are generally achieved, by advantageous embodiments of the present invention which includes a method of establishing a voice communication session with a multimedia access device employable in a multimedia communication system. In one embodiment, the method includes initiating a session request from a first endpoint communication device employing an instant messaging client and coupled to a packet based communication network. The method also includes processing the session request including emulating the instant messaging client for a second endpoint communication device coupled to said packet based communication network. The second endpoint communication device is a non-instant messaging based communication device. The method still further includes establishing a voice communication session between the first and second endpoint communication devices in response to the session request.

In another aspect, the present invention provides a multimedia access device employable in a multimedia communication system. The multimedia access device receives a session request from a first endpoint communication device, coupled to a packet based communication network, employing an instant messaging client. The multimedia access device also processes the session request including emulating the instant messaging client and establishes a voice communication session with a second endpoint communication device, coupled to a packet based communication network, in response to the session request. The second endpoint communication device is a non-instant messaging based communication device.

In yet another aspect, the present invention provides a method of establishing a voice communication session including initiating a session request from a first endpoint communication device coupled to a packet based communication network. The first endpoint communication device is a voice over Internet protocol communication device. The method also includes processing the session request including emulating an instant messaging client for a second endpoint communication device coupled to the packet based communication network. The method still further includes establishing a voice communication session between the first and second endpoint communication devices in response to the session request.

In a related but alternative embodiment, the present invention provides a multimedia access device employable in a multimedia communication system. The multimedia access device receives a session request from a first endpoint communication device coupled to a packet based communication network. The multimedia access device processes the session request including emulating an instant messaging client for a second endpoint communication device coupled to the packet based communication network. The multimedia access device still further establishes a voice communication session between the first and second endpoint communication devices in response to the session request. The first endpoint communication device is a voice over Internet protocol communication device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
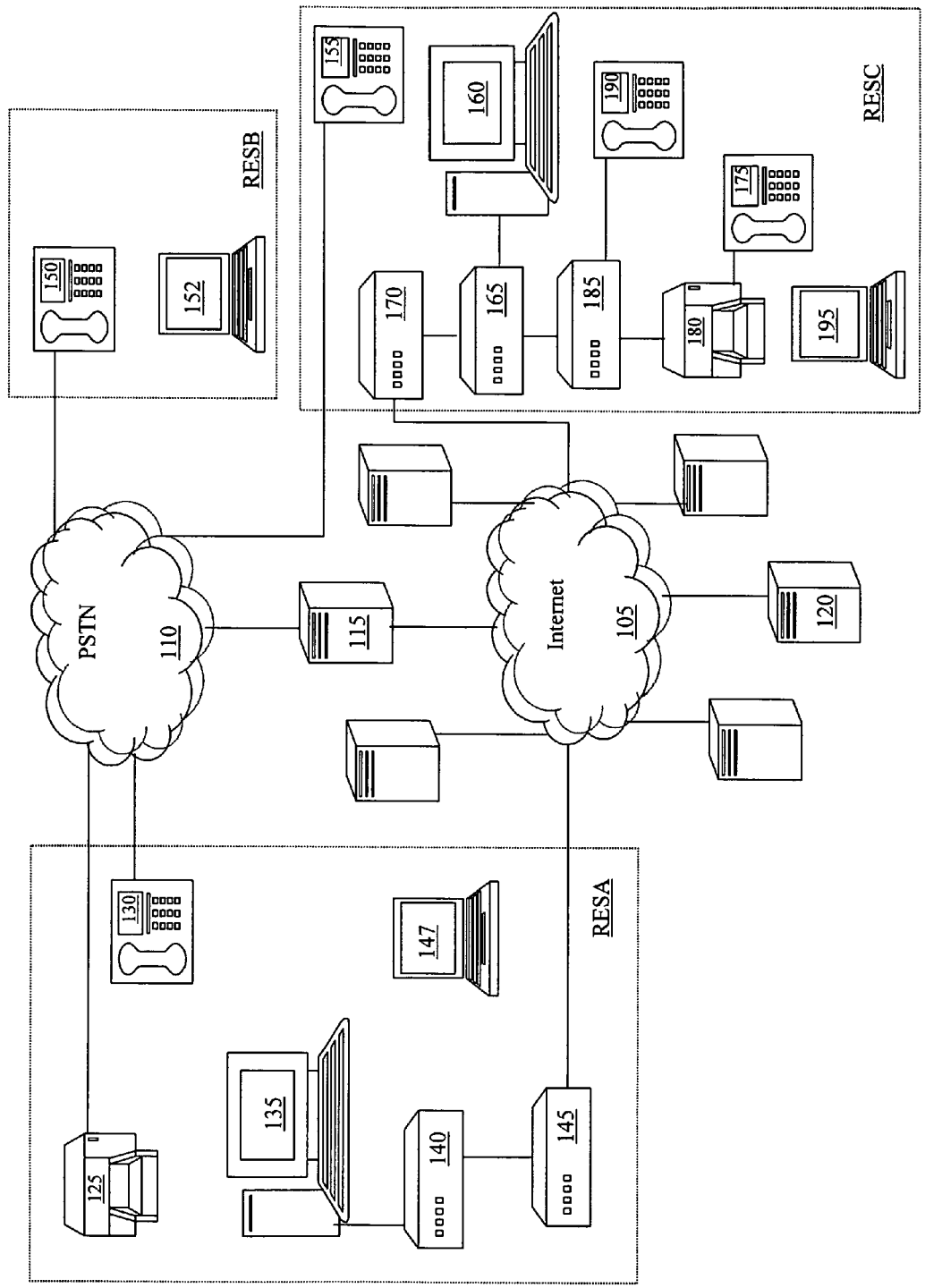
FIG. 1 illustrates a system level diagram of an embodiment of a communication network that provides an environment for an application of the principles of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a multimedia access device, a multimedia communication system and a method of operating the same. While the principles of the present invention will be described in a home environment, it should be understood that the principles of the present invention are applicable in other environments such as a business enterprise.

Exemplary systems, subsystems and modules for delivering the multimedia communication system are embodied in the following systems, namely, the multimedia access device and the management and maintenance server providing user services. The multimedia communication system provides a harmonious networking capability which provides control to its users in terms of selecting the users and prioritizing for cost effective and efficient communications. The multimedia access device provides access and management interfaces towards desired multimedia services and supports router and firewall capabilities as well as business class telephony features.

The multimedia access device may be implemented as a stand alone, "Internet appliance" configuration and supports command line interface ("CLI")/graphical user interface ("GUI") and the application for provisioning and managing the system. The VoIP gateway/switching functionality and instant messaging client support may be implemented on a system on chip ("SOC"), while ethernet switching and analog telephony interfaces may use other subsystems. The management and maintenance server uses distributed processing to achieve a high availability and redundancy capacity. An operating system and language independent architecture may be employed in the management and maintenance server. The management and maintenance server performs registration, authorization, management, maintenance, billing, and configuration for the multimedia access device.

The multimedia communication system of the present invention solves many limitations associated with the field of computer telephony such as facilitating communication between an instant messaging client and an enterprise or home PSTN-compatible endpoint communication device (e.g., an analog telephone). The multimedia communication system can also enable communication between instant messaging clients and the PSTN by accessing a remote PSTN line via an instant messaging client.

Additionally, the multimedia communication system can provide line sharing via a "closed user group" or "virtual private networking" via the Internet from an analog telephone to other endpoint communication devices or instant message clients via the Internet. The multimedia communication system can further enable VoIP-based peer-to-peer voice communication via dial-up connectivity and eliminate a "busy dial-up line" issue. The multimedia communication system still further facilitates voice over WiFi from the home or other remote locations to a central office or enterprise location. The multimedia communication system may still further enable unprecedented visibility and control of the home or enterprise via control of home management devices from distant locations using instant messaging communications.

Referring initially to FIG. 1, illustrated is a system level diagram of an embodiment of a communication network that provides an environment for an application of the principles of the present invention. In the illustrated embodiment, the communication network includes first, second and third customer premises RES A, RES B, RES C, respectively, coupled to the Internet 105 and the PSTN 110. The Internet 105 and the PSTN 110 are coupled via a VoIP/PSTN gateway 115 that provides a translation between protocols inherent to the Internet 105 (in this case, voice over Internet protocol) and protocols inherent to the PSTN 110. A plurality of instant messaging servers (one of which is designated 120), each dedicated to a particular instant messaging service provider (e.g., America Online, Microsoft, Skype, Yahoo, ICQ), provide instant messaging services to respective subscribers and are coupled to the Internet 105.

The first customer premises RESA includes a facsimile machine 125 and an analog telephone 130 coupled directly to the PSTN 110. The first customer premises RESA also includes a desktop personal computer ("PC") 135 coupled via an Internet firewall/router 140 and a direct subscriber line ("DSL") modem 145 to the Internet 105 thereby providing, for instance, a 128 kilo bits-per-second ("kbps") to 256 kbps path for the desktop PC 135. A user of the first customer premises RESA may enjoy instant messaging services as a subscriber, for instance, of Yahoo via the desktop PC 135. A laptop PC 147 employing wireless connectivity is also associated with the first customer premises RESA and a user thereof may enjoy instant messaging services as a subscriber, for instance, of America Online via the laptop PC 147.

The second customer premises RESB includes an analog telephone 150 coupled directly to the PSTN 110. A laptop PC 152 coupled via a modem (e.g., a 56 kbps modem) to the PSTN 110 is also associated with the second customer premises RESB and a user thereof may enjoy instant messaging services as a subscriber to a plurality of service providers via the laptop PC 152. In the present embodiment, a user of the second customer premises RESB may enjoy instant messaging services as a subscriber of Microsoft, Yahoo, ICQ, Skype and America Online via the laptop PC 152.

The third customer premises RESC includes a first analog telephone 155 coupled directly to the PSTN 110. The third customer premises RESC also includes a desktop PC 160 coupled via an Internet firewall/router 165 and a DSL modem 170 to the Internet 105 thereby providing, for instance, a 128 kbps to 256 kbps path for the desktop PC 160. A user of the third customer premises RESC may enjoy instant messaging services as a subscriber, for instance, of Yahoo via the desktop PC 160. Furthermore, a second analog telephone 175 is coupled via a facsimile machine 180 to a VoIP Internet access device ("IAD") 185, which is coupled to the Internet firewall/router 165. Additionally, a third analog telephone 190 is coupled via the VoIP IAD 185 to the Internet firewall/router 165. A laptop PC 195 employing wireless connectivity is also associated with the third customer premises RESC and a user thereof may enjoy instant messaging services as a subscriber, for instance, of America Online via the laptop PC 195.

In the illustrated embodiment, therefore, users employing the laptop PCs 147, 195 associated with the first and third customer premises RESA, RESC, respectively, may participate in an instant messaging session as subscribers to the same service provider (in this case, America Online). Analogously, users of the desktop PCs 135, 160 of the first and third customer premises RESA, RESC, respectively, and a user of the laptop PC 152 of the second customer premises RESB may participate in an instant messaging session as subscribers to the same service provider (in this case, Yahoo). Conversely, a user of the laptop PC 147 of the first customer premises RESA and a user of the desktop PC 160 of the third customer premises RESC cannot participate in an instant messaging session inasmuch as the endpoint communication devices are registered with different service providers, namely, America Online and Yahoo, respectively.

Additionally, multiple instant messaging clients are loaded on to the laptop PC 152 of the second customer premises RESB thereby allowing a communication session with users in the first customer premises RESA (via, for instance, the desktop PC 135 or the laptop PC 147) and the third customer premises RESC (via, for instance, the desktop PC 160 or the laptop PC 195). A three way communication session can even be established with subscribers of Yahoo in the second and third customer premises RESB, RESC. As mentioned above, however, a communication session cannot be bridged between subscribers of Yahoo (desktop PC 135 of the first customer premises RESA) and subscribers of America Online (laptop PC 195 of the third customer premises RESC). A solution, albeit cumbersome, is to initiate two simultaneous conference communication sessions. More specifically, one communication session may be initiated between the laptop PC 152 of the second customer premises RESB and the desktop PC 135 of the first customer premises RESA employing Yahoo as the service provider and another communication session may be initiated between the laptop PC 152 of the second customer premises RESB and the laptop PC 195 of the third customer premises RESC employing America Online as the service provider.

In addition to the typical instant messaging clients, the third customer premises RESC has also installed the VoIP IAD 185 provided by a VoIP service provider. A telephone number has been assigned by the VoIP service provider and a monthly fee is charged for the service. This allows a telephone device (e.g., the third analog telephone 190) coupled to the VoIP IAD 185 to place and receive telephone calls to another analog telephone on the PSTN 110 via the VoIP/PSTN gateway 115 to users of the same or different service providers. Of course, this functionality is limited to endpoint communication devices physically connected to the VoIP LAD 185.

Presently, integrated access devices, in general, do not provide foreign exchange office ("FXO") interfaces. Thus, VoIP enabled telephones do not have backup access to the PSTN 110 and are not enhanced 911 capable. If the integrated access device should lose power or Internet service, the endpoint communication devices (e.g., the analog telephones) attached thereto will become nonfunctional as well. In addition, the endpoint communication devices coupled to the integrated access device cannot receive telephone calls from any instant messaging client. Thus, the third analog telephone 190 coupled to the VoIP IAD 185 in the third customer premises RESC cannot facilitate a communication session with an instant messaging client such as the laptop PC 152 of the second customer premises RESB. Furthermore, broadband applications and services such as firewalls, national address translation ("NAT") functions, bandwidth management, and IP routing are not readily available with integrated access devices such as the VoIP IAD 185.

Figure 2:
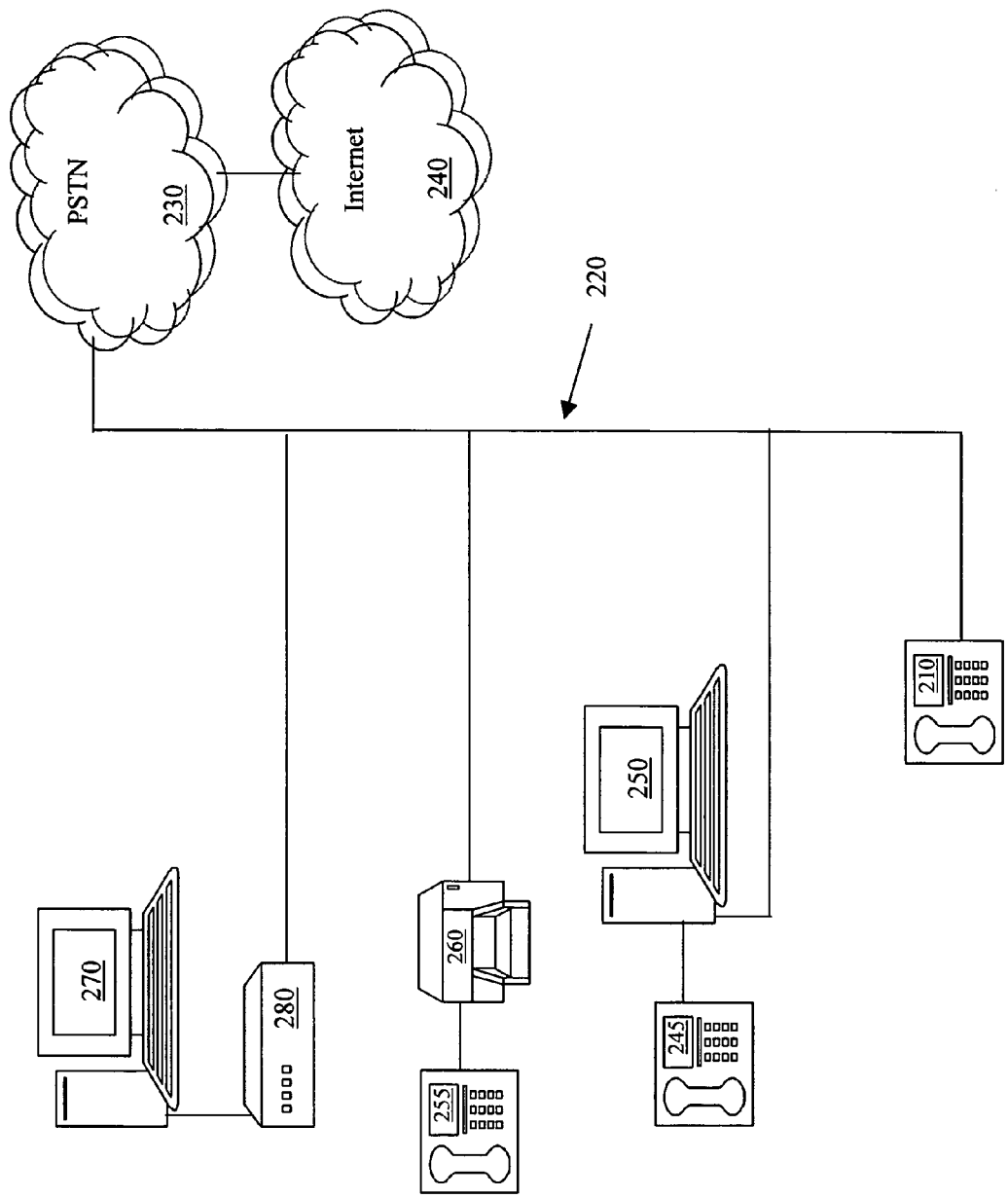
FIG. 2 illustrates a system level diagram of an embodiment of a communication network of a customer premises that provides an environment for an application of the principles of the present invention.

Turning now to FIG. 2, illustrated is a system level diagram of an embodiment of a communication network of a customer premises that provides an environment for an application of the principles of the present invention. A home or enterprise communications network provides local connectivity for access to the Internet or the PSTN in a wired or wireless fashion for telephony appliances and computer and multimedia networking equipment therein. Generally, there are two types of communication network configurations and, in the environment of a customer premises that embodies a home communication network, dial-up or broadband network configurations are most prevalent. Network configurations with dial-up connections often have one personal computer per household, which uses a built-in modem to connect to an Internet service provider. The connection rates typically run 56 kbps per modem line, not taking into account proprietary compression algorithms to speed up hyper-text machine language pages or text pages.

For communication network configurations with multiple personal computers, using a single telephone line to the Internet may create the inconvenience of having to wait for the line to become available. One option to alleviate this limitation is to install a proxy server on one of the personal computers and use the personal computer as a router, or to install a router with a built-in modem, which would effectively allow multiple users to share a single telephone line simultaneously. A typical single line, dial-up home communication network configuration is illustrated in the present embodiment.

The home communication network includes a first analog telephone 210 coupled to a telephone line 220, which is coupled to the PSTN 230 and the Internet 240. A second analog telephone 245 is coupled to a first desktop PC 250, which is coupled via a modem (e.g., a 56 kbps modem) to the telephone line 220. A user of the first desktop PC 250 may enjoy instant messaging services as a subscriber, for instance, of America Online. Additionally, a third analog telephone 255 is coupled via a facsimile machine 260 to the telephone line 220. Furthermore, a second desktop PC 270 is coupled via a modem 280 (e.g., a 56 kbps modem) to the telephone line 220 and a user thereof may enjoy instant messaging services as a subscriber, for instance, of Yahoo and Skype.

Thus, in the environment of the home communication network illustrated in FIG. 2, one telephone line 220 is shared by three potential users. If, for instance, the first or second desktop PC 250, 270 is "on-line," then the telephone line 220 is no longer available for other devices within the home communication network, not even for making a telephone call. If special devices are used to alert of an incoming telephone call, then the Internet connection may be dropped or put on "hold" while the telephone call is answered.

Figure 3:
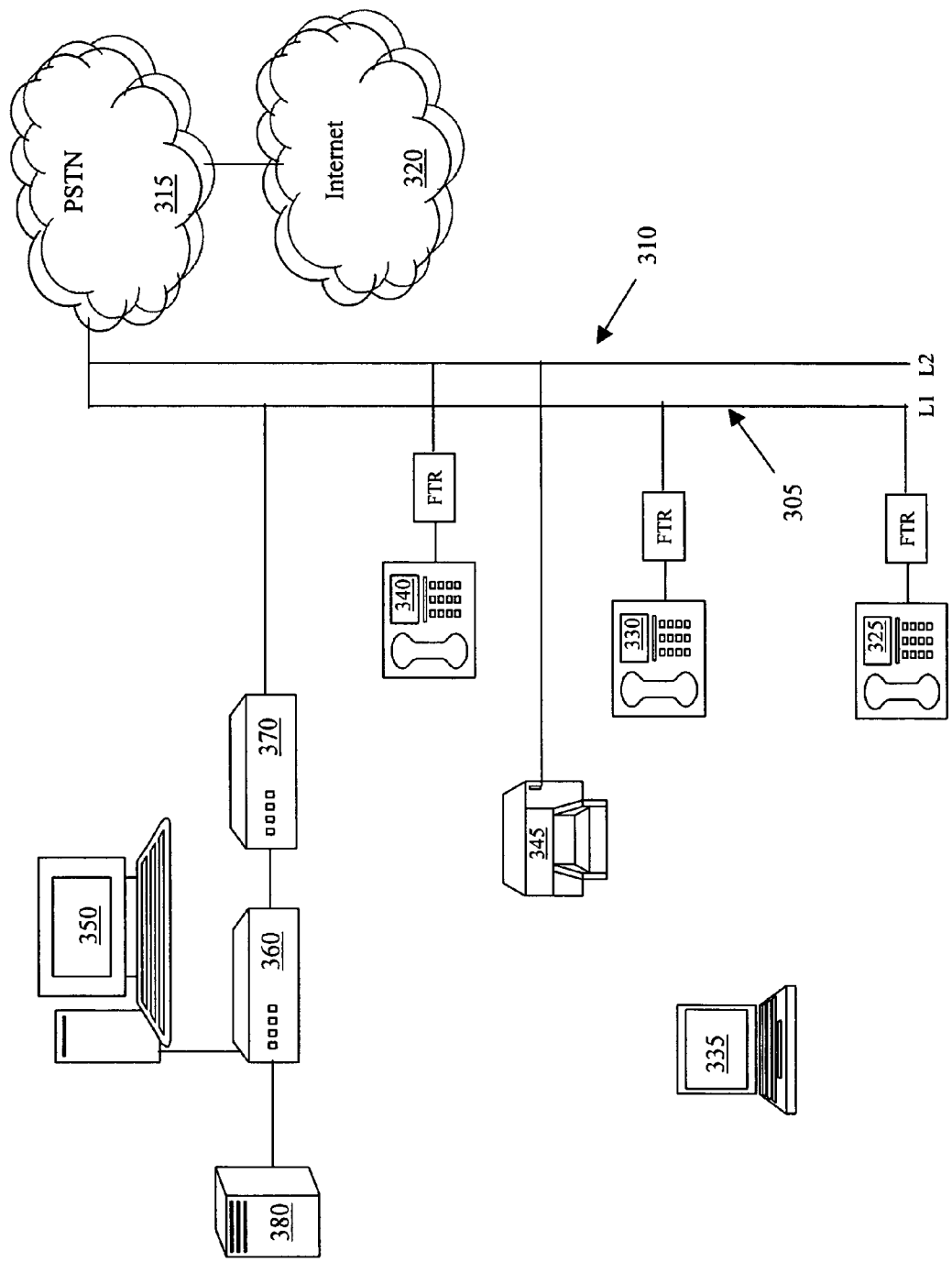
FIG. 3 illustrates a system level diagram of another embodiment of a communication network of a customer premises that provides an environment for an application of the principles of the present invention.

Turning now to FIG. 3, illustrated is a system level diagram of another embodiment of a communication network of a customer premises that provides an environment for an application of the principles of the present invention. Customer premises with broadband access typically have a cable modem, and digital subscriber line ("DSL") or broadband wireless service. This typically provides between 64 kbps to 128 kbps upstream bandwidth and 128 kbps to 1 mega bits-per-second ("Mbps") for downstream throughput. Some customer premises such as a home communication network with broadband access opt to have dual telephone lines to accommodate a home office and employ a separate facsimile line or a private telephone line.

The home communication network includes first and second telephone lines 305, 310 coupled to the PSTN 315 and the Internet 320. A first analog telephone 325 is coupled via a filter (generally designated "FTR") to the first telephone line 305 and a second analog telephone 330 is coupled via a filter to the first telephone line 305. A laptop PC 335 employing wireless connectivity is also associated with the home communication network and a user thereof may enjoy instant messaging services as a subscriber, for instance, of America Online via the laptop PC 335. A third analog telephone 340 is coupled via a filter to the second telephone line 310 and a facsimile machine 345 is coupled to the second telephone line 310 to accommodate, for instance, a home office within the home communication network. A desktop PC 350 is coupled via an Internet firewall/router 360 and a DSL modem 370 to the first telephone line 305. A user may enjoy instant messaging services as a subscriber, for instance, of Yahoo and Skype via the desktop PC 350. Furthermore, a media hub 380 is coupled via the Internet firewall/router 360 and a DSL modem 370 to the first telephone line 305. The interfaces between the Internet firewall router 360 and the desktop PC 350 and the media hub 380 are preferably 100 base-T ethernet interfaces.

The home communication network provides DSL access via the DSL modem 370 and may accommodate multiple PCs with Internet access. A wireless local area network ("LAN;" e.g., a 802.11 wireless LAN wherein 802.11 is a communication protocol and service as promulgated by the Institute of Electrical and Electronic Engineers, which is incorporated herein by reference) may be used to connect multiple laptop PCs (e.g., the laptop PC 335) via the Internet firewall/router 360. The DSL service is provided on the first telephone line 305 and a filter is provided between the telephone outlets and each analog telephone (e.g., the first, second and third analog telephones 325, 330, 340) to reduce any noise and interference caused by the frequency used to provide the DSL connection on the first telephone line 305. Again, the second telephone line 310 may be employed to accommodate a home office within the home communication network.

For users to take advantage of VoIP on a personal computer, a microphone and speaker, or a headset with a built in microphone, may be incorporated into the personal computers. The quality of the microphone/speaker combination will have a significant impact on the quality of the voice conversation. Echo and background noise are typical factors affecting the quality of VoIP communication over broadband lines. As instant messaging services operate today prior to implementing the principles of the present invention, it is not possible to establish a VoIP connection between different instant messaging services. Therefore, a personal computer user that has installed Yahoo and Skype clients, for instance, will not be able to communicate with a personal computer user employing America Online. Additionally, the instant messaging clients do not have free access to PSTN 315, so instant messaging clients can only communicate with other instant messaging clients at best. Also, many of the services do not encrypt the voice conversation between two endpoint communication devices, which is a significant security and privacy issue.

Figure 4:
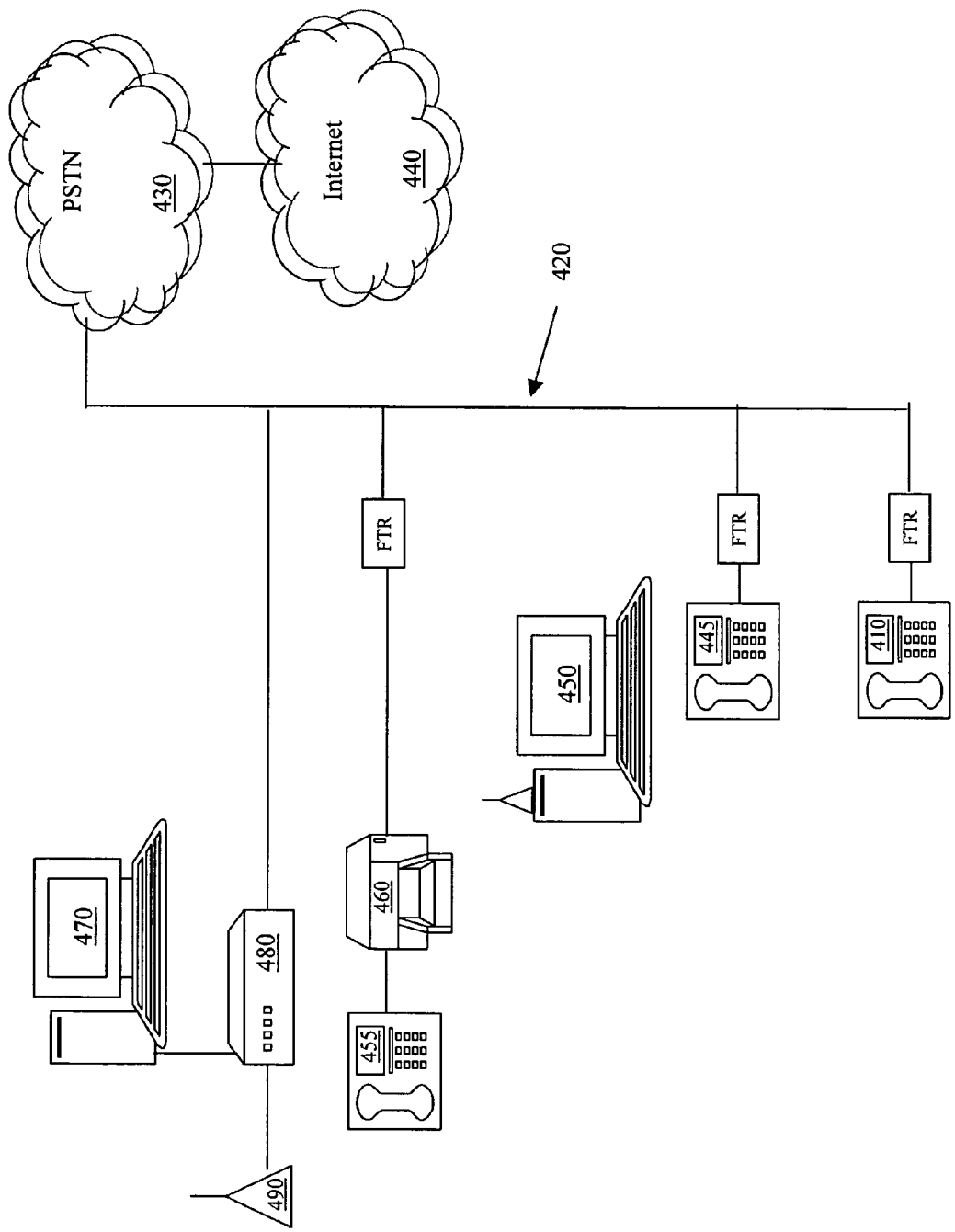
FIG. 4 illustrates a system level diagram of another embodiment of a communication network of a customer premises that provides an environment for an application of the principles of the present invention.

Turning now to FIG. 4, illustrated is a system level diagram of another embodiment of a communication network of a customer premises that provides an environment for an application of the principles of the present invention. Within the communication network is a multimedia access device, which forms a portion of a multimedia communication system constructed according to the principles of the present invention. A typical single line, dial-up home communication network configuration is illustrated in the present embodiment.

The home communication network includes a first analog telephone 410 coupled via a filter (generally designated "FTR") to a telephone line 420, which is coupled to the PSTN 430 and the Internet 440. A second analog telephone 445 is also coupled via a filter to the telephone line 420. A first desktop PC 450 employs wireless connectivity to connect to the PSTN 430 and the Internet 440. A user of the first desktop PC 450 may enjoy instant messaging services as a subscriber, for instance, of America Online. Additionally, a third analog telephone 455 is coupled via a facsimile machine 460 and filter to the telephone line 420. Furthermore, a second desktop PC 470 is coupled, via a 10 base-T ethernet interface, to a multimedia access device 480 including a modem (e.g., a 56 kbps modem), which is coupled to the telephone line 420. A user of the second desktop PC 470 may enjoy instant messaging services as a subscriber, for instance, of Yahoo and Skype. The home communication network also includes an access point (e.g., an 802.11 access point) 490 coupled, via a 10 base-T ethernet interface, to the multimedia access device 480 that provides a wireless access point for the first desktop PC 450. Thus, a user may be wirelessly connected to, for instance, the Internet with the first desktop PC 450 via the access point 490 and the multimedia access device 480. It should also be understood that the use of the filters within the home communication network provides the capability of virtual lines therein. In other exemplary configurations wherein the filters are not employed, similar capabilities may also be achieved via different wiring configurations within the home communication network.

By using the multimedia access device 480, many of the limitations with a single line, "dial-up" network configuration can be overcome. The multimedia access device 480 may include a built in 56 kbps modem, which can be configured to connect to Internet service providers or to other multimedia access devices. Once connected to the Internet, the multimedia access device 480 can allow the analog telephones (e.g., the first analog telephone 410) to place VoIP telephone calls to instant messaging clients that are on-line on the Internet or any other multimedia access device, while, at the same time, allowing regular Internet communication to take place. The multimedia access device 480 uses a variety of high performance, low bandwidth codecs and performs sophisticated traffic management and prioritization, which when combined, increases the quality of a voice conversation, even over a modem line. If bandwidth is exhausted, any additional telephone call attempts will get, for instance, a "busy" tone or "please try call later; bandwidth not available" message.

Figure 5:
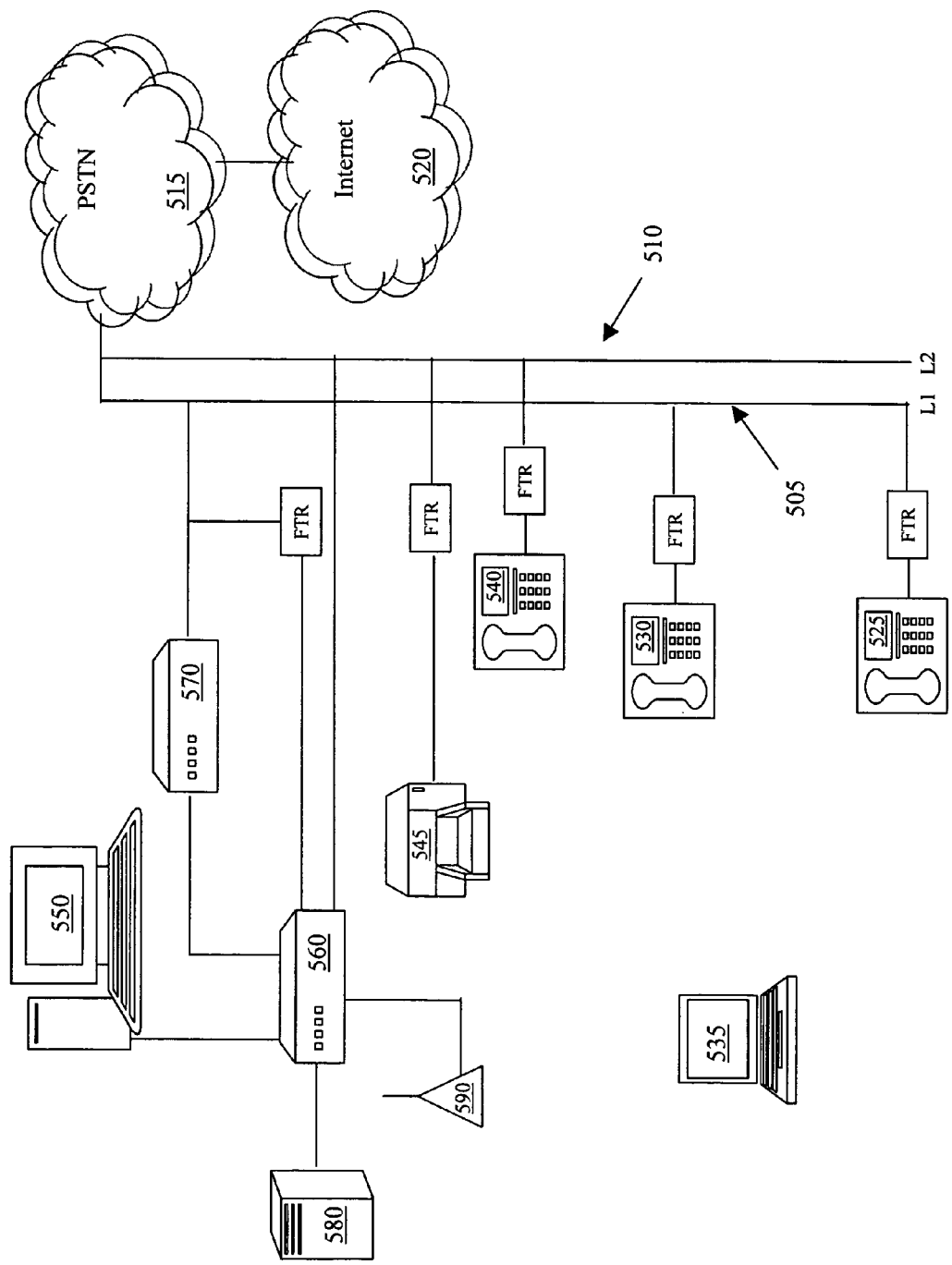
FIG. 5 illustrates a system level diagram of another embodiment of a communication network of a customer premises that provides an environment for an application of the principles of the present invention.

Turning now to FIG. 5, illustrated is a system level diagram of another embodiment of a communication network of a customer premises that provides an environment for an application of the principles of the present invention. Within the communication network is a multimedia access device, which forms a portion of a multimedia communication system constructed according to the principles of the present invention. In the illustrated embodiment, the customer premises is embodied in a home communication network with broadband access having dual telephone lines to accommodate a home office and employ a separate facsimile line or a private telephone line.

The home communication network includes first and second telephone lines 505, 510 coupled to the PSTN 515 and the Internet 520. A first analog telephone 525 is coupled via a filter (generally designated "FTR") to the first telephone line 505 and a second analog telephone 530 is coupled via a filter to the first telephone line 505. A laptop PC 535 employing wireless connectivity is also associated with the home communication network and a user thereof may enjoy instant messaging services as a subscriber, for instance, of America Online via the laptop PC 535. A third analog telephone 540 is coupled via a filter to the second telephone line 510 and a facsimile machine 545 is coupled via a filter to the second telephone line 510 to accommodate, for instance, a home office within the home communication network.

A desktop PC 550 is coupled to a multimedia access device 560 (via a 100 base-T ethernet interface), which is coupled to a DSL modem 570 (via a 10 base-T ethernet interface) to provide connectivity to the first telephone line 505. The desktop PC 550 is also coupled to the second telephone line 510 via the multimedia access device 560. A user may enjoy instant messaging services as a subscriber, for instance, of Yahoo and Skype via the desktop PC 550. Furthermore, a media hub 580 is coupled via a 100 base-T ethernet interface to the multimedia access device 560 and to the first telephone line 505 (via the DSL modem 570). The media hub 580 is also coupled to the second telephone line 510 via the multimedia access device 560. The home communication network also includes an access point (e.g., an 802.11 access point) 590 coupled, via a 10 base-T ethernet interface, to the multimedia access device 560 that provides a wireless access point for the laptop PC 535. Thus, a user may be wirelessly connected to, for instance, the Internet 520 with the laptop PC 535 via the access point 590 and the multimedia access device 560.

The multimedia access device 560 connects to the DSL modem 570, as the Internet firewall/router illustrated above with respect to FIG. 3, as well as to the PSTN 515 via the first telephone line 505. In the illustrated embodiment, the multimedia access device 560 performs basic router and firewall functionality such as network address translation, ethernet switching, and IP port forwarding. The voice functions on the multimedia access device 560 are similar to the features available on high end private branch exchanges ("PBXs") including functions like dynamic call routing, selective call blocking, three way conference calling, least cost routing, multiple voice mail boxes, click to dial, distinctive ringing, caller identification and call forwarding.

Figure 6:
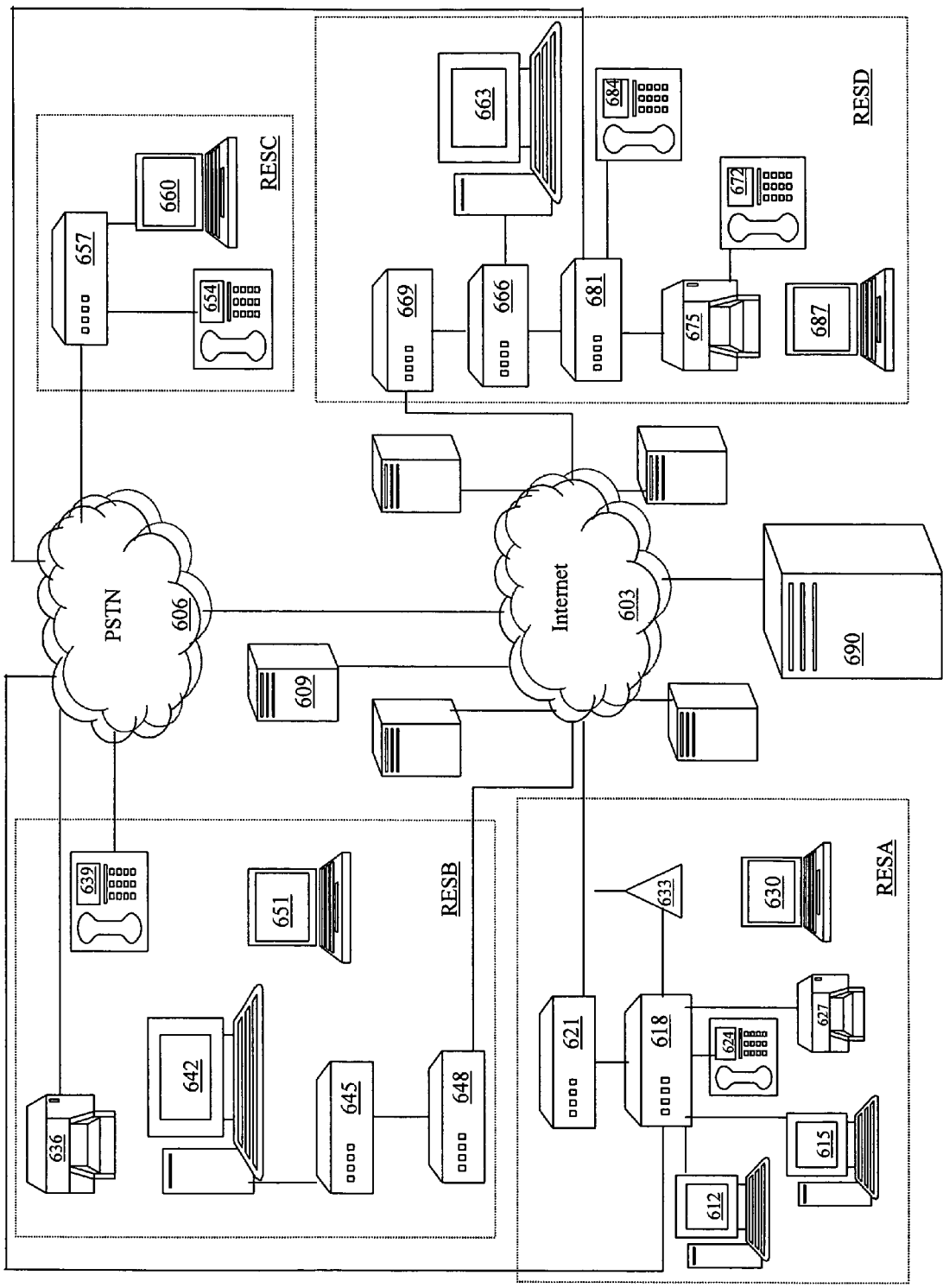
FIG. 6 illustrates a system level diagram of an embodiment of a communication network that includes a multimedia communication system according to the principles of the present invention.

Turning now to FIG. 6, illustrated is a system level diagram of an embodiment of a communication network that includes a multimedia communication system according to the principles of the present invention. In the illustrated embodiment, the communication network includes first, second, third and fourth customer premises RESA, RESB, RESC, RESD, respectively, coupled to the Internet 603 and the PSTN 606. A plurality of instant messaging servers (one of which is designated 609), each dedicated to a particular instant messaging service provider (e.g., America Online, Microsoft, Skype, Yahoo, ICQ), provide instant messaging services to respective subscribers and are coupled to the Internet 603.

The first customer premises RESA includes first and second desktop PCs 612, 615 coupled to a multimedia access device 618, which is coupled to a cable modem 621 to provide access to the Internet 603. A user of the second desktop PC 615 may enjoy instant messaging services as a subscriber, for instance, of Yahoo. An analog telephone 624 and a facsimile machine 627 are also coupled to the multimedia access device 618. Through the multimedia access device 618, the analog telephone 624 and the facsimile machine 627 may participate in a communications session with users of instant messaging services via instant messaging service providers such as Skype and Yahoo. The first customer premises RESA also includes a laptop PC 630 that is wirelessly coupled to an access point 633 (e.g., a 802.11 access point) and to the multimedia access device 618. Thus, a user may be wirelessly connected to, for instance, the Internet 603 with the laptop PC 630 via the access point 633 and the multimedia access device 618.

As illustrated, the first customer premises RESA is employing the multimedia access device 618 with a high degree of functionality. The multimedia access device 618 is coupled to the PSTN 606 and employs the cable modem 621 for access to the Internet. Multiple PCs (i.e., the first and second desktop PCs 612, 615) are coupled to the multimedia access device 618 using a local area network switch, and the analog telephone 624 and facsimile machine 627 are connected to multiple foreign exchange subscriber ("FXS") ports on the multimedia access device 618.

In addition to being used as a standard router and ethernet switch, an 802.11 peripheral component interface ("PCI") card is installed, along with low-level drivers and application software, in the multimedia access device 618 allowing the access point 633 to facilitate wireless communication. While in the illustrated embodiment the access point 633 employs a 10 base-T ethernet interface, it should be understood that other communication systems and interfaces such as an 802.11 interface may also be employed via the PCI card. Two instances of a Skype client, and one instance of a Microsoft client and a Yahoo client are also activated on the multimedia access device 618. Of course, the multimedia access device 618 may have multiple instances (e.g., five) of any combination of clients active at any given time. Also, the multimedia access device 618 can provide a logical association between any of the instant messaging client instances and any of, for instance, the analog telephones.

The second customer premises RESB includes a facsimile machine 636 and an analog telephone 639 coupled directly to the PSTN 606. The second customer premises RESB also includes a desktop PC 642 coupled via an Internet firewall/router 645 and a DSL modem 648 to the Internet 603. As illustrated, a user of the second customer premises RESB may enjoy instant messaging services as a subscriber, for instance, of Yahoo via the desktop PC 642. A laptop PC 651 employing wireless connectivity is also associated with the second customer premises RESB and a user thereof may enjoy instant messaging services as a subscriber, for instance, of America Online via the laptop PC 651. Thus, the second customer premises RESB employs a typical broadband configuration (e.g., within a home communication network) with two active PCs (i.e., the desktop PC 642 and the laptop PC 651), running different instant messaging clients, and the facsimile machine 636 and the analog telephone 639 coupled directly to the PSTN 606.

The third customer premises RESC includes an analog telephone 654 coupled to a multimedia access device 657 and therefrom to the PSTN 606. Through the multimedia access device 657, the analog telephone 654 may participate in a communications session with users of instant messaging services via instant messaging service providers such as Yahoo, ICQ, Skype and America Online. A laptop PC 660 coupled to the multimedia access device 657 and to the PSTN 606 is also associated with the third customer premises RESC and a user thereof may enjoy instant messaging services as a subscriber, for instance, of Microsoft via the laptop PC 660.

Thus, the third customer premises RESC employs a standard dial-up connection to the Internet 603 and is using the multimedia access device 657, which allows a sharing of a modem connection to place VoIP telephone calls using the analog telephone 654 while accessing the Internet 603. Given that multiple low bandwidth codecs are supported by the multimedia access device 657, the user can initiate multiple (e.g., two) simultaneous VoIP telephone calls, one from the laptop PC 660 using, for instance, a Microsoft client and one from the analog telephone 654 to any instant messaging client or multimedia access device on the Internet 603 (since the instant messaging clients are activated on the multimedia access device). As an example, the laptop PC 660 can participate (and initiate) a voice communication session with the analog telephone 624 in the first customer premises RESA via the multimedia access devices 618, 657 associated with the first and third customer premises RESA, RESC, respectively.

The fourth customer premises RESD includes a desktop PC 663 coupled via an Internet firewall/router 666 and a DSL modem 669 to the Internet 603. A user of the fourth customer premises RESD may enjoy instant messaging services as a subscriber, for instance, of Yahoo via the desktop PC 663. Furthermore, a first analog telephone 672 is coupled via a facsimile machine 675 to a multimedia access device 681, which is coupled to the Internet firewall/router 666. Additionally, a second analog telephone 684 is coupled via the multimedia access device 681 to the Internet firewall/router 666. Through the multimedia access device 681, the first and second analog telephones 672, 684 and the facsimile machine 675 may participate in a communications session with users of instant messaging services via instant messaging service providers such as America Online, ICQ, Yahoo and Skype. A laptop PC 687 employing wireless connectivity is also associated with the fourth customer premises RESD and a user thereof may enjoy instant messaging services as a subscriber, for instance, of America Online via the laptop PC 687.

Thus, the fourth customer premises RESD has a broadband connection and has a wireless Internet firewall/router 666. In this instance, the multimedia access device 681 is being used primarily as a VoIP integrated access device, wherein it is coupled to the PSTN 606 as well as to the first and second analog telephones 672, 684 and the facsimile machine 675. The facsimile machine 675 is connected to an FXS port of the multimedia access device 681 and can initiate multiple clients (e.g., Yahoo and Skype) therefrom. Additionally, the multimedia access device 681 can support T.38 and transparent facsimile pass through for facsimile applications. Thus, a user thereof can send facsimiles over the Internet 603 simply by dialing the telephone number of the destination facsimile machine that is also connected to another multimedia access device. In addition, the multimedia access device 681 has America Online and ICQ clients installed for use by the second analog telephone 684, thereby allowing a user to send a facsimile and place a telephone call to VoIP endpoint communication devices at the same time.

The communication network also includes a management and maintenance server 690 coupled to the Internet 603. The management and maintenance server 690 includes a plurality of subsystems that provide various functions for the multimedia communication system. The management and maintenance server 690 serves as a registration server for the instant messaging service providers and provides a customer database associated with the users of the multimedia communication system. Among other things, the customer database stores local calling area information that may be distributed to line sharing users. The management and maintenance server 690 also serves as an instant messaging service client manager and monitors status information for the multimedia communication system. The management and maintenance server 690 also provides billing services, and e-mail and file transfer protocol management functionality.

The multimedia communication system, therefore, provides a distributed system and method for monitoring and analyzing instant message status and presence information in conjunction with, for instance, a public switched telephone network subscriber's directory number for use as a routing and management mechanism for multimedia delivery including voice over Internet protocol, video services and home or enterprise management services. The system and the supporting methodology is applicable to the field of instant messaging and Internet protocol ("IP") telephony, multimedia communication and the combined functional capabilities aligned with corresponding automatic number identification ("ANI") information from the public switched telephone network. A system and the supporting methodology is provided for monitoring, analyzing and utilizing instant messaging user group or "buddy list" status and presence information to route and authorize call scenarios for multimedia delivery. More particularly, the system and method can monitor and analyze instant messaging user group status and presence information in conjunction with a directory number of a PSTN subscriber for use as a routing and management mechanism for multimedia delivery including VoIP and video services.

The system and methodology of the present invention can link instant messaging information (buddy list status and presence) with a user's PSTN directory number to authorize, route and prioritize voice and other multimedia communications over an IP network using both standard PSTN devices and/or computer user interfaces. There is currently a remarkable level of interest and activity in providing a more unified communication solution for consumers and businesses which provides low cost long-distance telephony including multimedia (with video) capability and allows personalized customization and self-management by the users.

The multimedia communication system is intended to provide homes or office environments with advanced telephony features while allowing for telephone calls over the Internet, without the necessity of a computer, dedicated IP phone or integrated access device, or subscriptions to voice over Internet protocol service providers. The multimedia communication system can also provide instant messaging based access and two way communication to home or office management devices connected thereto.

A purpose of a multimedia access device is to allow efficient communications between parties such as friends and family members, or trusted parties within, for instance, a user-defined group or user group. The user group may be a "buddy list" group as discussed herein or directories such as a public directory to obtain routing information to other devices or destinations. The multimedia access device accomplishes the communications by seamlessly integrating either broadband or dial-up access to the Internet, and providing advanced telephony features as well as basic router and firewall functionality.

In addition, the multimedia access device provides flexibility and cost savings in using the Internet and the PSTN. As an example, users can share their PSTN ports with contacts in their user group. This allows the contacts to place calls from their instant messaging clients or multimedia access devices across the Internet, to the calling area that is local to multimedia access devices distributed around the globe. The multimedia access device can be configured to activate this feature during certain hours of the day and to give priority to local calls (calls originating from local FXS ports) using the FXO ports, over calls originating on the Internet. The multimedia communication system enables the instant messaging clients to take advantage of toll-free long distance calling over the IP network using standard analog telephones.

The multimedia communication system includes overlapping stages of system delivery and multiple levels of correlation and management capabilities enabled by the distributed intelligence enabled at the endpoint communication devices and aided by the functional analysis of the status and presence of the instant messaging clients and information provided by the PSTN. The delivery of multimedia services through a combination of system-delivered distributed intelligence which supports analysis, correlation and configuration of access, service type, and routing, and provides that user-defined parameters for such communications are consistent with a system, method and level of control and delivery of advanced and low cost multimedia services to consumers and business users alike.

The multimedia access device is typically located between a user's home or enterprise communications network and the physical and logical networks of the PSTN and the IP network. The multimedia access device may be employed with computer networked (headset and microphone) devices and standard telephone devices (wired and wireless telephone) which can be service authorized and allocated individually, taking advantage of the instant messaging status and presence information afforded by a "buddy list," which provides a closed user group determined, authorized and managed by the end user. The multimedia access device is registered, for instance, by analyzing the user's directory number and unit serial number which is correlated and activated by a management and maintenance server. The multimedia access device can self-register or can be manually registered by the user.

The multimedia access device supports VoIP calling and more advanced multimedia capabilities such as video and broadcast services which are allocated and managed by the distributed systems and methods. Users can define and register for specific custom services and allocate or restrict access to those services based on buddy list preferences. This system and methodology allows multi-user definitions and distribution of services to be allocated per endpoint communication device. The definition and population of the user group can be automatic or through manual intervention and that data and its authorization is permitted through a corresponding client-server based communication methodology which ensures the validity of the endpoint communication device, and compares the corresponding information from the instant messaging client's service provider to provide status and presence relationships between desired user group (buddy list) participants.

Association and discovery functions related to multiple instant messaging clients (such as Yahoo IM, AOL IM, MSN IM, and ICQ IM) are correlated and analyzed to provide the end user with a status and presence information model across any selected instant messaging instance which the user has selected to populate the user group with. The multimedia communication system provides the logical and physical interfaces, memory, and associated intelligence to allow the multi-instant messaging client management, activation of basic and advanced telephony features (e.g., call setup, routing and completion), and the use of multiple human machine interfaces including headset microphone combinations, and standard telephone devices (e.g., telephones for fixed and wireless communications).

The management and maintenance server allows for the registration, authorization and allocation of the endpoint communication devices, which may be correlated by PSTN ANI information and user registration details. The management and maintenance server also provides feature authorization and maintenance functions for billing, software updates and general user maintenance. Specialized and standard dialing rules are created (both numbered and address derivatives supported) to provide basic communications access and for advanced user services activation.

The multimedia communication system includes a multi-point delivery system which enables clients to connect and manage their own level of VoIP communication services while using, for instance, a standard analog telephone. The multimedia access device is typically embodied in the customer premises equipment that integrates routing functions with call processing features employing instant messaging routing techniques to provide, for instance, VoIP communications over a telephone. The management and maintenance server provides web-based operations, administration, maintenance, and provisioning for the multimedia communication system.

The multimedia access device integrates basic router functions and sophisticated call processing and call routing mechanisms with instant messaging technology and peer-to-peer fundamentals to enable VoIP communications from any endpoint communication device at any location to any major instant messaging client or other multimedia access devices on a network such as the Internet. Additionally, the multimedia access device permits a user to share local PSTN ports within their user groups to allow VoIP to PSTN access to any member within the user group, allowing distant user group members to place calls to local regions within the multimedia access device's calling area.

As will become more apparent, the multimedia access device supports voice services such as advanced telephony features (basic class feature set), integrated voice mail systems, and voice port sharing (local) with authorized user group members. The voice features are gateway/endpoint centric features, which means that class 5 features provisioned on the multimedia access device may take priority over the class 5 features assigned by a local service provider. There is seamless interaction of the multimedia access device features with the features provided by the local service provider. For example, the hook-flash will be processed by the multimedia access device first and used in the processing of features provisioned for use thereon. If the multimedia access device determines that the hook-flash may be forwarded (e.g., no applicable features provisioned), then the hook-flash will be signaled to the local service provider.

The multimedia access device also supports instant messenger client emulation, firewall functionality, remote management and multiple physical interfaces such as Ethernet ports, PCMIA slots and USB slots, FXS and FXO ports and IEEE 802.11 b/g interfaces (also wireless WiFi). The multimedia access device can provide static routing, port routing, national address translation ("NAT"), port blocking and mapping, and can support multiple active client instances such as MSN and Yahoo. The multimedia access device may also include a very low bit rate codec (e.g., 6.2 kbps), a global IP sound codec, echo cancellation/silence suppression, multi-way (e.g., four) bridge, and may support multiple (e.g., four) simultaneous calls.

The multimedia access device is configured to route, without limitation, to a local telephone, to the Internet, to a remote multimedia access device, to the PSTN, to a regional routing table, to an instant messaging user group routing table, to accommodate customer preset routing preferences, to an announcement, for encrypted person-to-person calls and for an un-encoded stream for passive monitoring and streaming of data. The multimedia access device also provides the following serviceability functionality, namely, auto registration, general operation via a graphical user interface, personal profile management, user group management, voice mail operations via local and remote control, voice call operations, reliability (and field replaceable unit ("FRU")/swap), security and status indicators and alerts. Also, the multimedia access device provides passive monitoring and streaming of data. The capability of the multimedia access device to provide this intercept capability provides a key advantage in encouraging VoIP subscription service providers into using the multimedia access device in delivering their services.

The management and maintenance server acts as the registration and subscriber application management medium for the distributed multimedia access devices. The management and maintenance server provides, without limitation, user access/class of user, and user group setup/management and authorization for the multimedia access devices. The management and maintenance server can provide access control for a home or enterprise system, billing operations, call detail record consolidation and reporting, administration controlled activation and de-activation of remote multimedia access devices [e.g., registration information consistent with International Telecommunications Union ("ITU") defined E.164], upload regional routing information, and download port sharing information. As an example, the management and maintenance server will update the specific multimedia access devices whose port sharing information has been changed (i.e., by the port owner). In order to reduce traffic thereon, the "port-owner" multimedia access device may update all other multimedia access devices noted on the port owner's user group. With respect to the routing, the management and maintenance server may download routing restrictions which will be applied to the multimedia access device which is sharing its port (i.e., port owner), or download local number prefixes to multimedia access devices that are allowed to share (i.e., shared-user) a specific multimedia access device's port. This will allow the shared-user multimedia access devices to route calls to the "port-owner's" multimedia access device and subsequently allow the call to be routed as a local call.

Regarding port sharing, the multimedia access device will maintain and update the user group for each multimedia access device. Updates can be triggered by any user changes to the multimedia access device user group or port sharing status. The management and maintenance server will allow the owner of the multimedia access device to update the port sharing status of each of the members of its associated user group including port sharing status (Yes/No) per buddy, day range (Monday-Sunday), and time of day permission (24 hour clock).

The management and maintenance server employs a redundant platform with a uninterruptible power supply and provides secure socket layer ("SSL") communications (access). The resource management includes memory, disk drives and sufficient bandwidth. The management and maintenance server may maintain statistics on the number of multimedia access devices, number of IP calls, number of PSTN calls, number of port shared calls, number of contacts (per multimedia access device, average per multimedia access device and instant messenger), and/or number of contacts sharing their port (per multimedia access device, average per multimedia access device and instant messenger). The management and maintenance server may perform load sharing based on, in part, the number of users, average calls per user per day, average number of messages per call, peak hours and the average number of voice feature changes. The management and maintenance server may provide fault detection, nightly backups and automatic switchover upon a fault.

The services provided by the multimedia communication system include self-registration on power-up (multimedia access device), manual registration (user intervention support), user group configuration tool (auto/manual), online help guide, and local (flash random access memory) memory of configuration information. The multimedia communication system is configured to provide VoIP calling capability using a standard PSTN telephone, high quality (toll quality) calls, instant messaging presence and routing capabilities across instant messaging clients, integrated voice mail (multi-user defined), distinctive (personalized) communication service per user, business class telephony features, local port sharing to selective user group members, consolidation of router, firewall, and ethernet switch functions (including WiFi options).

As mentioned above, the multimedia communication system offers voice as an application for their instant messaging clients. The clients employ an endpoint communication device including a home computing device such as a personal computer ("PC") or personal digital assistant ("PDA") with some sort of microphone/speaker combination. Many of the instant messaging clients have trouble establishing a VoIP connection through firewall routers. Either the routers should be configured to open the specific ports that the instant messaging clients need for VoIP communication, or the client has to be reconfigured to match the capabilities of a proxy server.

Voice quality is often an issue as both ends need to have properly tuned audio equipment to reduce echo and noise. Presently, the instant messaging clients either use a proprietary software voice codec or a standard codec available in the operating system. The instant messaging clients conventionally do not support transcoding, which prohibits a multi-leg conference call from utilizing different codecs on each leg of the call. Current instant messaging networks can only communicate with clients employing the same server within the same network (i.e., Yahoo with Yahoo; AOL with AOL).

If a user has multiple clients, such as Yahoo and AOL, installed on their PC, they may be able to establish a multi-way conference call among other users employing the same instant messaging server, but they cannot with conventional systems establish a connection between their Yahoo client and their AOL client. Some instant messaging clients allow access to PSTN lines through the use of a network VoIP gateway. This is primarily for outbound calls. Today, it is not possible to get a call from a PSTN telephone to any of the major instant messaging clients, without significant integration by a third party or a network provider. The multimedia communication system of the present invention addresses and resolves the aforementioned limitations with, for instance, the implementation of the multimedia access device and management and maintenance server.

As mentioned herein, the multimedia communication system can provide multimedia (voice and video) services to users having a PSTN line and Internet access. The multimedia communication system relates the subscriber information from a fixed or wireless line directory number to a specified endpoint communication device and the multimedia access device verifies the endpoint communication device identity to the user identity via the directory number.

Multiple devices within the user (administrators) home or enterprise communications network domain can be connected through the physical connection points on the multimedia access device. The multimedia access device provides interfaces for connection of ancillary devices such as personal computers, user communications devices (telephones) and multimedia adjuncts such as personal video recorders, WiFi access points, routers, etc. and supports unique routing and handling treatments which can be directed by the user towards or from any connected endpoint communication device in the home or enterprise communications network that is connected to the multimedia access device.

Upon confirmation by the multimedia access device, authorization configuration routines are initiated either automatically or via user intervention, which registers the multimedia access device with a management and maintenance server and allocates specific communications permissions and capabilities to the multimedia access device based on a selectable user subscription package. Connection to instant messaging servers provides automatic population of the multimedia access device instant messaging translator user group which extracts profile and status information to enable intelligent correlation via the multimedia access device's own logic engine. The user (administrator) of the multimedia access device can assign additional "virtual numbers" to specific parties (additional users) who reside within the home or enterprise communications network domain and provide each with their own logon and passwords.

Based upon the user's own PSTN assigned directory number, more than one virtual phone number may be assigned which is related to an instant messaging assigned subscription and can be routed to a specific user within the multimedia access device's user defined operational domain (home or enterprise communications network). In effect, the multimedia access device interprets the incoming call request against the instant messaging client identity, PSTN directory number, examines the last (additional) digit for user assignment in the multimedia access device's own authorization list, routes and applies any special service treatments (unique ringing, etc.) to a specific user's telephone or redirects the call as specified to either other telephones or a voice mailbox.

Each user can populate an individual user group of profiles specific to their own interest and the list is made available to that user based on logon and password access. Unique call treatments (routing, handling and ringing) can be assigned per user group member as well as assigned per multimedia access device user. By polling instant messaging status (presence and status) information periodically or upon user connection demand, the "status" and "presence" (state) of selected members of the predefined closed user group are compared for a go, no-go, or treatment and routing option which provides call or communications handling.

The multimedia access device provides an interpretation of multiple instant messaging client types (Yahoo, AOL, MSN, and ICQ) and other user distributed communication clients such as Skype. The multimedia access device allows multiple instances of client operations simultaneously which allow the relay of status information for each instance of the client requested by the user's input of the user group information.

The management and maintenance server provides associative registration confirmation and acknowledgments towards the distributed multimedia access devices which include the user information regarding the user group and authorization parameters for each user of the multimedia access device. Communication logging (call logs) is collected for each multimedia access device and call detail records ("CDR") are assigned per multimedia access device to provide a tracking and billing mechanism.

Call treatment for incoming and outgoing communications can be defined per user and associated with a user group which permits access, restricts access, and provides time of day access to selected buddy list members in a closed user group fashion. Routing (hunting) and redirection of calls through call treatment handling is also associated with individual users of the multimedia access device and can be assigned per user group member and can be assigned for custom ring treatments as well as voice mail handling. Localized access to PSTN circuits can be authorized to user group members by each specific user of the multimedia access device. Routing of calls to allow local PSTN port access using the buddy list can be assigned by user for time-of-day and length-of-call access. Prioritizations can also be identified and assigned to user group members by each individual employing a multimedia access device.

Based upon the user's own PSTN assigned directory number, specific call handling characteristics can be created and assigned to individual buddy list members which include routing, time-of-day access, and local PSTN calling access within the multimedia access device's user-defined operational domain (home or enterprise communications network). In effect, the multimedia access device interprets an incoming call against the incoming instant messaging client's identity and PSTN directory number, and correlates this information with a routing and call handling table in the multimedia access device to provide or deny access to communication through the local PSTN port (local port sharing). If access is denied, a text or voice message is supplied to inform the calling party of restricted access. If the access is permitted, the calling part is connected through the multimedia access device's PSTN port to allow connectivity within the local dialing plan area.

The multimedia access device supports caller identification when a call or multimedia transfer is originated from an instant messenger. When a user of an instant messaging service makes a multimedia connection "call" to a multimedia access device user, the caller identification for that user may be the number (information) entered into the profile of the originating user and may be displayed as such. The multimedia access device correlates and interprets originating and terminating caller identification information and delivers that information to a display on a terminal, display enabled telephone or computer. This information can be from the profile of the instant messenger user data (telephone field), the directory number of a PSTN caller, or the information supplied from another multimedia access device user (either directory number or virtual directory number).

Selection of least cost routing of long distance calls using the user group and remote multimedia access device, which allow localized PSTN port access, are correlated and the path identified through analysis of the originating PSTN directory number, the multimedia access device user identity, and the destination call identification (which is compared to the user group members). Thereafter, the call treatment and selection is identified and the call is established using the routing and treatment options which are translated and compared between the users and user group member's user defined call handling specifications. Adaptation analysis for the originating and terminating voice codecs is made and automatically assigned based on best quality availability and the capabilities and routes used between parties. Having just introduced a comprehensive overview of the multimedia communication system, a more detailed description of the systems, subsystems and modules that form exemplary embodiments of the multimedia communication system will hereinafter be provided.

Figure 7:
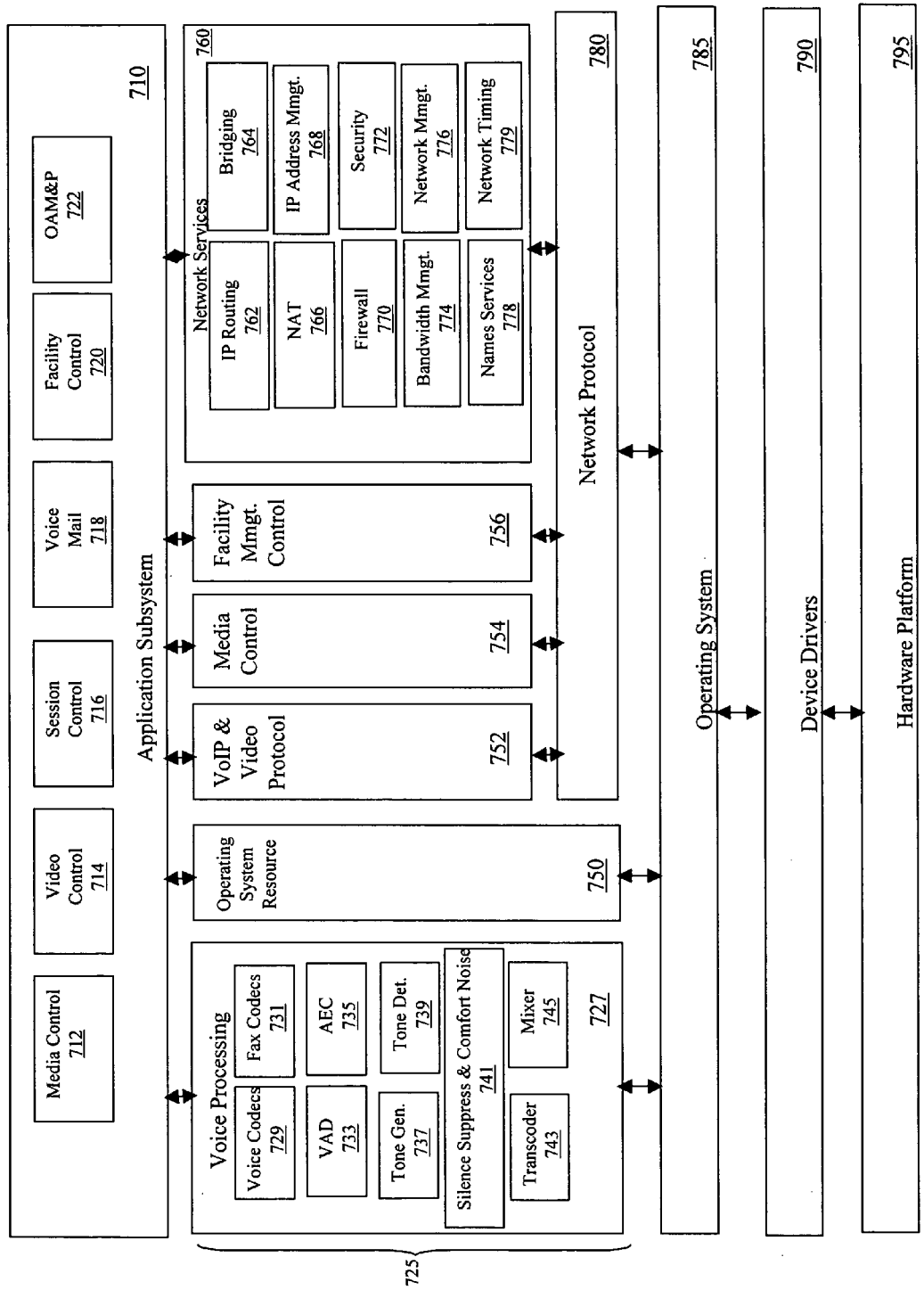
FIG. 7 illustrates a functional block diagram of an embodiment of a multimedia access device in accordance with the principles of the present invention.

Turning now to FIG. 7, illustrated is a functional block diagram of an embodiment of a multimedia access device in accordance with the principles of the present invention. The illustrated embodiment introduces the various systems, subsystems and modules that form the multimedia access device. An application subsystem 710 represents executable programs and modules that provide user level features and functions to users and interfaces for the multimedia access device.

A media control module 712 of the application subsystem 710 provides the capabilities to create and manage media streams. A video control module 714 provides the capabilities to create and manage video streams and related control functions. A session control module 716 provides session and call control for the multimedia access device, and manages call processing feature iterations. The session control module 716 also provides an instant messaging agent that provides multiple variants of instant messaging clients that interact with instant messaging service providers, servers and the management and maintenance server and provides a near real time active environment for exchanging information between instant messaging clients.

The application subsystem 710 also includes a voice mail module 718 that provides the logic, features and resource control for voice mail features associated with the multimedia access device. A facility control module 720 provides the program logic to enable home or enterprise management and monitoring services. Additionally, an operations, administration, management and provisioning module 722 provides user interfaces and logic programs to enable the administration, monitoring, provisioning and management (also referred to as "OAM&P") of the multimedia access device. Of course, the applications subsystem 710 may support other applications associated with multimedia access and control thereof.

The multimedia access device also includes a resource subsystem 725 that provides functionality and resources to support the systems, subsystems and modules for the multimedia access device and the related applications therefor. As an example, the resource subsystem 725 accesses selected protocols and digital signal processing techniques when employed by one or more applications to perform the intended functions. In the illustrated embodiment, the resource subsystem 725 includes a voice processing subsystem 727 that provides resources and functions that facilitate voice communications and call processing. For instance, voice coder/decoders ("codecs") 729 such as a G.711 codec or G.728 codec according to International Telecommunications Union-Telecommunications Standardization ("ITU-T") recommendations promulgated in November 1988 and September 1992, respectively, perform conversion of the voice signals, as necessary, for the transmission and reception thereof. Similarly, facsimile codecs 731 such as a T.38 codec according to ITU-T recommendations promulgated in June 1988 perform conversion of the facsimile data signals, as necessary, for the transmission and reception thereof. The aforementioned recommendations and other recommendations, standards and references disclosed herein are incorporated herein by reference.

A voice activity detector (also referred to as "VAD") 733 provides a process that detects the absence of voice and speech, and signals a comfort noise generator to generate a small amount of ambient noise on a telephone receiver. An audio echo canceller (also referred to as "AEC") 735 provides a process that monitors audio/voice streams for echo indications and cancels out any detected echo. A tone generator 737 is employed to generate dual-tone multifrequency tones and other facsimile and call processing tones in voice/audio streams. A tone detector 739 is used to monitor and detect dual tone multifrequency ("DTMF"), facsimile and other call processing tones and signals.

The voice processing subsystem 727 also includes a silence suppression and comfort noise module 741 used to generate "comfort" noise on the receive side of a telephone packet call, to offset silence, which may be distracting to a called party. A transcoder 743 is used to match compressed voice streams that use one particular compression standard, such as G.728, with endpoint communication devices that use a different compression standard, such as G.711. A mixer 745 is used to mix various voice streams for the purpose of conferencing (such as three way calling) calls together.

The resource subsystem 725 also includes an operating system resource module 750 that includes low-level operations provided by the operations system such as random access memory ("RAM") management, persistent (such as disk or non-volatile RAM) data management, multi-thread processing, message queue management and other functions.

In accordance therewith, the resource subsystem 725 includes a VoIP and video protocol module 752 that provides signaling protocols used to establish, control and release VoIP and video communication sessions. As an example, the signaling protocols include a session initiation protocol promulgated by the Internet Engineering Task Force ("IETF") request for comments ("RFC") 3261 during June 2002, and H.263 video coding standard according to ITU-T recommendations promulgated during May 2003.

The resource subsystem 725 further includes a media control module 754 that provides the real time and near real time protocols and functionality to establish, control and release audio/voice, facsimile and video streams. For instance, voice streaming protocols such as real-time transport protocol ("RTP"), IETF RFC 3550 (July 2003) provide a packetized method for providing real time delivery of audio streams. Also, real time streaming control protocols provide performance and quality of service information for real time audio and video streams. Additionally, video streaming protocols provide a packetized method for providing real time and near real time video streams.

The resource subsystem 725 still further includes a facility management control module 756 that provides signaling and monitoring protocols used to monitor, interact with, and control devices deployed throughout a home or enterprise environment. The aforementioned devices include video monitoring sources, motion detectors, door status detectors, heating and air conditioning systems, and alarm systems. The facility management signaling protocols provide methods of communicating with the monitoring and control devices. The facility management monitoring protocols also provide methods of monitoring the status of the systems and devices in the home or enterprise environment.

The resource subsystem 725 still further includes a network services module 760 that provides network service functions used to provide basic Internet and broadband functions as employed by the applications and interfaces. An IP routing module 762 provides a process that supports the efficient routing of IP packets into and out of the multimedia access device. A bridging module 764 provides a process that enables the multimedia access device to support other IP devices that are bridged onto the multimedia access device. A network address translation (also referred to as "NAT") module 766 provides application level translations from public to private and from private to public of IP address information on IP-based protocols. An IP address management module 768 provides for the dynamic assignment and allocation of IP addresses to external "downstream" devices. An example methodology for rendering this function is provided in accordance with the dynamic host configuration protocol ("DHCP").

The network services module 760 also includes a firewall module 770 that provides real time detection and prevention of undesired IP-based intrusions and a security module 772 that provides secure encryption processing of IP-based interactions. A bandwidth management module 774 manages the bandwidth utilization over the IP-based interfaces, placing a priority on data that is real time sensitive verses data that can tolerate minor delays. A network management module 776 provides a communication and processing interface for controlling and managing the multimedia access device. Exemplary protocols used for managing the multimedia access device include simplified network management protocol ("SNMP") version 2 promulgated by IETC RFC 3416 (December 2002). A names services module 778 manages requests for domain name resolution and routing of IP-based communications. A network timing module 779 interacts with network time servers using the Internet based protocols such as the network time protocol (IETF RFC 1305, March 1992) to establish and maintain an accurate time of day clock for the multimedia access device.

The resource subsystem 725 also employs a network protocol module 780 that provides protocol specific message formatting, network messaging, timing, acknowledgment mechanisms and other protocol related functions associated with various network protocols used by other subsystems and applications that send and receive signals to devices in communication with the multimedia access device. Some of the protocols that are most prevalent and may be employed in conjunction with the network protocol module 780 are set forth below.

IP-based protocols such as Internet protocol version 4 (IETF RFC 791, September 1981) and transmission control protocol (IETF RFC 793, September 1981) are used to interact with other IP-based networks and devices. Dial-up protocols such as ITU-T recommendation V.92 (July 2000) facilitate dial-up modem to dial-up modem communication. Wireless protocols such as WiFi, as promulgated in accordance with the Institute of Electrical and Electronic Engineers ("IEEE") standard 802.11 (1997) facilitate wireless networking. Wireless quality of service protocols ("QOS") such as IEEE 802.11.e (draft specification) facilitates the implementation of quality of service management for, in this case, IEEE 802.11 wireless interfaces.

Facility management protocols such as X.10 enable interaction with facility management devices and appliances such as lighting, climate controls, and alarm systems for controlling, monitoring and managing the facility. PSTN protocols provide control and event detection line signaling for PSTN interfaces such as the FXS and FXO interfaces, and further enable call processing subsystems to interact with telephone appliances and the central office line. Network timing protocols provide low level network timing protocol message encoding, decoding and timers as necessary to support the network timing module 779. Security protocols such as the protocols identified in IETF RFC 2402, IPsec, (November 1998) provide the low level security and encryption to enable secure IP communications.

The multimedia access device also includes an operating system 785, such as embedded in a Linux environment (e.g., commonly referred to as "embedded linix," an example of which is "uClinix"), that enables an interaction of the devices coupled to the multimedia access device with the systems, subsystems, modules and applications therein and with other remote devices coupled to the multimedia access device. The multimedia access device also includes device drivers 790, such as PSTN device drivers, that provide the low level interaction between hardware devices and the systems, subsystems, modules and applications of the multimedia access device. Some exemplary device drivers 790 are set forth below.

Video/audio device drivers provide the low level interaction for audio and video interfaces. Wireless and PSTN device drivers provide the low level interaction for WiFi and PSTN interfaces, respectively. Disk drivers manage the low level input/output functions on persistent storage devices. Display drivers provide the low level input/output with the display devices such as the video display and light emitting diode status indicators. Also, ethernet device drivers, such as the local area network interface drivers, provide the low level input/output interaction with ethernet interfaces. Of course, other device drivers may be employed to augment the functionality and capabilities of the multimedia access device.

For purposes of illustration, the following table provides an exemplary set of features available with a multimedia access device according to the principles of the present invention.

TABLE I

Exemplary Features for the Multimedia Access Device

| Feature | Notes |
| --- | --- |
| Status message | Instant messaging status display |
| Call hold | This feature allows a call to be placed on "hold" - either to interrupt the conversation momentarily or to place another call without disconnecting the current call. |
| Call transfer (blind transfer) | The transfer mechanism functions in the "blind transfer mode," i.e., the user invokes the transfer mechanism via a hook-flash and service code, dials the number, hears a confirmation tone, and hangs up the call. If the user does not hang up the call, the multimedia access device releases the caller invoking the call transfer. |
| Call transfer (blind transfer with screening) | The multimedia access device may perform call screening on the transfer request and attempts to route the far end party to the transfer destination. The call screening and routing for the transfer request is based upon the subscriber's profile of the party invoking the transfer request. The party invoking the transfer does not have knowledge of the final disposition of the transferred call. |
| Call transfer (with consultation) | This feature allows the user to transfer a call to any other number (via PSTN or IP). It's very useful for handling misdirected calls, or for allowing a caller to complete multiple tasks on the same call. For courtesy, the feature allows you to speak to someone at the number you're transferring to before you complete the transfer. |

TABLE I-continued

Exemplary Features for the Multimedia Access Device

| Feature | Notes |
| --- | --- |
| Call forwarding (unconditional) | The call forwarding feature allows the subscriber to redirect all calls routed to a terminating line to another destination address. This number may be an IP endpoint communication device on the port owner's buddy list or it may be an E.164 number not controlled by the multimedia access device. In the latter case (i.e., another PSTN number), the multimedia access device is configured with two or more lines. |
| Call forwarding (unconditional via web based access) | Invoking and configuring this option may be via web based access. |
| Call forwarding (with screening) | As the call forward is processed, the "forward to" destination number may be screened as an outbound call from the forwarding party and routed via session initiation protocol (SIP) or media gateway control protocol (MGCP) to another number or subscriber via the PSTN. |
| Call forwarding on busy | This feature provides the same functions as unconditional call forwarding, but is invoked if the terminating line is in a busy state. If the call forward on busy feature is assigned to the terminating line and the line is busy, the multimedia access device routes and forwards the call to the assigned destination via either SIP or MGCP or via the PSTN (assuming an FXO port is available). |
| Call forwarding no answer | This feature provides the same functions as unconditional call forwarding, but is invoked if the call reaches a ring no answer state. If the call forward no answer feature is assigned to the terminating line, the multimedia access device starts a no answer timer and if the timer expires, the multimedia access device routes and forwards the call via SIP or MGCP or via the PSTN (assuming an FXO port is available) to the assigned destination. If the call is answered, the timer cancels and no additional action related to the call forwarding is taken. |
| Call forwarding no answer (user defined timing) | The number of ring cycles to wait before declaring a ring no answer state may be configurable by the user. The supported range of ring cycles to wait is 2-20 rings. The timer value for each designated ring cycle is six seconds. |
| Selective call forwarding | This feature provides the same functions as unconditional call forwarding but is invoked upon the identity of the inbound calling party. The system supports a selective call forwarding list containing up to ten different entries with each entry supporting a unique forwarding destination number. |
| Selective call forwarding (alternate forwarding) | If the inbound calling party is not found in the selective call forwarding entries, the call is processed to the subscriber, with other possible terminating feature exceptions invoked. |
| Selective call forwarding (forward to voice mail) | The system provides a voice mail option for each call forward entry. If this option is selected and if this calling party calls, the call is transferred to voice mail. This will function as selective do not disturb. |
| Caller identification | This feature provides the delivery of the caller identity of the calling party to the subscriber on inbound calls. The multimedia access device maps the caller identity from the inbound SIP INVITE message, using the SIP From: header, or in the case of calls originated from other MGCP lines, may retrieve the identity, the E.164 if assigned from the multimedia access device buddy list, and signal this parameter to the user via MGCP 1.0 signaling. |

TABLE I-continued

Exemplary Features for the Multimedia Access Device

| Feature | Notes |
| --- | --- |
| Caller identification (caller name delivery) | Inbound caller names may be mapped from SIP or retrieved from the multimedia access device buddy list and signaled to the terminating line. |
| Caller identification and caller name blocking (SIP terminations) | This feature allows the subscriber to block the delivery of caller identification and caller name on outbound calls. For SIP based terminations, the multimedia access device sends the caller identity and the caller name but the multimedia access device indicates, via SIP, that the calling party name and caller identification remains private. |
| Caller identification and caller name blocking (MGCP terminations) | For MGCP terminations, the multimedia access device delivers the word "anonymous" instead of the calling party identification or name via MGCP when this feature is invoked. This feature can be enabled via two methods. The subscriber can assign this option via their web profile, or to invoke this feature on a call by call basis, the subscriber can dial the *67 service code before dialing the called number. |
| Three way conference calling | Three way calling allows the user to set up a call between themselves and two other parties, using just a single line and a standard telephone. |
| Distinctive ringing | This feature allows the subscriber to assign a different ring tone to each directory number connected to the multimedia access device. |
| Do not disturb (general) | This feature allows the subscriber to block all calls from terminating to his telephone. |
| Do not disturb (codes/web interface) | The subscriber will be able to use the appropriate star codes and the web interface to block and unblock calls. |
| Announcements | The multimedia access device provides announcements to inform the user as to the treatment of a call. |
| Announcements (IVR capability) | The multimedia access device provides an interactive voice response (IVR) feature to allow the user to navigate to desired features. |
| Originating routing and restrictions | The multimedia access device chooses an origination route based on the FXO port availability - if an FXO port is available, the call will be originated. By default, the multimedia access device attempts to route an origination call via IP. If the destination is not on the multimedia access device's buddy list, then the call will be routed over the PSTN. |
| Originating routing and restrictions (call types) | The call types that may be configured as not allowed on a per module basis include:<br>.011+<br>.900<br>.8xx<br>.976. |
| Terminating routing and restrictions (proximity based) | The multimedia access device allows the termination of calls based on proximity - after determining all of the communication ports available to handle a port sharing call, the multimedia access device utilizes the owner's port that is closest to the originating owner. |
| Terminating routing and restrictions (number of ports) | The number of ports - after determining all of the endpoints available to handle a port sharing call, the multimedia access device utilizes the owner's gateway which has the largest number of ports. |
| Terminating routing and restrictions (availability) | Availability of ports will take precedence over proximity unless otherwise specified in the multimedia access device profile. |

The multimedia access device also includes a hardware platform 795, an example of which is set forth below with respect to FIG. 8. Thus, the systems, subsystems and modules of the multimedia access device communicate through application programming interfaces ("APIs") and employ functions, resources, protocols and interfaces to achieve the desired purposes for the multimedia access device.

Figure 8:
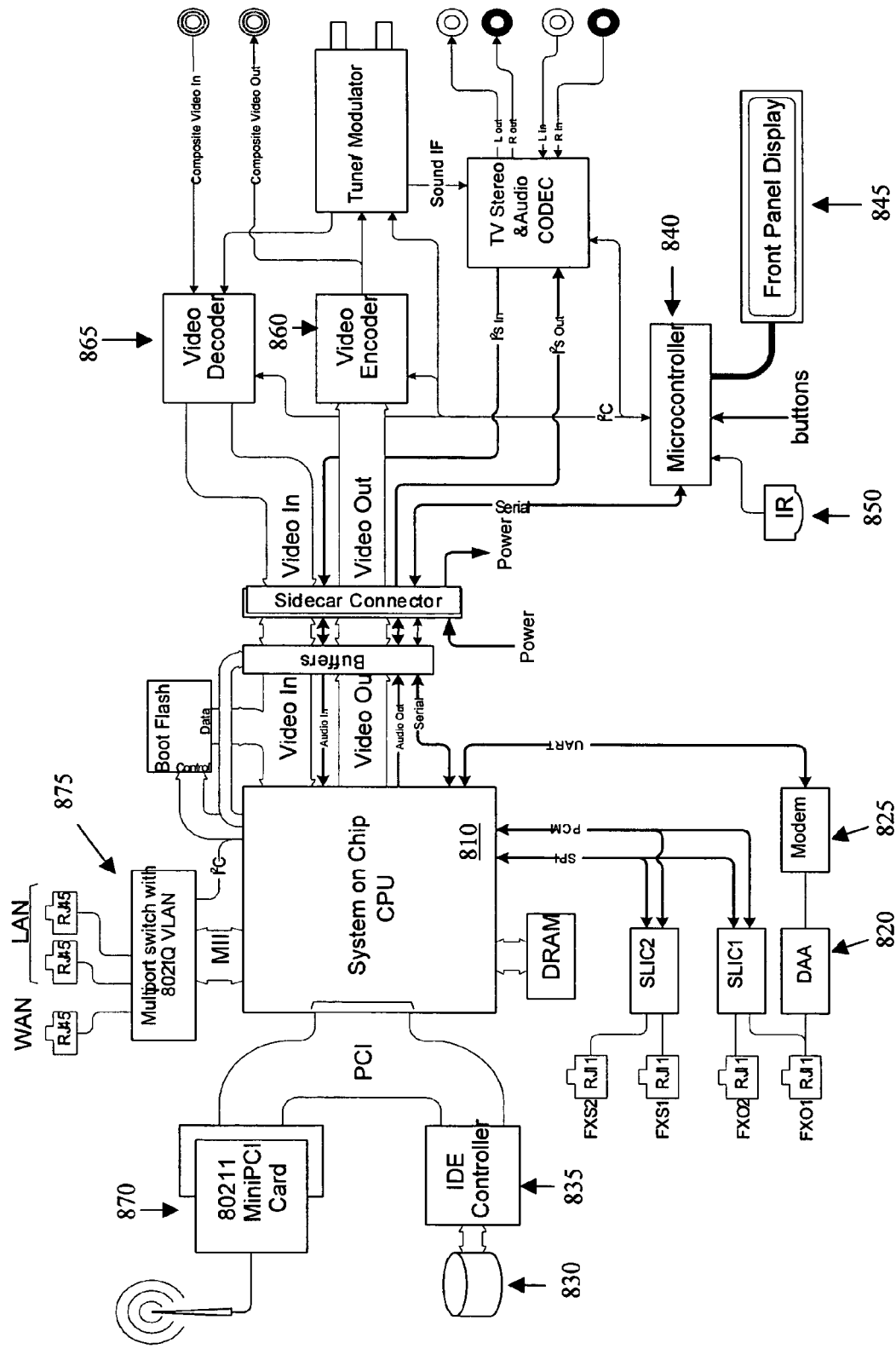
FIG. 8 illustrates a block diagram of an embodiment of a hardware platform of a multimedia access device in accordance with the principles of the present invention.

Turning now to FIG. 8, illustrated is a block diagram of an embodiment of a hardware platform of a multimedia access device in accordance with the principles of the present invention. In the illustrated embodiment, a system on chip central processing unit ("CPU") 810 has embedded processing elements, digital signal processor resources and memory and is used to provide the necessary resources to implement instances of multiple instant messaging clients that have been modified to run on an embedded operating system. As a result, a standalone appliance may mimic the presence of multiple instant messaging clients within a multimedia access device and communicate and control voice/video/home/enterprise endpoint communication devices via interfaces as depicted herein. The CPU 810 is coupled to external interfaces such as FXO and FXS ports of the multimedia access device via internal hardware interfaces such as a data access arrangement (also referred to as "DAA") 820 for a modem 825. The CPU 810 is also coupled to a random access memory ("RAM")/disk 830 for data storage via an integrated device electronics ("IDE") controller 835. Additionally, the CPU 810 is coupled to a microcontroller 840 for controlling a front panel display 845, an infrared interface 850, and a user status and control panel (via, for instance, the front panel display 845).

As mentioned above, the multimedia access device provides an in-premises footprint enabling the service connectivity and local management to client(s). The implementation of functions and the related control such as a router (with quality of service (QoS)), firewall, VoIP gateway, voice services and voice mail may be embodied and performed within the CPU 810.

The multimedia access device is advantageously provided with an embedded operating system that provides operating system functions such as multiple threads, first-in first-out or round robin scheduling, semaphores, mutexes, condition variables, message queues, and a uniplex information and computer services ("UNIX") device driver model. The multimedia access device may provide tools that assist developers' focus on solving application related problems rather than development environment related problems. The development environment may include the following basic functions: C++ or C compiler, linker enhanced to locate code in on-chip static random access memory ("SRAM") or off-chip FLASH memory, tightly integrated compile-test-debug process, online help, library archiver, list symbol table information, performance tools, graphical debugger with trace and breakpoint capabilities, board level diagnostics, manufacturing diagnostics, rich logging capabilities, and simulation environment (e.g., for pre-prototype hardware). In addition to providing low level diagnostics and logging, the multimedia access device provides a robust set of system and interface level diagnostics which enable service providers to remotely configure and test the FXS and FXO interfaces as well as other interfaces and configurations.

As mentioned above, the multimedia access device may support any number of VoIP protocols that includes providing an application with an application program interface ("API") to VoIP protocol stacks. The VoIP protocol stacks include session initiation protocol ("SIP") (IETF RFC 2543), session description protocol ("SDP") (IETF RFC2327), media gateway control protocol ("MGCP")—1.0 packetcable NCS profile 1.0 and IETF-MGCP 1.0 (IETF RFC2705) profiles, Megaco—IETF RFC 3015 and ITU-T Recommendation H.248 and H.323v4/v5. The multimedia access device may support and provide an embedded hypertext transfer protocol ("HTTP") server and allow for the development of customized hypertext makeup language ("HTML") pages to facilitate the management, control, and monitoring thereof. The multimedia access device may also support simple network management protocol ("SNMP") including the ability to receive SNMP commands from a manager device and to send SNMP traps to a monitoring device. An audio subsystem may support a basic set of codecs and may have the ability to add proprietary codecs such as G711 (pulse code modulation a-law and u-law). The Internet protocol routing function may support basic protocols and services such as point to point protocol ("PPP"), point to point protocol over ethernet ("PPPoE"), point to point tunneling protocol ("PPTP"), Institute of Electronic and Electrical Engineers ("IEEE") 802.11 a/b/g. The multimedia access device may also be capable of handling and performing selected telephony, routing and voice mail functions such as multiple simultaneous telephone calls, teleconferencing, telephone call logging, voice mail, and quality of service ("QoS") wherein priority may be given to voice calls (e.g., automatically throttle IP traffic in order to ensure that all voice calls sustain toll voice quality).

Furthermore, the multimedia access device includes a video encoder 860 and video decoder 865. In accordance therewith, the video encoder 860 has a connection to an ethernet switch fabric, which allows for video streaming over ethernet to locally attached drives. Exemplary encoding capabilities of the video encoder 860 include, without limitation, multiple simultaneous encodes at full D1 and 30 frames per second, audio/video encode (e.g., windows media ("WM")9 or motion pictures experts group ("MPEG") 2, or MPEG 4 or H.264), and multiple encoding bit rates such as 96 kbps video conferencing (H.264), 256 kbps video conferencing (H.264), low compression video storage (bit rate dependent on codec; for MPEG 2-6 Mbps), medium compression video storage (bit rate dependent on codec; for MPEG 2-4 Mbps), high compression video storage (bit rate dependent on codec; for MPEG 2-2 Mbps). In an exemplary embodiment, the video decoder 865 may, without limitation, perform a decode at full D1 and 30 frames per second, audio/video decode (e.g., WM9 or MPEG 2, or MPEG 4 or H.264) and audio decode (e.g., MPEG1 layer 3 ("MP3"), augmentative and alternative communication centers ("AAC"), Internet radio formats). The multimedia access device also supports wireless connectivity via, for instance, a 802.11 PCI card 870 and can support multiple local area networks via, for instance, a multiport switch 875.

Figure 9A:
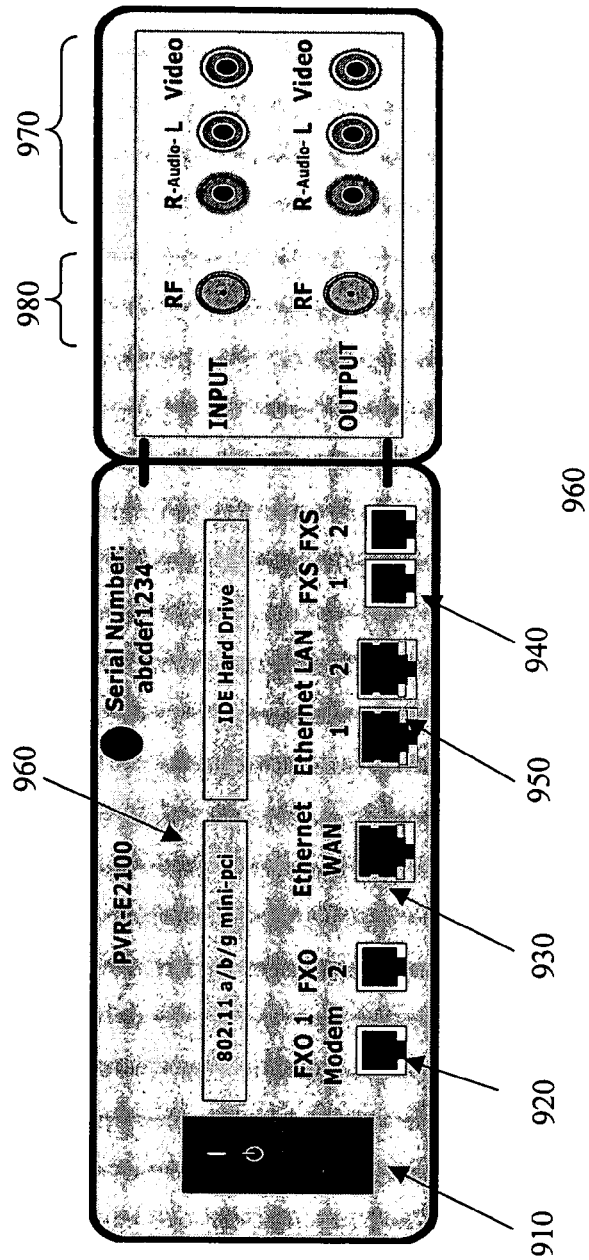
FIGS. 9A and 9B illustrate diagrams of embodiments of a real panel configuration of the multimedia access device in accordance with the principles of the present invention.
Figure 9B:
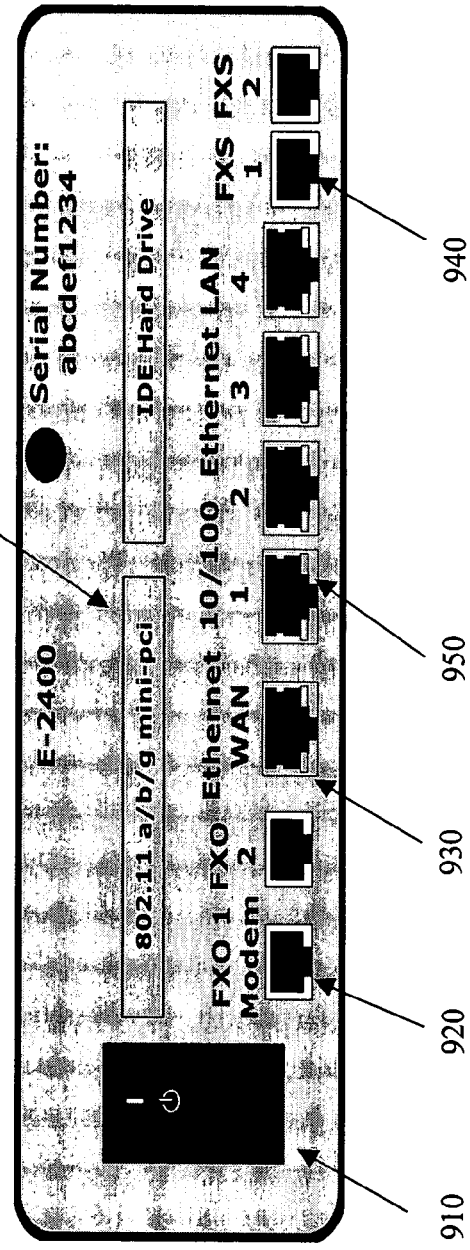

Turning now to FIGS. 9A and 9B, illustrated are diagrams of embodiments of a real panel configuration of the multimedia access device in accordance with the principles of the present invention. Again, the multimedia access device provides an in-premises footprint enabling the multi-service connectivity and local management to the users of endpoint communication devices. The exemplary rear panel configurations provide connectivity to alternating current ("AC") or direct current ("DC") power sources via a power connection 910. The exemplary rear panel configurations also provide connectivity to multiple (e.g., two) PSTN telephone lines (via the FXO ports, one of which is designated 920), broadband Internet (via a WAN connection 930), analog telephone and facsimile machines (via the FXS ports, one of which is designated 940), personal computers, IP telephones, X10 based home or enterprise management devices, facility networks, Internet appliances (via the LAN ports, one of which is designated 950), and wireless WiFi connections (via the 802.11 b/g PCI card 960).

The illustrated embodiments of the rear panel configurations also include expansion options through the use of the optional cards such as universal serial bus ("USB") connections and FLASH RAM. As delineated in FIG. 9A, the multimedia access device also supports connectivity for a video module, thereby supporting connections for video and audio inputs and outputs (generally designated 970) and the radio frequency ("RF") jacks (generally designated 980) for connection to composite video devices. The rear panel configurations also provide for dial up access to the Internet via a modem connection on an FXO port 1 920.

Figure 10:
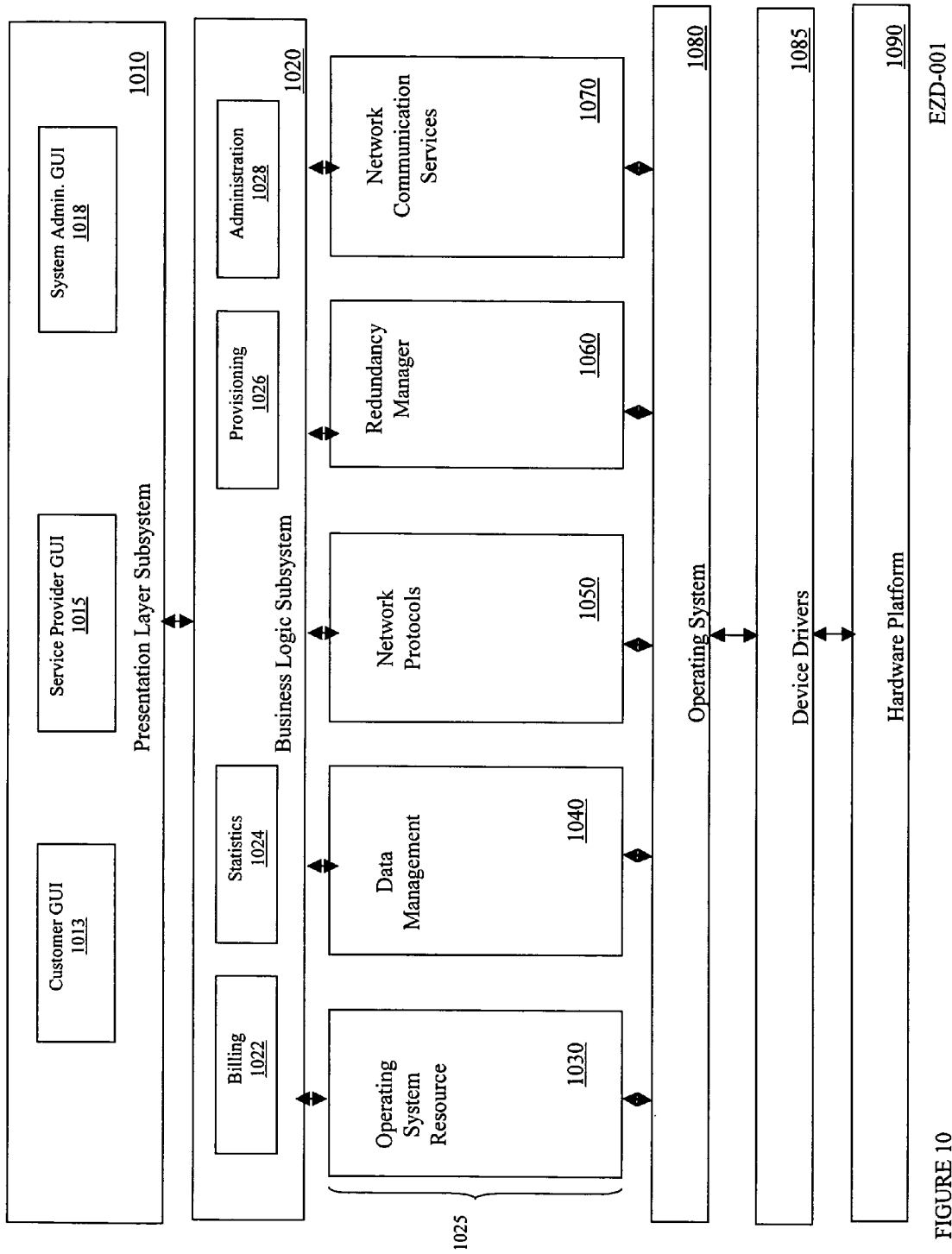
FIG. 10 illustrates a functional block diagram of an embodiment of a management and maintenance server in accordance with the principles of the present invention.

Turning now to FIG. 10, illustrated is a functional block diagram of an embodiment of a management and maintenance server in accordance with the principles of the present invention. The management and maintenance server includes a presentation layer subsystem 1010 with graphical user interface ("GUI") modules. The GUI modules allow customers, service providers and system administrators to access business logic applications to provision, monitor and manage the management and maintenance server and multimedia access devices within a multimedia communication system from a central location.

A customer GUI module 1013 of the presentation layer subsystem 1010 enables customers to access, review, and manage the features and functions associated with their multimedia access device. An example of this type of activity would be to change a call/session control feature or add a new user to their closed user group. A service provider GUI module 1015 of the presentation layer subsystem 1010 enables a service provider to access, review, and manage the billing and collections statistics, as well as other functions such as establishing new customer accounts and managing the data distribution and the data collection functions within a multimedia communication system.

A system administrator GUI module 1018 of the presentation layer subsystem 1010 provides an interface for a system administrator (e.g., a member of a service provider) to monitor and manage the management and maintenance server. Some of the functions performed via the system administrator GUI module 1018 include the control of a redundancy manager function, the provisioning of IP addresses, security control and managing disk functions. Of course, the presentation layer subsystem 1010 may include other interfaces with functionality for a user to access the management and maintenance server with, for instance, a command line user interface.

The management and maintenance server also includes a business logic layer subsystem 1020 for providing application programs that support functions employable within the multimedia communication system. A billing module 1022 and a statistics module 1024 manage the billing criteria and statistical information, respectively, for users of the multimedia communication system. A provisioning module 1026 supports provisioning for the multimedia communication system including endpoint communication devices therein. An administration module 1028 provides general management functionality for the multimedia communication system. The business logic subsystem 1020 interacts with the presentation layer subsystem 1010 and a resource subsystem 1025 to perform the actions and logic in support of the management of the multimedia communication system.

The management and maintenance server also includes a resource subsystem 1025 to provide resources as necessary to support selected services and applications employable within the multimedia communication system. The functions may be called upon by one or more of the systems, subsystems, modules, applications, or processes within the management and maintenance server or multimedia access device to perform an intended function and monitor activity within the multimedia communication system.

An operating system resource module 1030 of the resource subsystem 1025 includes low-level operations provided by the operations system such as random access memory ("RAM") management, persistent (such as disk or non-volatile RAM) data management, multi-thread processing, message queue management and other functions. A data management module 1040 provides for the storage, modification, and retrieval of data related to the multimedia communication system. The data may be stored both in memory and on disk and may be partitioned into customer data associated with endpoint communication devices, service provider data and configuration data.

A network protocol module 1050 of the resource subsystem 1025 includes protocol specific message formatters, network messaging, timers, acknowledgment mechanisms, security functions and other protocol related functions that enable support for various network protocols to send and receive signals to communication devices within and outside of the multimedia communication system. Due to the network functions provided by the management and maintenance server, the management and maintenance server may be deployed in a dual server or redundant configuration. A redundancy manager 1060 of the resource subsystem 1025 manages the dual server configuration and provides real-time recovery capabilities, ensuring that a fully functioning server is always on-line and available.

A network communication services module 1070 of the resource subsystem provides the network communication service functions used to enable interaction with endpoint communication devices, the multimedia access devices, and other system elements. The network communication services module 1070 includes modules that facilitate data collection and data distribution to and from the multimedia access devices, security, encryption, authentication, HTTP services, network timing and network management. Furthermore, the network communication services module 1070 provides an instant messaging interface that facilitates an interaction with instant messaging servers during a user group provisioning process.

The management and maintenance server also includes an operating system 1080, such as embedded in a Linux environment, which provides a control interface to peripheral hardware, schedules tasks, allocates storage, provides a general operating environment enabling the execution of application programs, and presents a default interface to a user via an endpoint communication device when no application program is running. The management and maintenance server also includes device drivers 1085, such as disk and display drivers, that provide the low level interaction between hardware devices and the systems, subsystems, modules and applications of the management and maintenance server. The management and maintenance server also includes a hardware platform 1090, an example of which is a general purpose hardware server platform, that supports the systems, subsystems, modules and processes operating within the management and maintenance server.

Figure 11:
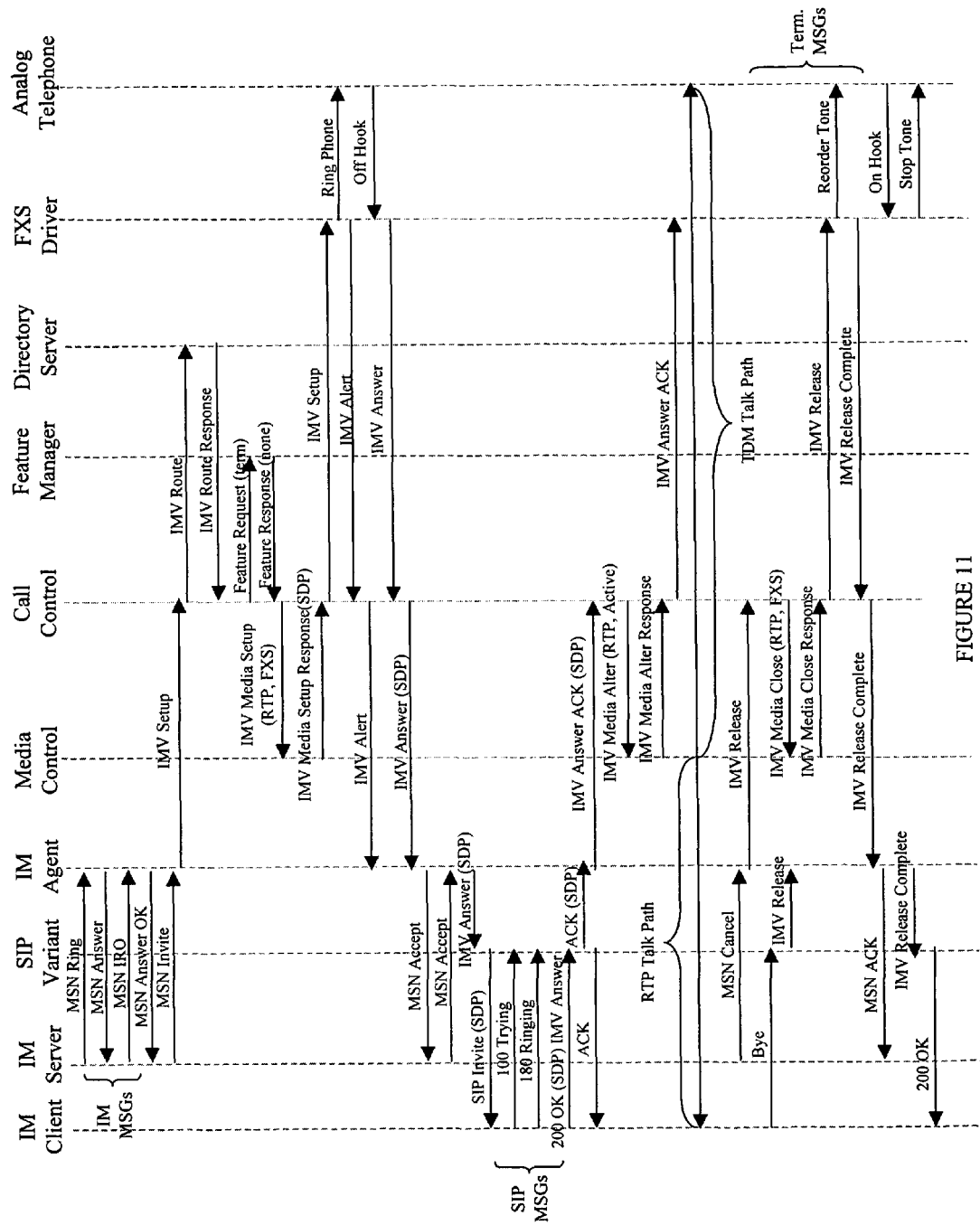
FIGS. 11-16 illustrate diagrams demonstrating exemplary call flows in accordance with the principles of the present invention.

Turning now to FIG. 11, illustrated is a diagram demonstrating an exemplary call flow in accordance with the principles of the present invention. The call flow of FIG. 11 demonstrates a call flow from an instant messaging client (also referred to as "IM client") resident on an origination endpoint communication device such as a laptop PC to a destination endpoint communication device such as an analog telephone. In the illustrated embodiment, the destination endpoint communication device is a non-instant messaging based communication device (i.e., the communication device employs signaling protocols other than instant messaging protocols). It should be understood that other endpoint communication devices such as a multimedia access device as described above may be substituted in the exemplary call flow(s) and still be within the broad scope of the present invention.

The call flow illustrates an operation associated with an instant messaging server (also referred to as "IM server") and a multimedia access device. In particular, a signaling variant (e.g., a SIP variant that forms a portion of a VoIP and video protocol module), an instant messaging agent (also referred to as "IM agent" that forms a portion of a session control module), a media control module, a call control subsystem (that forms a portion of the session control module), a feature manager (that forms a portion of the session control module), a directory server (that forms a portion of the session control module) and a device driver (in this case, an FXS driver) of the multimedia access device are employed in the exemplary call flow. Of course, other systems, subsystems and modules within the multimedia access device may be employed to advantage depending on the particular application.

For the purposes of illustration, a Microsoft ("MSN") instant messaging client participates in the call flow. Of course, other service providers and instant messaging clients may be employed within the system of the present invention. The call flow that follows provides the high level messaging between selected systems, subsystems and modules in support of a voice communication session between the instant messaging client and the analog telephone over a packet based communication network (e.g., an IP based communication network) employing the multimedia access device. An IP based communication network provides the packet based communications intelligence transport (routing) and delivery of information to end users.

Before describing the call flow, an overview of the aforementioned systems, subsystems and modules will hereinafter be described. The instant messaging client initiates or receives the voice communication session and the instant messaging server supports presence management and the session interactions for the instant messaging client. The SIP variant is a VoIP signaling protocol that supports multiple signaling variants such as an MSN signaling variant. The instant messaging agent emulates an instant messaging client (e.g., an MSN IM client). The media control module manages the media streams and the call control subsystem manages call processing feature iterations within the multimedia access device. The feature manager provides feature management within the session control module and the directory server provides routing services within the session control module. The device driver (e.g., the FXS device driver) provides low level interactions with an FXS port of the multimedia access device. Finally, an analog communication device such as the analog telephone is the destination endpoint communication device in the exemplary call flow.

An initial set of instant messaging messages compliant with instant messaging protocols is employed by the instant messaging service provider (in this case, Microsoft) to initiate an instant messaging session. Prior to the messages from the instant messaging server to the instant messaging agent, a session request is initiated by the instant messaging client of the origination endpoint communication device to the instant messaging server. The instant messaging agent (in this case, a Microsoft instant messaging agent) responds to the service provider messages as if it were another instant messaging client. In other words, the instant messaging agent emulates an instant messaging client in response to the session request from the origination endpoint communication device. When combining the instant messaging agent with the SIP variant, the multimedia access device emulates a voice enabled instant messaging client.

After the initial set of instant messaging messages, the instant messaging agent receives an MSN Invite message, and sends an IMV Setup message to the call control subsystem. The IMV Setup message indicates that a session request has been requested for a specific instant messaging user identification. The call control subsystem validates a structure of the aforementioned message and creates a session instance therefor. To correlate an address associated with the session request from the origination endpoint communication device with the destination endpoint communication device and to determine where to route the session request, the call control subsystem also sends an IMV Route message to the directory server. The directory server screens the aforementioned message containing the instant messaging user identifications (originating and destination instant messaging users) and identifies the destination endpoint communication device. The directory server then correlates the destination endpoint communication device to a directory number and a specific FXS port of the multimedia access device. The directory server provides the correlated information back to the call control subsystem via an IMV Route Response message. The aforementioned messages facilitate routing and correlation functionality for the multimedia access device.

Within the directory server, a relationship has previously been established between an instant messaging user, a destination endpoint communication device and a directory number. The directory number is data filled into the directory server tables by the instant messaging user, indicating a relationship between the destination endpoint communication device and the directory number. The directory server receives requests for routing information, determines the destination endpoint communication device, and correlates that request to a directory number and, subsequently, an FXS port (in this example). The directory server communicates with the IM agent to indicate the presence and availability of the aforementioned endpoint communication device. The IM agent subsequently indicates with the IM server (in this case, an MSN IM server) the presence and availability of the aforementioned endpoint communication device. The IM agent achieves this communication with the IM server by employing the standard IM signaling used by the specific IM service provider.

The call control subsystem then transitions to a feature discovery state. In order to determine if any features are active and relevant for the correlated directory number and FXS port, the call control subsystem sends a Feature Request message to the feature manager. The feature manager examines the Feature Request message and determines what terminating features are active. As an example, a call forward on busy may be active for the directory number included within the Feature Request message. The feature manager looks up this information by access to a subscriber database and returns the relevant feature information or feature set to the call control subsystem in a Feature Response message.

Next, in the communication session and to determine what the session description parameter ("SDP") should be in subsequent SIP messages, the call control subsystem sends an IMV Media Setup message to the media control module. The media control module processes the IMV Media Setup message and, based primarily upon an FXS parameter included in the IMV Media Setup message, determines how the SDP should be populated and sends this information back to the call control subsystem in an IMV Media Setup Response message.

At this point, the call control subsystem has enough information to send a message to the FXS driver requesting that the driver ring a specific FXS port and, if a feature is enabled, to send along a caller identification associated with the origination endpoint communication device. In accordance therewith, the call control subsystem sends an IMV Setup message to the FXS device driver. The FXS device driver notifies the destination endpoint communication device (again, the analog telephone) with a Ring Phone signal. The FXS device driver also sends an IMV Alert message to the call control subsystem to alert the call control subsystem that this event has occurred. The call control subsystem subsequently sends an IMV Alert message to the instant messaging agent.

The next event that occurs is that the analog telephone is answered as indicated by an Off Hook signal. The FXS device driver detects the Off Hook signal, suspends ringing of the analog telephone and sends an IMV Answer message to the call control subsystem. The call control subsystem sends an IMV Answer message including the SDP to the instant messaging agent. The instant messaging agent sends an MSN Accept message to the instant messaging server indicating that the destination endpoint communication device is accepting the session request and the instant messaging agent includes a desired IP address and port to send the SIP messages on. The instant messaging server receives the MSN Accept message, performs processing with the instant messaging client of the origination endpoint communication device and sends back an MSN Accept message to the instant messaging agent indicating the IP address and port of the instant messaging client.

After the instant messaging agent receives the MSN Accept message, the instant messaging agent sends an IMV Answer message to the SIP variant with the SDP to be included in the subsequent SIP messaging. The SIP variant now initiates an SIP based call to the previously identified instant messaging client IP address and port. A plurality of SIP messages (such as SIP Invite (SDP), Trying, Ringing, 200 OK, etc.) are used to establish the SIP based call in support of the voice communication session.

After the SIP variant receives a 200 OK message indicating an answer from the instant messaging client, the SIP variant signals the instant messaging agent with an ACK message. The ACK message includes the SDP of the instant messaging client. The SIP variant also signals an ACK message to the instant messaging client. The instant messaging agent processes the message and sends an IMV Answer ACK message to the call control subsystem. The call control subsystem processes the IMV Answer ACK message and signals the media control module to activate a voice path (e.g., an RTP path and a time division multiplexing, TDM, path) via an IMV Media Alter message.

The media control module activates the voice path and sends an IMV Media Alter Response message to the call control subsystem. The call control subsystem processes the IMV Media Alter Response message and sends a IMV Answer ACK message to the FXS device driver. The FXS device driver may send a momentary answer signal to the analog telephone at this time. A talk/voice path is established and two-way conversation is enabled between the instant message client (a part of the origination endpoint communication device) and the analog telephone (the destination endpoint communication device). Thus, a voice communication session is established between the endpoint communication devices in response to a session request.

The next events occur when either the origination or destination endpoint communication devices initiate a disconnect sequence. In this example, the instant messaging client sends a disconnect indicator. The instant messaging client signals a desire to terminate the voice communication session by sending a BYE message. The instant messaging server will also send an MSN Cancel message. Note that both of these messages may be received in any order.

The instant messaging agent and/or the SIP variant receive the MSN Cancel message or the BYE messages, respectively. The SIP variant sends an IMV Release message to the instant messaging agent. In conjunction therewith, the call control subsystem facilitates a plurality of termination messages to end the voice communication session. The instant messaging client is returned to an idle state upon receipt of a 200 OK message and the analog telephone is returned to an idle state when an On Hook signal is detected by the FXS device driver.

Figure 12:
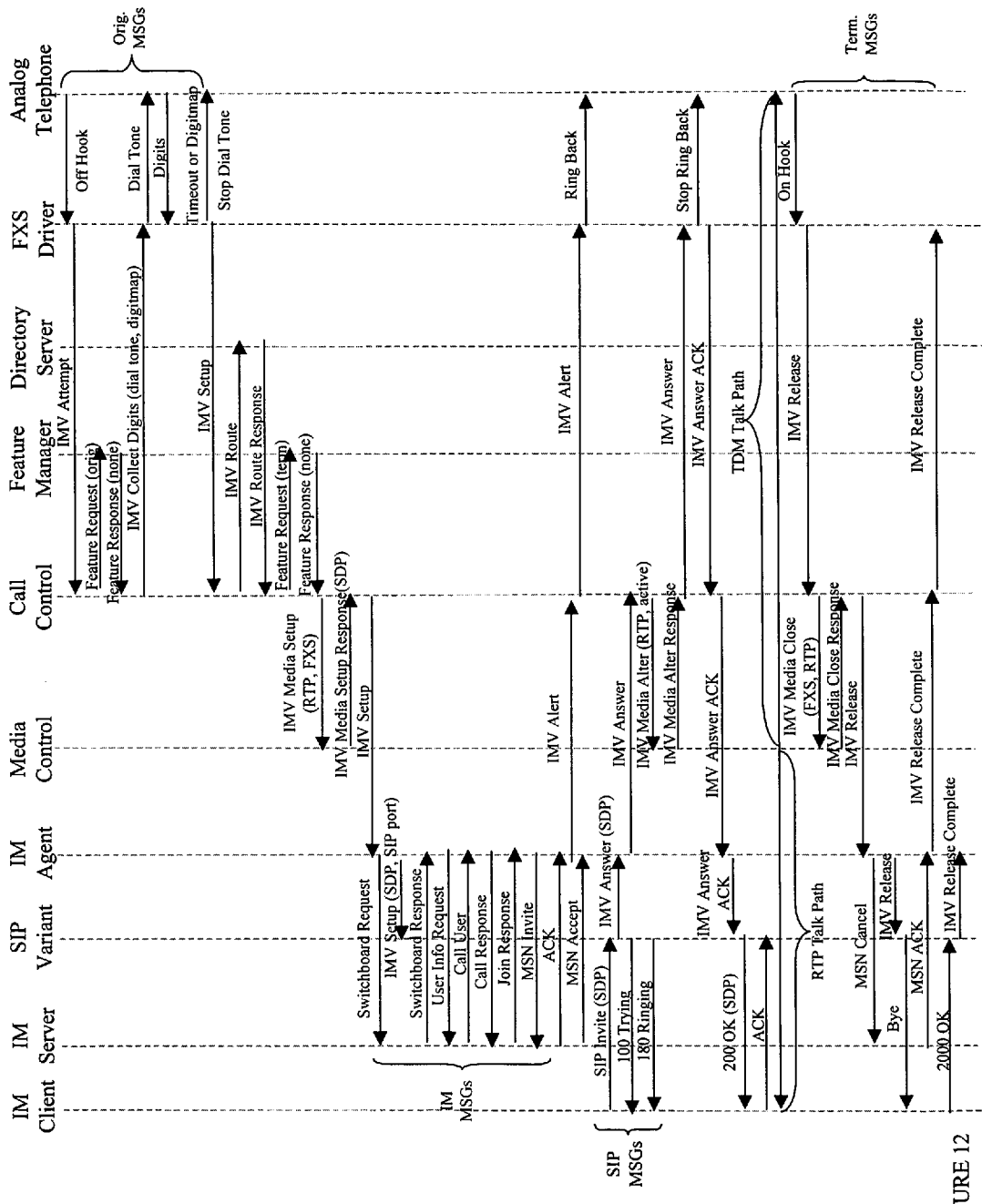

Turning now to FIG. 12, illustrated is a diagram demonstrating an exemplary call flow in accordance with the principles of the present invention. The call flow of FIG. 12 demonstrates a call flow from an origination endpoint communication device such as an analog telephone to an instant messaging client (also referred to as "IM client") resident on a destination endpoint communication device such as a laptop PC. In the illustrated embodiment, the origination endpoint communication device is a non-instant messaging based communication device (i.e., the communication device employs signaling protocols other than instant messaging protocols). It should be understood that other endpoint communication devices may be substituted in the exemplary call flow(s) and still be within the broad scope of the present invention.

The call flow illustrates an operation associated with an instant messaging server (also referred to as "IM server") and a multimedia access device. In particular, a signaling variant (e.g., a SIP variant that forms a portion of a VoIP and video protocol module), an instant messaging agent (also referred to as "IM agent" that forms a portion of a session control module), a media control module, a call control subsystem (that forms a portion of the session control module), a feature manager (that forms a portion of the session control module), a directory server (that forms a portion of the session control module) and a device driver (in this case, an FXS device driver) of the multimedia access device are employed in the exemplary call flow. Of course, other systems, subsystems and modules within the multimedia access device may be employed to advantage depending on the particular application.

For the purposes of illustration, a Microsoft ("MSN") instant messaging client participates in the call flow. Of course, other service providers and instant messaging clients may be employed within the system of the present invention. The call flow that follows provides the high level messaging between selected systems, subsystems and modules in support of a voice communication session between the instant messaging client and the analog telephone over a packet based communication network (e.g., an IP based communication network) employing the multimedia access device.

Before describing the call flow, an overview of the aforementioned systems, subsystems and modules will hereinafter be described. The instant messaging client initiates or receives the voice communication session and the instant messaging server supports presence management and the session interactions for the instant messaging client. The SIP variant is a VoIP signaling protocol that supports multiple signaling variants such as an MSN signaling variant. The instant messaging agent emulates an instant messaging client (e.g., an MSN IM client). The media control module manages the media streams and the call control subsystem manages call processing feature iterations within the multimedia access device. The feature manager provides feature management within the session control module and the directory server provides routing services within the session control module. The device driver (e.g., the FXS device driver) provides low level interactions with an FXS port of the multimedia access device. Finally, an analog communication device such as the analog telephone is the origination endpoint communication device in the exemplary call flow.

A set of instant messaging messages compliant with instant messaging protocols is employed by the instant messaging service provider (in this case, Microsoft) to participate in an instant messaging session. The instant messaging agent (in this case, a Microsoft instant messaging agent) communicates with the instant messaging server as if it were another instant messaging client. In other words, the instant messaging agent emulates an instant messaging client resident on the destination endpoint communication device. When combining the instant messaging agent with the SIP variant, the multimedia access device emulates a voice enabled instant messaging client.

An origination sequence for the PSTN to the FXS device driver begins with an Off Hook signal by the analog telephone (representing a session request) and the call control subsystem is signaled via an IMV Attempt message. The call control subsystem then transitions to a feature discovery state. In order to determine if any features are active and relevant for the correlated directory number and FXS port, the call control subsystem sends a Feature Request message to the feature manager. The feature manager examines the Feature Request message and determines what terminating features are active. As an example, a message waiting indicating flag including a "studder" dial tone may be a feature included within the Feature Request message. The feature manager looks up this information by access to a subscriber database and returns the relevant feature information or feature set to the call control subsystem in a Feature Response message.

A Dial Tone is then provided and the multimedia access device collects Digits (representing the destination endpoint communication device) and passes the information to the call control subsystem via an IMV Setup message. The IMV Setup message indicates that a session request has been requested for a specific instant messaging user/directory number identification. The call control subsystem validates a structure of the aforementioned message and creates a session instance therefor. The call control subsystem screens the dialed number and the directory server correlates this dialed directory number to an instant messaging user on a user group or a "buddy list" associated with the origination endpoint communication device, which may be a distant instant messaging client in accordance with the IMV Route and IMV Route Response messages.

After determining the route, the call control subsystem determines if any additional features are applicable to the instant communication session by sending a Feature Request message and receiving a Feature Response message from the feature manager. The call control subsystem thereafter interacts with the media control module to reserve the media resources necessary to establish an outbound voice communication session and then sends an IMV Setup message to the IM agent. The IM agent will use this information to establish an instant messaging session and request a voice communication session with a distant IM server and IM client. To these external devices, the originating IM agent appears as just another IM client. In other words, the instant messaging agent emulates an instant messaging client in response to the session request from the origination endpoint communication device. When combining the instant messaging agent with the SIP variant, the multimedia access device emulates a voice enabled instant messaging client.

The IM agent sends basic instant messaging messages (e.g., Switchboard Request message, et seq.) to establish an instant messaging session and to request a voice communication session with the IM server and, subsequently, the IM client resident on the destination endpoint communication device. The IM server and the IM client confirm their acceptance of the request for a voice communication session by sending back an ACK message and an MSN Accept message. After the IM agent receives the ACK message, the agent notifies the call control subsystem that the IM client is available with an IMV Alert message. The call control subsystem signals the FXS device driver to begin providing a session progress Ring Back tone by sending the FXS device driver an IMV Alert message.

At this point in the communication session, the origination endpoint communication device hears the Ring Back tone and the SIP variant is waiting for information from the IM client indicating what IP addresses and ports to use to establish the voice communication session. This information will be conveyed by the IM client via the SDP on the SIP Invite message. When the SIP variant receives the SIP Invite message, the SIP variant screens the message for completeness and sends an IMV Answer message to the IM Agent. In response thereto, the IM agent sends an NIMV Answer message to the call control subsystem.

The next steps in establishing the voice communication session include session control messages with the media control module to activate a voice path via the IMV Media Alter and IMV Media Alter Response messages. Also, the SIP variant continues to progress the establishment of the voice communication session with the IM Client using standard SIP messages such as 100 Trying and 180 Ringing messages. After the call control subsystem receives a response from media control module that a voice path is being established within the multimedia access device, the call control subsystem sends an IMV Answer message to the FXS device driver to place the FXS device driver in an answer state and to request that the FXS device driver to send a Stop Ring Back tone to the origination endpoint communication device.

Thereafter, the FXS device driver sends an IMV Answer ACK message to the call control subsystem, which sends an IMV Answer ACK message to the IM Agent. The IM Agent sends an IMV Answer ACK message to the SIP variant and the SIP variant sends a 200 OK message to the IM Client. The SIP variant includes the SDP in the message, which was derived in conjunction with the call control subsystem and media control module and passed along in the IMV Answer ACK messages from the call control subsystem to the IM agent and, subsequently, to the SIP variant.

After the SIP variant receives an IMV Answer ACK message, the voice path is established as illustrated by the RTP and TDM Talk Paths. Thus, a voice communication session is established between the endpoint communication devices in response to a session request. The voice communication session continues until one speaker terminates the session. In this example, the origination endpoint communication device terminates the voice communication session by placing the handset On Hook. The FXS device driver, call control subsystem, media control module, IM agent, SIP variant and the IM server and IM client resident on the destination communication device send and receive termination messages to release resources, terminate the communication session instance and return the FXS line to an idle state.

Figure 13:
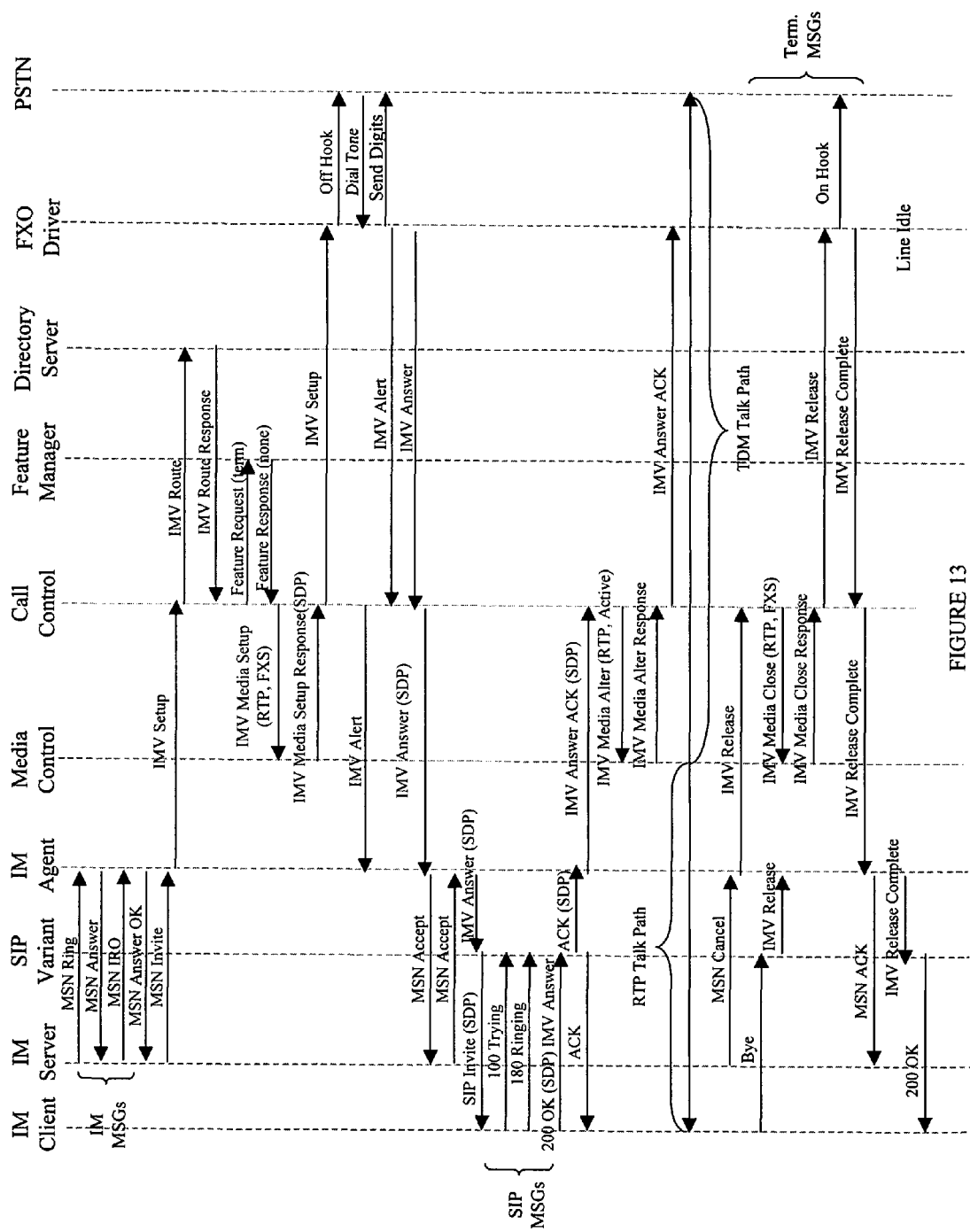

Turning now to FIG. 13, illustrated is a diagram demonstrating an exemplary call flow in accordance with the principles of the present invention. The call flow of FIG. 13 demonstrates a call flow from an instant messaging client (also referred to as "IM client") resident on an origination endpoint communication device such as a laptop PC to a destination endpoint communication device such as an analog telephone coupled to the PSTN (i.e., a communication device coupled to a circuit switched communication network). In the illustrated embodiment, the destination endpoint communication device is a non-instant messaging based communication device (i.e., the communication device employs signaling protocols other than instant messaging protocols). It should be understood that other endpoint communication devices may be substituted in the exemplary call flow(s) and still be within the broad scope of the present invention.

The call flow illustrates an operation associated with an instant messaging server (also referred to as "IM server") and a multimedia access device. In particular, a signaling variant (e.g., a SIP variant that forms a portion of a VoIP and video protocol module), an instant messaging agent (also referred to as "IM agent" that forms a portion of a session control module), a media control module, a call control subsystem (that forms a portion of the session control module), a feature manager (that forms a portion of the session control module), a directory server (that forms a portion of the session control module) and a device driver (in this case, an FXO driver) of the multimedia access device are employed in the exemplary call flow. Of course, other systems, subsystems and modules within the multimedia access device may be employed to advantage depending on the particular application.

For the purposes of illustration, a Microsoft ("MSN") instant messaging client participates in the call flow. Of course, other service providers and instant messaging clients may be employed within the system of the present invention. The call flow that follows provides the high level messaging between selected systems, subsystems and modules in support of a voice communication session between the instant messaging client and the analog telephone (coupled to the PSTN) over a packet based communication network (e.g., an IP based communication network) employing the multimedia access device.

Before describing the call flow, an overview of the aforementioned systems, subsystems and modules will hereinafter be described. The instant messaging client initiates or receives the voice communication session and the instant messaging server supports presence management and the session interactions for the instant messaging client. The SIP variant is a VoIP signaling protocol that supports multiple signaling variants such as an MSN signaling variant. The instant messaging agent emulates an instant messaging client (e.g., an MSN IM client). The media control module manages the media streams and the call control subsystem manages call processing feature iterations within the multimedia access device. The feature manager provides feature management within the session control module and the directory server provides routing services within the session control module. The device driver (e.g., the FXO device driver) provides low level interactions with an FXO port of the multimedia access device. Finally, the analog telephone coupled to the PSTN is the destination endpoint communication device in the exemplary call flow. For purposes of simplicity, FIG. 13 refers to the PSTN as the destination endpoint communication device thereby combining the functionality of the call flow thereto in a single action as opposed to separating the PSTN from the ultimate destination endpoint communication device.

An initial set of instant messaging messages compliant with instant messaging protocols is employed by the instant messaging service provider (in this case, Microsoft) to initiate an instant messaging session. Prior to the messages from the instant messaging server to the instant messaging agent, a session request is initiated by the instant messaging client of the origination endpoint communication device to the instant messaging server. The instant messaging agent (in this case, a Microsoft instant messaging agent) responds to the service provider messages as if it were another instant messaging client. In other words, the instant messaging agent emulates an instant messaging client in response to the session request from the origination endpoint communication device. When combining the instant messaging agent with the SIP variant, the multimedia access device emulates a voice enabled instant messaging client.

After the initial set of instant messaging messages, the instant messaging agent receives an MSN Invite message, and sends an IMV Setup message to the call control subsystem. The IMV Setup message indicates that a session request has been requested for a specific instant messaging user identification. The call control subsystem validates a structure of the aforementioned message and creates a session instance therefor. To correlate an address associated with the session request from the origination endpoint communication device with the destination endpoint communication device and to determine where to route the session request, the call control subsystem also sends an IMV Route message to the directory server. The directory server screens the aforementioned message containing the instant messaging user identifications (originating and destination instant messaging users) and identifies the destination endpoint communication device. The directory server then correlates the destination endpoint communication device to a directory number and a specific FXO port of the multimedia access device. The directory server provides the correlated information back to the call control subsystem via an IMV Route Response message. The aforementioned messages facilitate routing and correlation functionality for the multimedia access device.

Within the directory server, a relationship has previously been established between an instant messaging user, a destination endpoint communication device and a directory number. The directory number is data filled into the directory server tables by the instant messaging user, indicating a relationship between the destination endpoint communication device and the directory number. The directory server receives requests for routing information, determines the destination endpoint communication device, and correlates that request to a directory number and, subsequently, an FXO port (in this example). The directory server communicates with the IM agent to indicate the presence and availability of the aforementioned endpoint communication device. The IM agent subsequently indicates with the IM server (in this case, an MSN IM server) the presence and availability of the aforementioned endpoint communication device. The IM agent achieves this communication with the IM server by employing the standard IM signaling used by the specific IM service provider.

The call control subsystem then transitions to a feature discovery state. In order to determine if any features are active and relevant for the correlated directory number and FXO port, the call control subsystem sends a Feature Request message to the feature manager. The feature manager examines the Feature Request message and determines what terminating features are active. The feature manager looks up this information by access to a subscriber database and returns the relevant feature information or feature set to the call control subsystem in a Feature Response message.

Next, in the communication session and to determine what the session description parameter ("SDP") should be in subsequent SIP messages, the call control subsystem sends an IMV Media Setup message to the media control module. The media control module processes the IMV Media Setup message and, based primarily upon an FXO parameter included in the IMV Media Setup message, determines how the SDP should be populated and sends this information back to the call control subsystem in an IMV Media Setup Response message.

At this point, the call control subsystem has enough information to send a message to the FXO device driver requesting that the FXO device driver send an Off Hook message on an outbound PSTN circuit using a specific FXO port. The call control subsystem transmits an IMV Setup message to the FXO device driver. The FXO device driver notifies by signaling Off Hook on the PSTN circuit and detects a Dial Tone from the PSTN circuit. Thereafter, digits outpulse on the PSTN circuit. The FXO device driver also sends an IMV Alert message to the call control subsystem to alert the call control subsystem that this event has occurred. The call control subsystem subsequently sends an IMV Alert message to the instant messaging agent.

The FXO device driver also sends an IMV Answer message to the call control subsystem. The call control subsystem sends an IMV Answer message including the SDP to the instant messaging agent. The instant messaging agent sends an MSN Accept message to the instant messaging server indicating that the destination endpoint communication device is accepting the session request and the instant messaging agent includes a desired IP address and port to send the SIP messages on. The instant messaging server receives the MSN Accept message, performs processing with the instant messaging client of the origination endpoint communication device and sends back an MSN Accept message to the instant messaging agent indicating the IP address and port of the instant messaging client.

After the instant messaging agent receives the MSN Accept message, the instant messaging agent sends an IMV Answer message to the SIP variant with the SDP to be included in the subsequent SIP messaging. The SIP variant now initiates an SIP based call to the previously identified instant messaging client IP address and port. A plurality of SIP messages (such as SIP Invite (SDP), Trying, Ringing, 200 OK, etc.) are used to establish the SIP based call in support of the voice communication session.

After the SIP variant receives a 200 OK message indicating an answer from the instant messaging client, the SIP variant signals the instant messaging agent with an ACK message. The ACK message includes the SDP of the instant messaging client. The SIP variant also signals an ACK message to the instant messaging client. The instant messaging agent processes the message and sends an IMV Answer ACK message to the call control subsystem. The call control subsystem processes the IMV Answer ACK message and signals the media control module to activate a voice path (e.g., an RTP path and a time division multiplexing, TDM, path) via an IMV Media Alter message.

The media control module activates the voice path and sends an IMV Media Alter Response message to the call control subsystem. The call control subsystem processes the IMV Media Alter Response message and sends an IMV Answer ACK message to the FXO device driver. The FXO device driver may send a momentary answer signal to the analog telephone coupled to the PSTN at this time. A talk/voice path is established and two-way conversation is enabled between the instant message client (a part of the origination endpoint communication device) and the analog telephone (the destination endpoint communication device) via the PSTN. Thus, a voice communication session is established between the endpoint communication devices in response to a session request.

The next events occur when either the origination or destination endpoint communication devices initiate a disconnect sequence. In this example, the instant messaging client sends a disconnect indicator. The instant messaging client signals a desire to terminate the voice communication session by sending a BYE message. The instant messaging server will also send an MSN Cancel message. Note that both of these messages may be received in any order.

The instant messaging agent and/or the SIP variant receives the MSN Cancel message or the BYE message, respectively. The SIP variant sends an IMV Release message to the instant messaging agent. In conjunction therewith, the call control subsystem facilitates a plurality of termination messages to end the voice communication session. The instant messaging client is returned to an idle state upon receipt of a 200 OK message and the analog telephone via the PSTN is returned to an idle state when an On Hook signal is provided by the FXO device driver.

Figure 14:
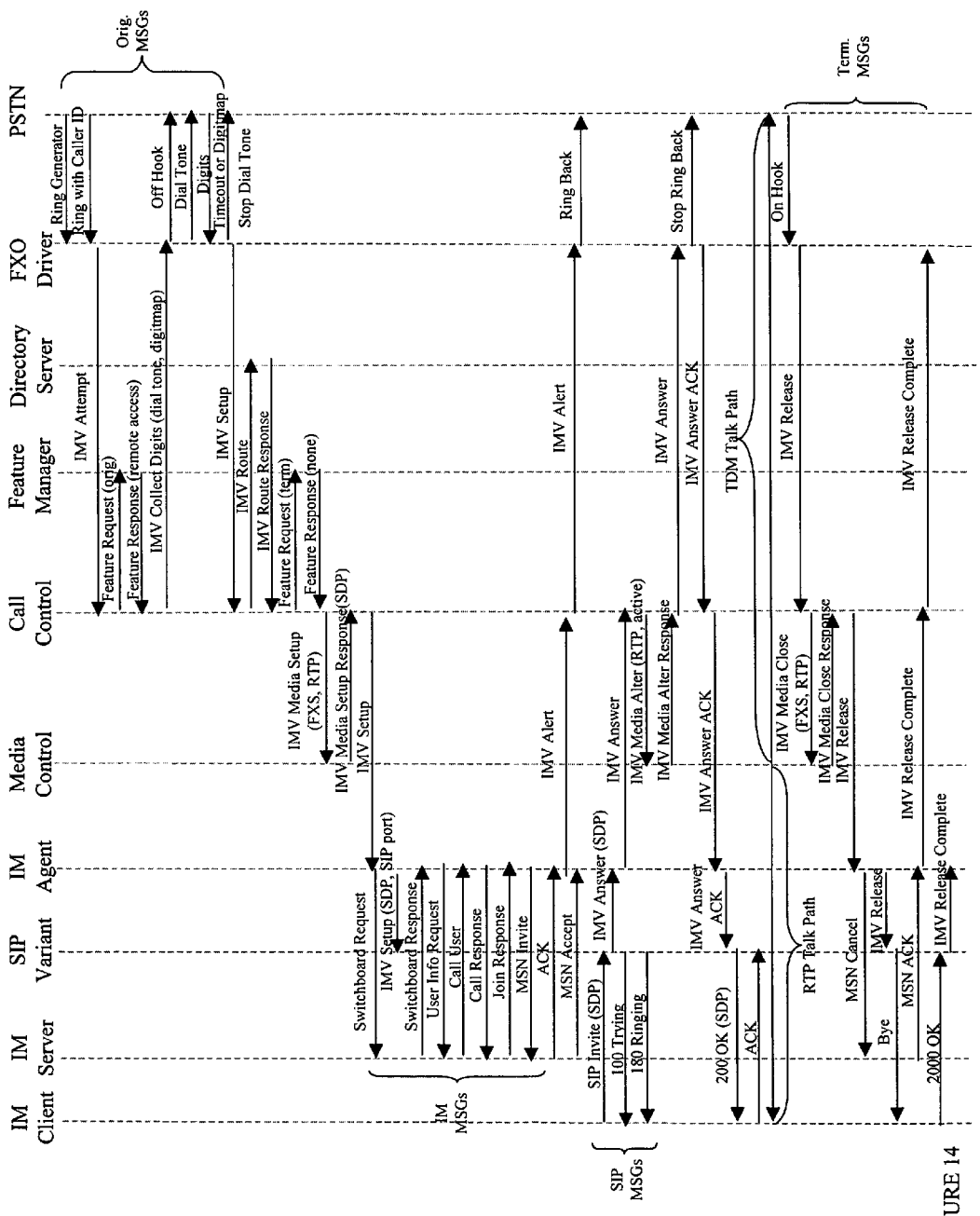

Turning now to FIG. 14, illustrated is a diagram demonstrating an exemplary call flow in accordance with the principles of the present invention. The call flow of FIG. 14 demonstrates a call flow from an origination endpoint communication device such as an analog telephone coupled to the PSTN (i.e., a communication device coupled to a circuit switched communication network) to an instant messaging client (also referred to as "IM client") resident on an destination endpoint communication device such as a laptop PC. In the illustrated embodiment, the origination endpoint communication device is a non-instant messaging based communication device (i.e., the communication device employs signaling protocols other than instant messaging protocols). It should be understood that other endpoint communication devices may be substituted in the exemplary call flow(s) and still be within the broad scope of the present invention.

The call flow illustrates an operation associated with an instant messaging server (also referred to as "IM server") and a multimedia access device. In particular, a signaling variant (e.g., an SIP variant that forms a portion of a VoIP and video protocol module), an instant messaging agent (also referred to as "IM agent" that forms a portion of a session control module), a media control module, a call control subsystem (that forms a portion of the session control module), a feature manager (that forms a portion of the session control module), a directory server (that forms a portion of the session control module) and a device driver (in this case, an FXO device driver) of the multimedia access device are employed in the exemplary call flow. Of course, other systems, subsystems and modules within the multimedia access device may be employed to advantage depending on the particular application.

For the purposes of illustration, a Microsoft ("MSN") instant messaging client participates in the call flow. Of course, other service providers and instant messaging clients may be employed within the system of the present invention. The call flow that follows provides the high level messaging between selected systems, subsystems and modules in support of a voice communication session between the instant messaging client and the analog telephone coupled to the PSTN over a packet based communication network (e.g, an IP based communication network) employing the multimedia access device.

Before describing the call flow, an overview of the aforementioned systems, subsystems and modules will hereinafter be described. The instant messaging client initiates or receives the voice communication session and the instant messaging server supports presence management and the session interactions for the instant messaging client. The SIP variant is a VoIP signaling protocol that supports multiple signaling variants such as an MSN signaling variant. The instant messaging agent emulates an instant messaging client (e.g., an MSN IM client). The media control module manages the media streams and the call control subsystem manages call processing feature iterations within the multimedia access device. The feature manager provides feature management within the session control module and the directory server provides routing services within the session control module. The device driver (e.g., the FXO device driver) provides low level interactions with an FXO port of the multimedia access device. Finally, the analog telephone is the origination endpoint communication device in the exemplary call flow. For purposes of simplicity, FIG. 14 refers to the PSTN as the origination endpoint communication device thereby combining the functionality of the call flow thereto in a single action as opposed to separating the PSTN from the ultimate origination endpoint communication device.

A set of instant messaging messages compliant with instant messaging protocols is employed by the instant messaging service provider (in this case, Microsoft) to participate in an instant messaging session. The instant messaging agent (in this case, a Microsoft instant messaging agent) communicates with the instant messaging server as if it were another instant messaging client. In other words, the instant messaging agent emulates an instant messaging client resident on the destination endpoint communication device. When combining the instant messaging agent with the SIP variant, the multimedia access device emulates a voice enabled instant messaging client.

An origination sequence for the PSTN to the FXO device driver begins after a user dials the PSTN telephone number of the line connected to the multimedia access device (representing a session request). The FXO device driver detects the ringing and captures the incoming caller ID and signals the call control subsystem with an IMV Attempt message including the inbound caller identification, if received. The call control subsystem then transitions to a feature discovery state. In order to determine if any features are active and relevant for the correlated directory number and FXO port, the call control subsystem sends a Feature Request message to the feature manager. The feature manager examines the Feature Request message and determines what terminating features are active. The feature manager looks up this information by access to a subscriber database and returns the relevant feature information or feature set to the call control subsystem in a Feature Response message.

Following an Off Hook message, a Dial Tone is then provided and the multimedia access devices collects Digits (representing the destination endpoint communication device) and passes the information to the call control subsystem via an IMV Setup message. The IMV Setup message indicates that a session request has been requested for a specific instant messaging user/directory number identification. The call control subsystem validates a structure of the aforementioned message and creates a session instance therefor. The call control subsystem screens the dialed number and the directory server correlates this dialed directory number to an instant messaging user on a user group or a "buddy list" associated with the origination endpoint communication device, which may be a distant instant messaging client in accordance with the IMV Route and IMV Route Response messages.

After determining the route, the call control subsystem determines if any additional features are applicable to the instant communication session by sending a Feature Request message and receiving a Feature Response message from the feature manger. The call control subsystem thereafter interacts with the media control module to reserve the media resources necessary to establish an outbound voice communication session and then sends an IMV Setup message to the IM agent. The IM agent will use this information to establish an instant messaging session and request a voice communication session with a distant IM server and IM client. To these external devices, the originating IM agent appears as just another IM client. In other words, the instant messaging agent emulates an instant messaging client in response to the session request from the origination endpoint communication device. When combining the instant messaging agent with the SIP variant, the multimedia access device emulates a voice enabled instant messaging client.

The IM agent sends basic instant messaging messages (e.g., Switchboard Request message, et seq.) to establish an instant messaging session and to request a voice communication session with the IM server and, subsequently, the IM client resident on the destination endpoint communication device. The IM server and the IM client confirm their acceptance of the request for a voice communication session by sending back an ACK message and a MSN Accept message. After the IM agent receives the ACK message, the agent notifies the call control subsystem that the IM client is available with a IMV Alert message. The call control subsystem signals the FXO device driver to begin providing a session progress Ring Back tone by sending the FXO device driver an IMV Alert message.

At this point in the communication session, the origination endpoint communication device hears the Ring Back tone and the SIP variant is waiting for information from the IM client indicating what IP addresses and ports to use to establish the voice communication session. This information will be conveyed by the IM client via the SDP on the SIP Invite message. When the SIP variant receives the SIP Invite message, the SIP variant screens the message for completeness and sends an IMV Answer message to the IM Agent. In response thereto, the IM agent sends an IMV Answer message to the call control subsystem.

The next steps in establishing the voice communication session include session control messages with the media control module to activate a voice path via the IMV Media Alter and IMV Media Alter Response messages. Also, the SIP variant continues to progress the establishment of the voice communication session with the IM Client using standard SIP messages such as 100 Trying and 180 Ringing messages. After the call control subsystem receives a response from media control module that a voice path is being established within the multimedia access device, the call control subsystem sends an IMV Answer message to the FXO device driver to place the FXO device driver in an answer state and to request that the FXO device driver to Stop Ring Back tone to the origination endpoint communication device.

Thereafter, the FXO device driver sends an IMV Answer ACK message to the call control subsystem, which sends an IMV Answer ACK message to the IM Agent. The IM Agent sends an IMV Answer ACK message to the SIP variant and the SIP variant sends a 200 OK message to the IM Client. The SIP variant includes the SDP in the message, which was derived in conjunction with the call control subsystem and media control module and passed along in the IMV Answer ACK messages from the call control subsystem to the IM agent and, subsequently, to the SIP variant.

After the SIP variant receives an IMV Answer ACK message, the voice path is established as illustrated by the RTP and TDM Talk Paths. Thus, a voice communication session is established between the endpoint communication devices in response to a session request. The voice communication session continues one speaker terminates the session. In this example, the origination endpoint communication device terminates the voice communication session by placing the handset On Hook. The FXO device driver, call control subsystem, media control module, IM agent, SIP variant and the IM server and IM client resident on the destination communication device send and receive termination messages to release resources, terminate the communication session instance and return the FXO line to an idle state.

Figure 15:
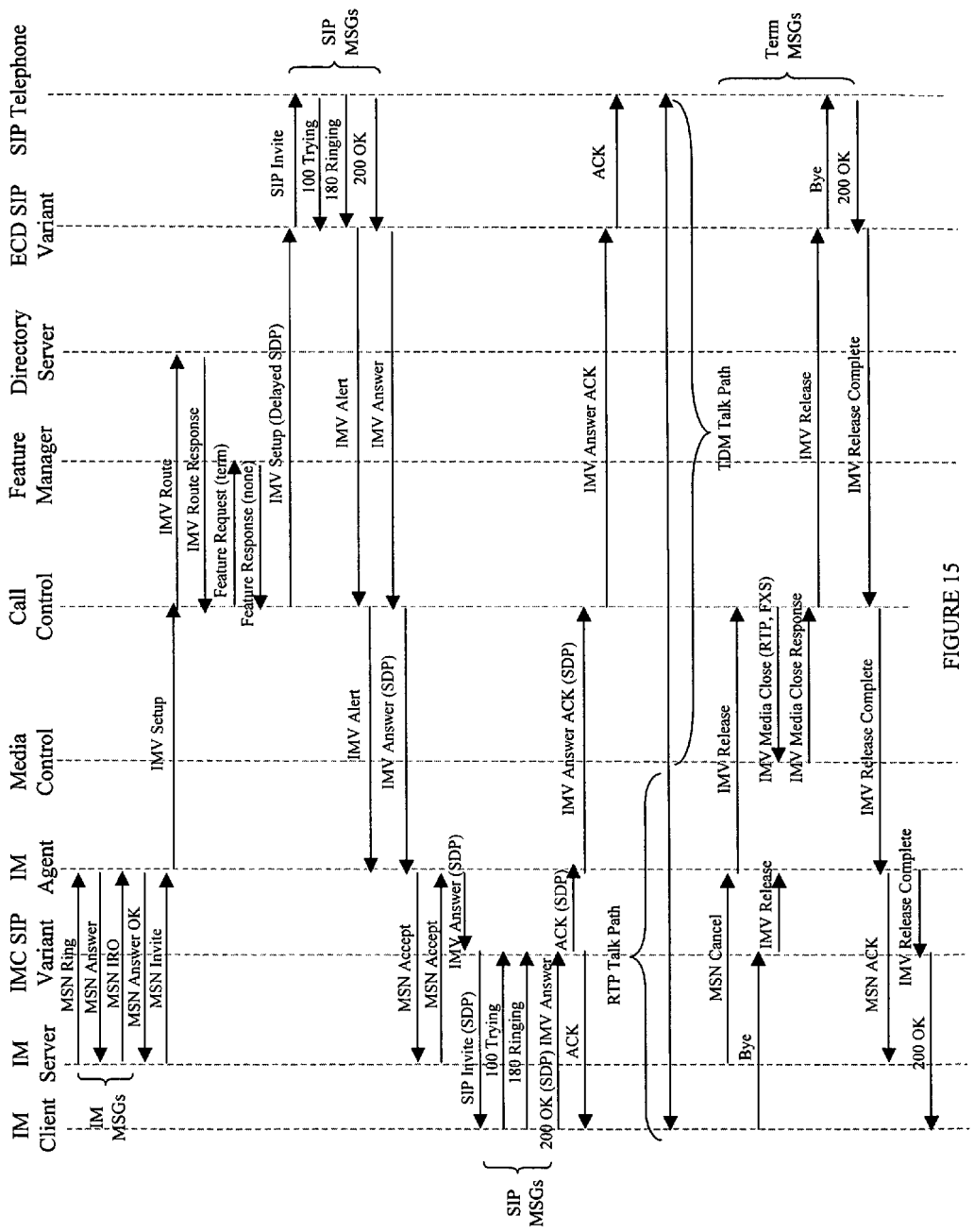

Turning now to FIG. 15, illustrated is a diagram demonstrating an exemplary call flow in accordance with the principles of the present invention. The call flow of FIG. 15 demonstrates a call flow from an instant messaging client (also referred to as "IM client") resident on an origination endpoint communication device such as a laptop PC to a destination endpoint communication device such as an SIP telephone. In the illustrated embodiment, the destination endpoint communication device is a non-instant messaging based communication device (i.e., the communication device employs signaling protocols other than instant messaging protocols). It should be understood that other endpoint communication devices may be substituted in the exemplary call flow(s) and still be within the broad scope of the present invention.

The call flow illustrates an operation associated with an instant messaging server (also referred to as "IM server") and a multimedia access device. In particular, a signaling variant (e.g., an SIP variant that forms a portion of a VoIP and video protocol module and, in this case, an IMC SIP variant and an ECD SIP variant), an instant messaging agent (also referred to as "IM agent" that forms a portion of a session control module), a media control module, a call control subsystem (that forms a portion of the session control module), a feature manager (that forms a portion of the session control module), and a directory server (that forms a portion of the session control module). Of course, other systems, subsystems and modules within the multimedia access device may be employed to advantage depending on the particular application. Also, for ease of illustration, the call flow does not show the lower level interaction with the SIP telephone via, for instance, an ethernet device driver.

For the purposes of illustration, a Microsoft ("MSN") instant messaging client participates in the call flow. Of course, other service providers and instant messaging clients may be employed within the system of the present invention. The call flow that follows provides the high level messaging between selected systems, subsystems and modules in support of a voice communication session between the instant messaging client and the SIP telephone over a packet based communication network (e.g, an IP based communication network) employing the multimedia access device.

Before describing the call flow, an overview of the aforementioned systems, subsystems and modules will hereinafter be described. The instant messaging client initiates or receives the voice communication session and the instant messaging server supports presence management and the session interactions for the instant messaging client. The SIP variants are VoIP signaling protocols that supports multiple signaling variants such as an MSN signaling variant and an endpoint communication device signaling variant. The instant messaging agent emulates an instant messaging client (e.g., an MSN IM client). The media control module manages the media streams and the call control subsystem manages call processing feature iterations within the multimedia access device. The feature manager provides feature management within the session control module and the directory server provides routing services within the session control module. Finally, an VoIP communication device such as the SIP telephone is the destination endpoint communication device in the exemplary call flow.

An initial set of instant messaging messages compliant with instant messaging protocols is employed by the instant messaging service provider (in this case, Microsoft) to initiate an instant messaging session. Prior to the messages from the instant messaging server to the instant messaging agent, a session request is initiated by the instant messaging client of the origination endpoint communication device to the instant messaging server. The instant messaging agent (in this case, a Microsoft instant messaging agent) responds to the service provider messages as if it were another instant messaging client. In other words, the instant messaging agent emulates an instant messaging client in response to the session request from the origination endpoint communication device. When combining the instant messaging agent with the IMC SIP variant, the multimedia access device emulates a voice enabled instant messaging client.

After the initial set of instant messaging messages, the instant messaging agent receives an MSN Invite message, and sends an IMV Setup message to the call control subsystem. The IMV Setup message indicates that a session request has been requested for a specific instant messaging user identification. The call control subsystem validates a structure of the aforementioned message and creates a session instance therefor. To correlate an address associated with the session request from the origination endpoint communication device with the destination endpoint communication device and to determine where to route the session request, the call control subsystem also sends an IMV Route message to the directory server. The directory server screens the aforementioned message containing the instant messaging user identifications (originating and destination instant messaging users) and identifies the destination endpoint communication device. The directory server then correlates the destination endpoint communication device to a directory number and a specific ethernet port of the multimedia access device. The directory server provides the correlated information back to the call control subsystem via an IMV Route Response message. The aforementioned messages facilitate routing and correlation functionality for the multimedia access device.

Within the directory server, a relationship has previously been established between an instant messaging user, a destination endpoint communication device and a directory number. The directory number is data filled into the directory server tables by the instant messaging user, indicating a relationship between the destination endpoint communication device and the directory number. The directory server receives requests for routing information, determines the destination endpoint communication device, and correlates that request to a directory number and, subsequently, an ethernet port (in this example). The directory server communicates with the IM agent to indicate the presence and availability of the aforementioned endpoint communication device. The IM agent subsequently indicates with the IM server (in this case, an MSN IM server) the presence and availability of the aforementioned endpoint communication device. The IM agent achieves this communication with the IM server by employing the standard IM signaling used by the specific IM service provider.

The call control subsystem then transitions to a feature discovery state. In order to determine if any features are active and relevant for the correlated directory number and ethernet port, the call control subsystem sends a Feature Request message to the feature manager. The feature manager examines the Feature Request message and determines what terminating features are active. The feature manager looks up this information by access to a subscriber database and returns the relevant feature information or feature set to the call control subsystem in a Feature Response message.

Next, in the communication session and to determine what the session description parameter ("SDP") should be in subsequent SIP messages, the call control subsystem sends an IMV Media Setup message to the ECD SIP variant instructing the ECD SIP variant to send an SIP Invite message addressed to the SIP telephone and, if the feature is enabled, to send along a caller identification in the header indicating the origination endpoint communication device. The ECD SIP variant notifies the destination endpoint communication device via the SIP Invite message and the destination endpoint communication device responds with 100 Trying signal to let the ECD SIP variant know that the message was received and the destination endpoint communication device is being signaled. The SIP telephone also sends back a 180 Ringing signal indicating that the destination endpoint communication device is ringing. Thereafter, the SIP telephone answers, indicated by a 200 OK message, and the ECD SIP variant sends an IMV Alert message to the call control subsystem to alert the call control subsystem that this event has occurred. The call control subsystem subsequently sends an IMV Alert message to the instant messaging agent.

The ECD SIP variant also sends an IMV Answer message to the call control subsystem. The call control subsystem sends an IMV Answer message including the SDP to the instant messaging agent. The instant messaging agent sends an MSN Accept message to the instant messaging server indicating that the destination endpoint communication device is accepting the session request and the instant messaging agent includes a desired IP address and port to send the SIP messages on. The instant messaging server receives the MSN Accept message, performs processing with the instant messaging client of the origination endpoint communication device and sends back an MSN Accept message to the instant messaging agent indicating the IP address and port of the instant messaging client.

After the instant messaging agent receives the MSN Accept message, the instant messaging agent sends an IMV Answer message to the IMC SIP variant with the SDP to be included in the subsequent SIP messaging. The IMC SIP variant now initiates an SIP based call to the previously identified instant messaging client IP address and port. A plurality of SIP messages (such as SIP Invite (SDP), Trying, Ringing, 200 OK, etc.) are used to establish the SIP based call in support of the voice communication session.

After the IMC SIP variant receives a 200 OK message indicating an answer from the instant messaging client, the IMC SIP variant signals the instant messaging agent with an ACK message. The ACK message includes the SDP of the instant messaging client. The IMC SIP variant also signals an ACK message to the instant messaging client. The instant messaging agent processes the message and sends an IMV Answer ACK message to the call control subsystem, which sends a IMV Answer ACK message to the ECD SIP variant.

The ECD SIP variant sends an ACK message to the SIP telephone at this time. A voice path is established and two-way conversation is enabled between the instant message client (a part of the origination endpoint communication device) and the SIP telephone (the destination endpoint communication device). Thus, a voice communication session is established between the endpoint communication devices in response to a session request.

The next events occur when either the origination or destination endpoint communication devices initiate a disconnect sequence. In this example, the instant messaging client sends a disconnect indicator. The instant messaging client signals a desire to terminate the voice communication session by sending a BYE message. The instant messaging server will also send an MSN Cancel message. Note that both of these messages may be received in any order.

The instant messaging agent and/or the IMC SIP variant receives the MSN Cancel message or the BYE messages, respectively. The IMC SIP variant sends an IMV Release message to the instant messaging agent. In conjunction therewith, the call control subsystem facilitates a plurality of termination messages to end the voice communication session. The instant messaging client is returned to an idle state upon receipt of a 200 OK message and the SIP telephone is returned to an idle state via an exchange of a BYE message and 200 OK message between the ECD SIP variant and the SIP telephone.

Figure 16:
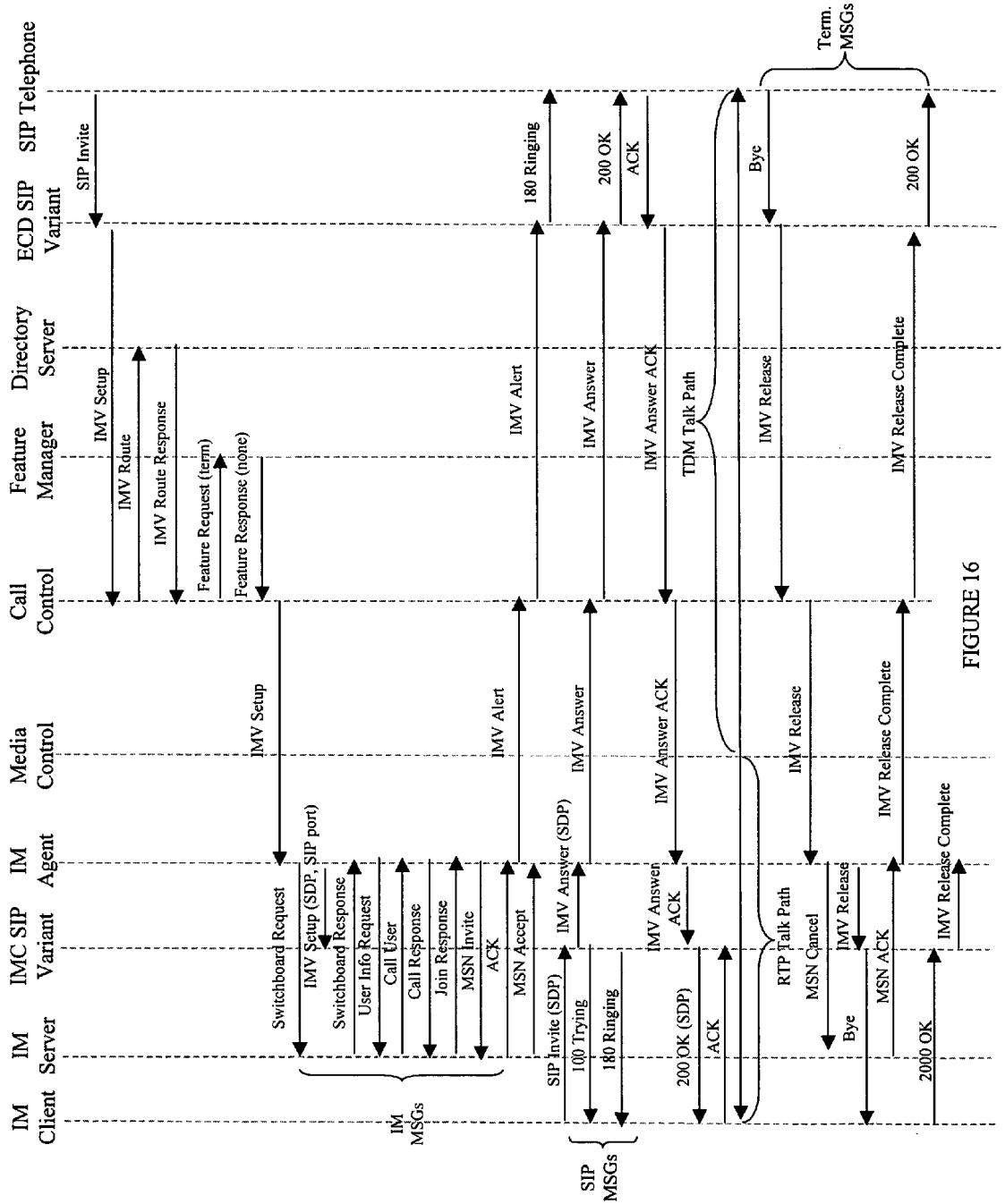

Turning now to FIG. 16, illustrated is a diagram demonstrating an exemplary call flow in accordance with the principles of the present invention. The call flow of FIG. 16 demonstrates a call flow from an origination endpoint communication device such as an SIP telephone to an instant messaging client (also referred to as "IM client") resident on an destination endpoint communication device such as a laptop PC. In the illustrated embodiment, the origination endpoint communication device is a non-instant messaging based communication device (i.e., the communication device employs signaling protocols other than instant messaging protocols). It should be understood that other endpoint communication devices may be substituted in the exemplary call flow(s) and still be within the broad scope of the present invention.

The call flow illustrates an operation associated with an instant messaging server (also referred to as "IM server") and a multimedia access device. In particular, a signaling variant (e.g., an SIP variant that forms a portion of a VoIP and video protocol module and, in this case, an IMC SIP variant and an ECD SIP variant), an instant messaging agent (also referred to as "IM agent" that forms a portion of a session control module), a media control module, a call control subsystem (that forms a portion of the session control module), a feature manager (that forms a portion of the session control module), and a directory server (that forms a portion of the session control module) of the multimedia access device are employed in the exemplary call flow. Of course, other systems, subsystems and modules within the multimedia access device may be employed to advantage depending on the particular application. Also, for ease of illustration, the call flow does not show the lower level interaction with the SIP telephone via, for instance, an ethernet device driver.

For the purposes of illustration, a Microsoft ("MSN") instant messaging client participates in the call flow. Of course, other service providers and instant messaging clients may be employed within the system of the present invention. The call flow that follows provides the high level messaging between selected systems, subsystems and modules in support of a voice communication session between the instant messaging client and the SIP telephone over a packet based communication network (e.g., an IP based communication network) employing the multimedia access device.

Before describing the call flow, an overview of the aforementioned systems, subsystems and modules will hereinafter be described. The instant messaging client initiates or receives the voice communication session and the instant messaging server supports presence management and the session interactions for the instant messaging client. The SIP variant is a VoIP signaling protocol that supports multiple signaling variants such as an MSN signaling variant and an endpoint communication device signaling variant. The instant messaging agent emulates an instant messaging client (e.g., an MSN IM client). The media control module manages the media streams and the call control subsystem manages call processing feature iterations within the multimedia access device. The feature manager provides feature management within the session control module and the directory server provides routing services within the session control module. Finally, an VoIP communication device such as the SIP telephone is the origination endpoint communication device in the exemplary call flow.

A set of instant messaging messages compliant with instant messaging protocols is employed by the instant messaging service provider (in this case, Microsoft) to participate in an instant messaging session. The instant messaging agent (in this case, a Microsoft instant messaging agent) communicates with the instant messaging server as if it were another instant messaging client. In other words, the instant messaging agent emulates an instant messaging client resident on the destination endpoint communication device. When combining the instant messaging agent with the IMC SIP variant, the multimedia access device emulates a voice enabled instant messaging client.

An origination sequence begins with the SIP telephone providing an SIP Invite message to the ECD SIP variant (representing a session request), indicating an SIP telephone would like to establish a voice communication session. The ECD SIP variant thereafter sends an IMV Setup message to the call control subsystem. The IMV Setup message includes information such as "to and from headers" as well as the SDP received in the SIP Invite message. The multimedia access device then determines where to route the session request by querying the directory server via IMV Route and IMV Route Response messages. In this example, the call control system screens the dialed number and directory server correlates this dialed directory number to an instant messaging user (i.e., a user identification) on a user group or a "buddy list" associated with the origination endpoint communication device, which may be a distant instant messaging client.

The call control subsystem then transitions to a feature discovery state. In order to determine if any features are active and relevant for the correlated directory number and an ethernet port, the call control subsystem sends a Feature Request message to the feature manager. The feature manager examines the Feature Request message and determines what terminating features are active. The feature manager looks up this information by access to a subscriber database and returns the relevant feature information or feature set to the call control subsystem in a Feature Response message.

After determining the route and feature set, the call control subsystem sends an IMV Setup message to the IM agent. The IM agent will use this information to establish an instant messaging session and request a voice communication session with a distant IM server and IM client. To these external devices, the originating IM agent appears as just another IM client. In other words, the instant messaging agent emulates an instant messaging client in response to the session request from the origination endpoint communication device. When combining the instant messaging agent with the IM C SIP variant, the multimedia access device emulates a voice enabled instant messaging client.

The IM agent sends basic instant messaging messages (e.g., Switchboard Request message, et seq.) to establish an instant messaging session and to request a voice communication session with the IM server and, subsequently, the IM client resident on the destination endpoint communication device. The IM server and the IM client confirm their acceptance of the request for a voice communication session by sending back an ACK message and an MSN Accept message. After the IM agent receives the ACK message, the agent notifies the call control subsystem that the IM client is available with an IMV Alert message. The call control subsystem signals the ECD SIP variant to provide a 180 Ringing signal to the SIP telephone via an IMV Alert message.

At this point in the communication session, the origination endpoint communication device hears the Ring Back tone and the IMC SIP variant is waiting for information from the IM-client indicating what IP addresses and ports to use to establish the voice communication session. This information will be conveyed by the IM client via the SDP on the SIP Invite message. When the IM C SIP variant receives the SIP Invite message, the IMC SIP variant screens the message for completeness and sends an IMV Answer message to the IM Agent. In response thereto, the IM agent sends an IMV Answer message to the call control subsystem.

The next steps in a establishing the voice communication session include the call control subsystem activating a voice path (e.g., an RTP path and a time division multiplexing, TDM, path). Additionally, the IM C SIP variant progresses establishing communication with the IM client using standard SIP messages such as 100 Trying and 180 Ringing messages. The call control subsystem also sends an IMV Answer message to the ECD SIP variant and the ECD SIP variant in turn signals answer to the SIP telephone with the 200 OK message.

After the SIP telephone receives the 200 OK message, the SIP telephone sends an ACK message back to the ECD SIP variant. The ECD SIP variant sends an IMV Answer ACK message to call control subsystem, which sends an IMV Answer ACK message to the IM Agent. The IM Agent sends an IMV Answer ACK message to the IMC SIP variant and the IMC SIP variant then sends a 200 OK message to the IM client (which includes the SDP). After the IMC SIP variant receives an ACK message, the voice path is established as illustrated by the RTP and TDM Talk Paths. Thus, a voice communication session is established between the endpoint communication devices in response to a session request.

The voice communication session continues one speaker terminates the session. In this example, the origination endpoint communication device terminates the voice communication session by signaling BYE. The SIP variants, call control subsystem, media control module, IM agent, IM server and IM client resident on the destination communication device send and receive termination messages to release resources, terminate the communication session instance and return the SIP telephone to an idle state.

With respect to the preceding exemplary call flows, those skilled in the art should understand that error handling and other basic functionality is performed as a matter of course. Although the error handling messages were not illustrated and described above, it should be understood that, for instance, with each message request, a message timeout may be included between the systems, subsystems and modules of the multimedia communication system to account for unexpected results and to compensate for errors, in general.

Thus, the multimedia communication system according to the principles of the present invention is employable with a plurality of communication networks and includes a multimedia access device and management and maintenance server. For instance, a first communications network may be the PSTN, a second communications network may be the Internet, and a third communications network may be a home or enterprise communications network. The multimedia communication system is also employable with an instant messaging server and endpoint communication devices such as a facsimile machine, answering machines, telephones, etc.

The first communications network may provide an authorization number (directory number) and connectivity to the PSTN. The third communications network provides local connectivity for access to the Internet or the PSTN in a wired or wireless fashion for telephony appliances and computer and multimedia networking equipment therein. The multimedia access device provides intelligent connectivity and access to telephony and multimedia functions and applications to endpoint communication devices coupled directly or indirectly thereto. The distributed multimedia access device intelligence application may be self-contained "system-on-a-chip" functionality including multiple instant messaging client translators and adaptive routing algorithms and multimedia codecs.

The management and maintenance server provides, among other things, updates, authorization and access control, call detail records and a billing (commerce) mechanism for the distributed multimedia access devices. The instant messaging server provides an interface via the Internet to presence and status information on standard messaging services (such as Yahoo IM, MSN IM, AOL IM, or other multi-client profile based services such as ICQ, Skype, etc.) which is correlated to the multimedia access device for access and routing considerations.

The multimedia communication system can create and route virtual directory numbers for analog telephones or SIP/ soft telephones using a distributed multimedia access device. The multimedia communication system can provide local PSTN access (i.e., port sharing) using a distributed multimedia access device and rules and call handling based on, for instance, instant messaging status and presence information. The multimedia communication system can deliver caller identification to an endpoint communication device such as an analog telephone or caller identification display when a session request is made (originated) from and instant messaging client or endpoint communication device.

Thus, the multimedia communication system according to the present invention provides many capabilities as described herein. The multimedia communication system can monitor and correlate instant messaging status and presence information with a subscriber's directory number such as an automatic number identification (ANI). A methodology of monitoring and correlating instant messaging status and presence information with a subscriber's PSTN ANI is described below.

The user group or "buddy list" can be created by user interaction with a data management module associated with the management and maintenance server. The user may manually populate or upload their specific buddy list (there can be multiple buddy lists per multimedia access device) or the user may provide the management and maintenance server an instant messaging user name and the management and maintenance server may automatically extract this information from the instant messenger service provider's database. The user provides the buddy list and also includes PSTN information associated with specific buddy list entries.

The multimedia access device communicates with the management and maintenance server to obtain the user's buddy list including the PSTN information derived from the buddy list data. This communication is achieved via a query/ response dialog. Upon detecting an authorized request, the management and maintenance server downloads buddy list subscription data to the multimedia access device. The multimedia access device validates the format of the data, translates and stores this data in a directory server thereof. The multimedia access device uses the buddy list and status information along with the PSTN fields to associate specific PSTN numbers with entries in a specific buddy list.

The system and methodology of providing user authorization and access to multimedia services based on instant messaging status and presence information correlated to a subscriber's PSTN ANI is described below. The multimedia communication system provides a process to authenticate and authorize access to multimedia services based upon requests that are fielded from, for instance, the FXS and FXO ports and the related device drivers of the multimedia access device.

The user is enabled to establish trusted buddy list screening tables in the management and maintenance server and can assign various privilege and access capabilities to each entry. The screening tables are then distributed to the appropriate multimedia access devices. The multimedia communication system provides a process for the directory server of the multimedia access device to obtain and utilize instant messaging status information of the buddy list entries by communicating with the management and maintenance servers via the appropriate instant messaging agent instance employing a selected protocol. The multimedia communication system also populates the directory server in the multimedia access device with the status information. The multimedia communication system then employs the combined PSTN, instant messaging and requester privilege information and, via the distributed multimedia access devices, validates user requests and authorizes access to the requested multimedia service.

As mentioned above, the multimedia communication system also supports routing of VoIP communication sessions based on instant messaging status and presence information. Additionally, the multimedia communication system provides PSTN access to VoIP calls based on user defined instant messaging authorization and access rules. In accordance therewith, the multimedia access device can associate a call request with a call type (i.e., 0+, local, international, emergency (911), etc.). Furthermore, the multimedia communication system can deliver caller identification information to a destination endpoint communication device (e.g., an analog telephone) when a session request is originated from an instant messaging origination endpoint communication device. The multimedia access device performs inbound call processing as previously described and determines the session request should be provided to an destination endpoint communication device coupled to an FXS port of the multimedia access device.

The multimedia access device determines that the FXS port supports caller identification service and parses the inbound call request for caller identification information and determines that the call request data is formatted as an inbound instant messaging call request message from a buddy list caller. A session control module then obtains the instant messenger user name and PSTN number, via the directory server, from the matching entry in the "buddy list" table and populates the caller name and caller identification fields in the outbound call primitive. The device driver then formats the caller identification and caller name data and passes this information in the call termination request to a selected line instance.

The multimedia communication system also provides passive monitoring of VoIP communication sessions utilizing the instant messenger presence information and correlated directory number information. The multimedia communication system enables requesting entities to request the replication of packets and VoIP message information to authorized entities. This request may be specified by requesting replication of session and session related information based upon either an instant messenger "buddy list" name or a PSTN number. Upon detecting this type of request, the multimedia access device determines if the requested address (either a PSTN number or an instant messenger name) is active in a communication session. The multimedia access device may replicate and store the requests, and, thereafter, completes the streaming and forwarding of call related information to the requesting entity.

The multimedia communication system can create virtual directory numbers to analog telephones or IP communication devices using instant messenger presence information. Accordingly, the multimedia access device and the management and maintenance server support the assignment and creation of additional or "virtual" directory number addresses associated with a single buddy list entry. As a result, a prospective caller within a given closed user group may be very specific in call attempts and allows the multimedia access device to provide a more specific level of call handling depending upon which specific member or communication device is being called. The management and maintenance server and the multimedia access device allow multiple "sub addresses" per buddy list entry and allow the assignment of specific FXS ports or IP communication devices to a specific sub-address entry found in a buddy list entry.

One step in the processing of inbound and outbound voice and media communication session requests is to screen the requested called party and determine if the requested party is a member populated on a users buddy list (for outbound calls) or if the requested party is a local assigned number or virtual number (for inbound calls) on the multimedia access device. The multimedia access device provides the additional capability to screen for non-PSTN addresses or extended PSTN called numbers and determine if the requested party is associated with a buddy list entry as a "virtual" or sub-address entry.

The originating session control module executes the screening logic and queries the directory server to find a match in the primary buddy list entries. If a match is found, the directory server subsequently screens for virtual or sub-address entries and determines the overall availability of the buddy list entry. If the primary buddy list entry is available, the virtual directory number, buddy list status and IP address is returned to the session control module. A VoIP based call is initiated to the destination endpoint communication device over an IP-based path. The destination multimedia access device examines the incoming VoIP call request and identifies the virtual directory number as the intended destination. The multimedia access device signals the virtual directory number FXS port or the IP communication device to establish the communication session.

In accordance with the call processing as described above, the multimedia communication system can share multimedia information by correlating instant messenger presence and status information with PSTN directory number (e.g., ANI) information and utilizing DTMF tones to accept or reject the transfer. The multimedia access device has the capability to store, transmit and receive multimedia information. A method of initiating and authorizing the transfer of files using an attached standard analog telephone may be provided as set forth below.

A terminating multimedia access device processes a file transfer request by routing the request for authorization to an analog telephone attached to the multimedia access device via an FXS port. The analog telephone is signaled (ringing with caller identification) via caller identification data populated in the caller name/caller identification field with text indicating a "buddy" is requesting to transfer multimedia information to the terminating multimedia access device. The user answers the analog telephone and is prompted via voice prompt to accept or reject the media transfer request. The user can examine the caller identification information to determine who is requesting the transfer and decide to accept or reject the request. If the user accepts the request, the communication session is terminated and transmission process is initiated. If the user rejects the request, the communication session is terminated and the far end requestor is notified, via signaling, that the request was rejected.

The multimedia communication session can create call routing information for VoIP and PSTN calls by utilizing instant messenger buddy list information. By inputting buddy lists into a database, a call routing table may be automatically generated that allows online instant messenger users to be reached over a VoIP path before attempting the PSTN. The multimedia communication system supports the prioritized routing of calls dialed with a PSTN address over an IP-based network by screening a user's "buddy list" table and determining the availability of IP-based routing information and positive indication of the called parties availability. After a specific buddy list on the management and maintenance server is populated, the entries are distributed to the designated multimedia access device.

An instant messaging agent screens the distributed data for format compliance and validity and passes this information to a directory server with an update buddy list request. The directory server processes this data and creates buddy list IP and status entries for each buddy list entry. The session control module subsequently uses this information to populate real-time routing and status requests therefrom. If the directory server screening determines a match for the PSTN number to a buddy list entry, the directory server retrieves the associated IP address and the "available" status and provides this to the session control module. The session control module uses this information to route the call over an IP-based network by populating the VoIP session messages with the instant messaging and IP data derived from query to the directory server.

The multimedia communication system also provides instant messenger-based access to smart home or enterprise management and security. The multimedia access device provides X10 protocol-based device control and monitoring for devices in the home such as heating, ventilation and air conditioning, door status, alarm system status and control, video-based monitoring and interaction, interactive video and voice sessions, garage doors, lights and lighting systems, audio systems, ovens and kitchen appliances, and other devices.

The control and monitoring is accomplished by the user accessing the multimedia access device via instant messaging and establishing an instant messaging session with the multimedia access device. The multimedia access device emulates an instant messenger user and starts a dialog and allows the user to securely login to the home or enterprise management subsystem. Based upon the commands submitted by the instant messaging user, the multimedia access device provides mediation and interaction with the X10 devices deployed though out the facility. The multimedia access device may also send out instant messaging text messages based upon events that are detected in the home or enterprise (e.g., door opened, smoke alarm, system failures/alarms).

The multimedia communication system, or portions thereof, may be incorporated into a system on chip architecture as a standalone apparatus. A system on chip microprocessor that has embedded processing elements, digital signal processor resources, and memory units is used to provide the necessary resources to implement instances of multiple instant messaging clients that have been modified to run on an embedded operating system. This allows a standalone appliance to emulate the presence of multiple instant messaging clients on a single device, namely, the multimedia access device.

The multimedia access device utilizes a system on chip architecture as its core processing element and the associated embedded operating system as its operating environment. The multimedia access device may run multiple instances of standard instant messaging clients which have been modified to run on its embedded operating system. Each instance of the instant messaging client communicates with its designated instant messaging server, logging in and updating its status information. The multimedia access device uses the information derived via the instant messaging clients and stored in the directory server to provide instant messaging presence information to a system on a chip architecture as a standalone apparatus.

Thus, a multimedia access device in the environment of a multimedia communication system and related methods of operating the same with readily attainable and quantifiable advantages has been introduced. Those skilled in the art should understand that the previously described embodiments of the multimedia access device and the multimedia communication system and related methods of operating the same are submitted for illustrative purposes only. In addition, other embodiments capable of providing multimedia services to endpoint communication devices via the multimedia access device are well within the broad scope of the present invention. While the multimedia access device has been described in a home environment, the multimedia access device may be employed in other multimedia communication systems including systems embodying business enterprises.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus adapted to establish a voice communication session between a first endpoint communication device and a second endpoint communication device, said first endpoint communication device being an instant messaging based communication device and said second endpoint communication device being a non-instant messaging based communication device, said apparatus being remote from said first and second endpoint communication devices, comprising:
   a processor; and
   memory including computer program code configured to, with said processor, cause said apparatus to perform at least the following:
      maintain a status of and provide an indication of availability of said second endpoint communication device to said first endpoint communication device prior to a session request;
      receive said session request from an instant messaging client of said first endpoint communication device including a user identification associated with said second endpoint communication device;
      correlate said user identification to a directory number and routing information for said second endpoint communication device;
      process instant messaging messages for said second endpoint communication device compatible with said instant messaging client of said first endpoint communication device based upon said availability of said second endpoint communication device;
      notify said second endpoint communication device of said session request employing non-instant messaging based signaling in accordance with said routing information;
      receive an answer indication from said instant messaging client of said first endpoint communication device in response to an initiation of said voice communication session and provide an acknowledgement thereto; and
      establish a voice path for said voice communication session to and between said instant messaging client of said first endpoint communication device and said second endpoint communication device after said acknowledgment.

2. The apparatus as recited in claim 1 wherein said memory and computer program code are further configured to, with said processor, cause said apparatus to:
   receive said session request from said instant messaging client of said first endpoint communication device and process said instant messaging messages for said second endpoint communication device compatible with said instant messaging client of said first endpoint communication device; and
   notify said second endpoint communication device of said session request employing said non-instant messaging based signaling.

3. The apparatus as recited in claim 1 wherein said memory and computer program code are further configured to, with said processor, cause said apparatus to receive said session request from said instant messaging client of said first endpoint communication device via an instant messaging server.

4. The apparatus as recited in claim 1 wherein said memory and computer program code are further configured to, with said processor, cause said apparatus to notify said second endpoint communication device of said session request via a device driver.

5. The apparatus as recited in claim 1 wherein said memory and computer program code are further configured to, with said processor, cause said apparatus to correlate said user identification to a directory number associated with said second endpoint communication device in accordance with a directory server.

6. The apparatus as recited in claim 1 wherein said memory and computer program code are further configured to, with said processor, cause said apparatus to determine a feature set for said second endpoint communication device.

7. The apparatus as recited in claim 1 wherein said memory and computer program code are further configured to, with said processor, cause said apparatus to initiate an Internet protocol based communication session with said instant messaging client of said first endpoint communication device.

8. The apparatus as recited in claim 1 wherein said memory and computer program code are further configured to, with said processor, cause said apparatus to manage media streams between said first and second endpoint communication devices.

9. The apparatus as recited in claim 1 wherein said memory and computer program code are further configured to, with said processor, cause said apparatus to terminate said voice communication session.

10. The apparatus as recited in claim 1 wherein said second endpoint communication device is selected from the group consisting of:
   an analog communication device;
   a voice over Internet protocol communication device; and
   a communication device coupled to a circuit switched communication network.

11. A method of establishing a voice communication session between a first endpoint communication device and a second endpoint communication device with a multimedia access device remote from said first and second endpoint communication devices, said first endpoint communication device being an instant messaging based communication device and said second endpoint communication device being a non-instant messaging based communication device, comprising:
   maintaining a status of said second endpoint communication device;
   providing an indication of availability of said second endpoint communication device to said first endpoint communication device prior to a session request;
   receiving said session request from an instant messaging client of said first endpoint communication device including a user identification associated with said second endpoint communication device;
   correlating said user identification to a directory number and routing information for said second endpoint communication device;
   processing instant messaging messages for said second endpoint communication device compatible with said instant messaging client of said first endpoint communication device based upon said availability of said second endpoint communication device;
   notifying said second endpoint communication device of said session request employing non-instant messaging based signaling in accordance with said routing information;
   receiving an answer indication from said instant messaging client of said first endpoint communication device in response to an initiation of said voice communication session and providing an acknowledgement thereto; and
   establishing a voice path for said voice communication session to and between said instant messaging client of said first endpoint communication device and said second endpoint communication device after said acknowledgment.

12. The method as recited in claim 11 further comprising initiating a session initiation protocol call with said instant messaging client of said first endpoint communication device.

13. The method as recited in claim 11 wherein said receiving comprises receiving said session request from said instant messaging client of said first endpoint communication device via an instant messaging server.

14. The method as recited in claim 11 wherein said notifying comprises notifying said second endpoint communication device of said session request via a device driver.

15. The method as recited in claim 11 wherein said correlating said user identification to a directory number associated with said second endpoint communication device is performed in accordance with a directory server.

16. The method as recited in claim 11 further comprising determining a feature set for said second endpoint communication device.

17. The method as recited in claim 11 further comprising initiating an Internet protocol based communication session with said instant messaging client of said first endpoint communication device.

18. The method as recited in claim 11 further comprising managing media streams between said first and second endpoint communication devices.

19. The method as recited in claim 11 further comprising terminating said voice communication session.

20. The method as recited in claim 11 wherein said second endpoint communication device is selected from the group consisting of:
   an analog communication device;
   a voice over Internet protocol communication device; and
   a communication device coupled to a circuit switched communication network.

21. A multimedia communication system, comprising:
   a first endpoint communication device being an instant messaging based communication device;
   a second endpoint communication device being a non-instant messaging based communication device; and
   an apparatus being remote from said first and second endpoint communication devices, comprising:
      a processor; and
      memory including computer program code configured to, with said processor, cause said apparatus to perform at least the following:
         maintain a status of and provide an indication of availability of said second endpoint communication device to said first endpoint communication device prior to a session request;
         receive said session request from an instant messaging client of said first endpoint communication device including a user identification associated with said second endpoint communication device;
         correlate said user identification to a directory number and routing information for said second endpoint communication device;
         process instant messaging messages for said second endpoint communication device compatible with said instant messaging client of said first endpoint communication device based upon said availability of said second endpoint communication device;

notify said second endpoint communication device of said session request employing non-instant messaging based signaling in accordance with said routing information;

receive an answer indication from said instant messaging client of said first endpoint communication device in response to an initiation of said voice communication session and provide an acknowledgement thereto; and establish a voice path for a voice communication session to and between said instant messaging client of said first endpoint communication device and said second endpoint communication device after said acknowledgment.

22. The multimedia communication system as recited in claim 21 wherein said memory and computer program code are further configured to, with said processor, cause said apparatus to:

receive said session request from said instant messaging client of said first endpoint communication device and process said instant messaging messages for said second endpoint communication device compatible with said instant messaging client of said first endpoint communication device; and notify said second endpoint communication device of said session request employing said non-instant messaging based signaling.

23. The multimedia communication system as recited in claim 21 wherein said memory and computer program code are further configured to, with said processor, cause said apparatus to receive said session request from said instant messaging client of said first endpoint communication device via an instant messaging server.

24. The multimedia communication system as recited in claim 21 wherein said memory and computer program code are further configured to, with said processor, cause said apparatus to notify said second endpoint communication device of said session request via a device driver.

25. The multimedia communication system as recited in claim 21 wherein said memory and computer program code are further configured to, with said processor, cause said apparatus to correlate said user identification to a directory number associated with said second endpoint communication device in accordance with a directory server.

26. The multimedia communication system as recited in claim 21 wherein said memory and computer program code are further configured to, with said processor, cause said apparatus to determine a feature set for said second endpoint communication device.

27. The multimedia communication system as recited in claim 21 wherein said memory and computer program code are further configured to, with said processor, cause said apparatus to initiate an Internet protocol based communication session with said instant messaging client of said first endpoint communication device.

28. The multimedia communication system as recited in claim 21 wherein said memory and computer program code are further configured to, with said processor, cause said apparatus to manage media streams between said first and second endpoint communication devices.

29. The multimedia communication system as recited in claim 21 wherein said memory and computer program code are further configured to, with said processor, cause said apparatus to terminate said voice communication session.

30. The multimedia communication system as recited in claim 21 wherein said second endpoint communication device is selected from the group consisting of:

an analog communication device;

a voice over Internet protocol communication device; and a communication device coupled to a circuit switched communication network.

31. An apparatus adapted to establish a voice communication session between a first endpoint communication device and a second endpoint communication device, said first endpoint communication device being a non-instant messaging based communication device and said second endpoint communication device being an instant messaging based communication device, said apparatus being remote from said first and second endpoint communication devices, comprising:

a processor; and memory including computer program code configured to, with said processor, cause said apparatus to perform at least the following:

maintain a status and availability of said second endpoint communication device prior to a session request;

receive said session request from said first endpoint communication device including a directory number associated with said second endpoint communication device;

correlate said directory number to a user identification and routing information for said second endpoint communication device;

process non-instant messaging messages compatible with said first endpoint communication device and instant messaging messages compatible with an instant messaging client of said second endpoint communication device based upon said availability of said second endpoint communication device;

notify said instant messaging client of said second endpoint communication device employing instant messaging based signaling in accordance with said routing information;

send an answer indication to said instant messaging client of said second endpoint communication device in response to an initiation of said voice communication session and receive an acknowledgement therefrom; and establish a voice path for said voice communication session to and between said first endpoint communication device and said instant messaging client of said second endpoint communication device after said acknowledgement.

32. The apparatus as recited in claim 31 wherein said memory and computer program code are further configured to, with said processor, cause said apparatus to receive said session request from said first endpoint communication device in accordance with a call control subsystem.

33. The apparatus as recited in claim 31 wherein said memory and computer program code are further configured to, with said processor, cause said apparatus to process said instant messaging messages compatible with said instant messaging client of said second endpoint communication device in accordance with an instant messaging agent.

34. The apparatus as recited in claim 31 wherein said memory and computer program code are further configured to, with said processor, cause said apparatus to notify said first endpoint communication device of an acknowledgement to said session request by said instant messaging client of said second endpoint communication device employing non-instant messaging based signaling.

35. The apparatus as recited in claim 31 wherein said memory and computer program code are further configured to, with said processor, cause said apparatus to notify said first endpoint communication device of an acknowledgement to said session request by said instant messaging client of said second endpoint communication device via a device driver.

36. The apparatus as recited in claim 31 wherein said memory and computer program code are further configured to, with said processor, cause said apparatus to correlate said directory number to a user identification associated with said second endpoint communication device in accordance with a directory server.

37. The apparatus as recited in claim 31 wherein said memory and computer program code are further configured to, with said processor, cause said apparatus to determine a feature set for said first endpoint communication device.

38. The apparatus as recited in claim 31 wherein said memory and computer program code are further configured to, with said processor, cause said apparatus to accept an initiation of an Internet protocol based communication session with said instant messaging client of said second endpoint communication device.

39. The apparatus as recited in claim 31 wherein said memory and computer program code are further configured to, with said processor, cause said apparatus to manage media streams between said first and second endpoint communication devices.

40. The apparatus as recited in claim 31 wherein said memory and computer program code are further configured to, with said processor, cause said apparatus to terminate said voice communication session.

41. A method of establishing a voice communication session between a first endpoint communication device and a second endpoint communication device with a multimedia access device remote from said first and second endpoint communication devices, said first endpoint communication device being a non-instant messaging based communication device and said second endpoint communication device being an instant messaging based communication device, comprising:
   maintaining a status and availability of said second endpoint communication device prior to a session request;
   receiving said session request from said first endpoint communication device including a directory number associated with said second endpoint communication device;
   correlate said directory number to a user identification and routing information for said second endpoint communication device;
   processing non-instant messaging messages compatible with said first endpoint communication device and instant messaging messages compatible with an instant messaging client of said second endpoint communication device based upon said availability of said second endpoint communication device;
   notifying said instant messaging client of said second endpoint communication device employing instant messaging based signaling in accordance with said routing information;
   sending an answer indication to said instant messaging client of said second endpoint communication device in response to an initiation of said voice communication session and receiving an acknowledgement therefrom; and
   establishing a voice path for said voice communication session to and between said first endpoint communication device and said instant messaging client of said second endpoint communication device after said acknowledgement.

42. The method as recited in claim 41 further comprising accepting an initiation of a session initiation protocol call from said instant messaging client of said second endpoint communication device.

43. The method as recited in claim 41 further comprising receiving a session initiation invite message from said instant messaging client of said second endpoint communication device.

44. The method as recited in claim 41 wherein said first endpoint communication device is selected from the group consisting of:
   an analog communication device;
   a voice over Internet protocol communication device; and
   a communication device coupled to a circuit switched communication network.

45. The method as recited in claim 41 further comprising notifying said first endpoint communication device of an acknowledgement to said session request by said instant messaging client of said second endpoint communication device via a device driver.

46. The method as recited in claim 41 wherein said correlating said directory number to a user identification associated with said second endpoint communication device is performed in accordance with a directory server.

47. The method as recited in claim 41 further comprising determining a feature set for said first endpoint communication device.

48. The method as recited in claim 41 further comprising accepting an initiation of an Internet protocol based communication session with said instant messaging client of said second endpoint communication device.

49. The method as recited in claim 41 further comprising managing media streams between said first and second endpoint communication devices.

50. The method as recited in claim 41 further comprising terminating said voice communication session.

51. A multimedia communication system, comprising:
   a first endpoint communication device being a non-instant messaging based communication device;
   a second endpoint communication device being an instant messaging based communication device; and
   an apparatus remote from said first and second endpoint communication devices, comprising:
      a processor; and
      memory including computer program code configured to, with said processor, cause said apparatus to perform at least the following:
         maintain a status and availability of said second endpoint communication device prior to a session request;
         receive said session request from said first endpoint communication device including a directory number associated with said second endpoint communication device;
         correlate said directory number to a user identification and routing information for said second endpoint communication device;
         process non-instant messaging messages compatible with said first endpoint communication device and instant messaging messages compatible with an instant messaging client of said second endpoint communication device based upon said availability of said second endpoint communication device;
         notify said instant messaging client of said second endpoint communication device employing instant messaging based signaling in accordance with said routing information;

send an answer indication to said instant messaging client of said second endpoint communication device in response to an initiation of said voice communication session and receive an acknowledgement therefrom; and establish a voice path for said voice communication session to and between said first endpoint communication device and said instant messaging client of said second endpoint communication device after said acknowledgement.

52. The multimedia communication system as recited in claim 51 wherein said memory and computer program code are further configured to, with said processor, cause said apparatus to receive said session request from said first endpoint communication device in accordance with a call control subsystem.

53. The multimedia communication system as recited in claim 51 wherein said memory and computer program code are further configured to, with said processor, cause said apparatus to process said instant messaging messages compatible with said instant messaging client of said second endpoint communication device in accordance with an instant messaging agent.

54. The multimedia communication system as recited in claim 51 wherein said memory and computer program code are further configured to, with said processor, cause said apparatus to notify said first endpoint communication device of an acknowledgement to said session request by said instant messaging client of said second endpoint communication device employing non-instant messaging based signaling.

55. The multimedia communication system as recited in claim 51 wherein said memory and computer program code are further configured to, with said processor, cause said apparatus to notify said first endpoint communication device of an acknowledgement to said session request by said instant messaging client of said second endpoint communication device via a device driver.

56. The multimedia communication system as recited in claim 51 wherein said memory and computer program code are further configured to, with said processor, cause said apparatus to correlate said directory number to a user identification associated with said second endpoint communication device in accordance with a directory server.

57. The multimedia communication system as recited in claim 51 wherein said memory and computer program code are further configured to, with said processor, cause said apparatus to determine a feature set for said first endpoint communication device.

58. The multimedia communication system as recited in claim 51 wherein said memory and computer program code are further configured to, with said processor, cause said apparatus to accept an initiation of an Internet protocol based communication session with said instant messaging client of said second endpoint communication device.

59. The multimedia communication system as recited in claim 51 wherein said memory and computer program code are further configured to, with said processor, cause said apparatus to manage media streams between said first and second endpoint communication devices.

60. The multimedia communication system as recited in claim 51 wherein said memory and computer program code are further configured to, with said processor, cause said apparatus to terminate said voice communication session.

\* \* \* \* \*